(12) United States Patent
Florissi et al.

(10) Patent No.: US 10,331,380 B1
(45) Date of Patent: Jun. 25, 2019

(54) SCALABLE DISTRIBUTED IN-MEMORY COMPUTATION UTILIZING BATCH MODE EXTENSIONS

(71) Applicant: EMC IP Holding Company LLC, Hopkinton, MA (US)

(72) Inventors: Patricia Gomes Soares Florissi, Briarcliff Manor, NY (US); Ofri Masad, Beer-Sheva (IL); Ido Singer, Nes-Ziona (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 184 days.

(21) Appl. No.: 15/582,743

(22) Filed: Apr. 30, 2017

Related U.S. Application Data

(63) Continuation-in-part of application No. 14/982,341, filed on Dec. 29, 2015, now Pat. No. 10,015,106.
(Continued)

(51) Int. Cl.
*G06F 3/06* (2006.01)
*G06F 9/50* (2006.01)

(52) U.S. Cl.
CPC .......... *G06F 3/0659* (2013.01); *G06F 3/0604* (2013.01); *G06F 3/067* (2013.01); *G06F 9/5083* (2013.01)

(58) Field of Classification Search
CPC ...... G06F 3/0604; G06F 3/0659; G06F 3/067; G06F 9/5083
See application file for complete search history.

(56) References Cited

U.S. PATENT DOCUMENTS 6,516,350 B1    2/2003 Lumelsky et al.
7,657,537 B1 *  2/2010 Corbett ................. G06F 3/0614
                                        707/643
(Continued)

OTHER PUBLICATIONS

Dell, "Dell Boomi Platform: Connect Every Part of Your Business to Transform How You do Business," https://marketing.boomi.com/rs/777-AVU-348/images/Boomi-Integration-Cloud.pdf, 2017, 4 pages.
(Continued)

*Primary Examiner* — Jerry B Dennison
(74) *Attorney, Agent, or Firm* — Ryan, Mason & Lewis, LLP

(57) ABSTRACT

An apparatus in one embodiment comprises at least one processing device having a processor coupled to a memory. The processing device is configured to distribute in-memory computations across a plurality of data processing clusters associated with respective data zones, and to combine local processing results of the distributed in-memory computations from the data processing clusters. The distributed in-memory computations utilize local data structures of respective ones of the data processing clusters. A given one of the local data structures in one of the data processing clusters receives local data of the corresponding data zone and is utilized to generate the local processing results of that data processing cluster that are combined with local processing results of other ones of the data processing clusters. The local data structures are configured to support batch mode extensions such as Spark SQL, Spark MLlib or Spark GraphX for performance of the distributed in-memory computations.

20 Claims, 27 Drawing Sheets

Related U.S. Application Data

(60) Provisional application No. 62/143,404, filed on Apr. 6, 2015, provisional application No. 62/143,685, filed on Apr. 6, 2015, provisional application No. 62/378,101, filed on Aug. 22, 2016, provisional application No. 62/378,129, filed on Aug. 22, 2016.

(56) References Cited

U.S. PATENT DOCUMENTS

| | | | |
|---|---|---|---|
| 7,934,018 | B1 | 4/2011 | Lavallee et al. |
| 8,224,825 | B2 * | 7/2012 | Wang ............... G06F 17/30584 |
| | | | 707/737 |
| 8,806,061 | B1 | 8/2014 | Lobo et al. |
| 9,020,802 | B1 | 4/2015 | Florissi et al. |
| 9,031,992 | B1 | 5/2015 | Florissi et al. |
| 9,158,843 | B1 | 10/2015 | Florissi et al. |
| 9,229,952 | B1 | 1/2016 | Meacham et al. |
| 9,280,381 | B1 | 3/2016 | Florissi et al. |
| 9,338,218 | B1 | 5/2016 | Florissi et al. |
| 9,361,263 | B1 | 6/2016 | Florissi et al. |
| 9,418,085 | B1 | 8/2016 | Shih et al. |
| 9,489,233 | B1 | 11/2016 | Florissi et al. |
| 9,747,127 | B1 | 8/2017 | Florissi et al. |
| 9,747,128 | B1 | 8/2017 | Vijendra et al. |
| 9,996,662 | B1 | 6/2018 | Florissi et al. |
| 10,015,106 | B1 | 7/2018 | Florissi et al. |
| 10,111,492 | B2 | 10/2018 | Florissi et al. |
| 10,122,806 | B1 | 11/2018 | Florissi et al. |
| 10,127,352 | B1 | 11/2018 | Florissi et al. |
| 2002/0073167 | A1 | 6/2002 | Powell et al. |
| 2005/0010712 | A1 | 1/2005 | Kim et al. |
| 2005/0102354 | A1 | 5/2005 | Hollenbeck et al. |
| 2005/0114476 | A1 | 5/2005 | Chen et al. |
| 2005/0132297 | A1 | 6/2005 | Milic-Frayling et al. |
| 2005/0153686 | A1 | 7/2005 | Kall et al. |
| 2006/0002383 | A1 | 1/2006 | Jeong et al. |
| 2006/0122927 | A1 | 6/2006 | Huberman et al. |
| 2007/0026426 | A1 | 2/2007 | Fuernkranz et al. |
| 2007/0076703 | A1 | 4/2007 | Yoneda et al. |
| 2007/0088703 | A1 | 4/2007 | Kasiolas et al. |
| 2008/0027954 | A1 | 1/2008 | Gan et al. |
| 2008/0028086 | A1 | 1/2008 | Chetuparambil et al. |
| 2008/0077607 | A1 | 3/2008 | Gatawood et al. |
| 2008/0279167 | A1 | 11/2008 | Cardei et al. |
| 2009/0062623 | A1 | 3/2009 | Cohen et al. |
| 2009/0076851 | A1 | 3/2009 | Rao |
| 2009/0150084 | A1 | 6/2009 | Colwell et al. |
| 2009/0319188 | A1 | 12/2009 | Otto |
| 2010/0042809 | A1 | 2/2010 | Schenfeld et al. |
| 2010/0076845 | A1 | 3/2010 | Mullins |
| 2010/0076856 | A1 | 3/2010 | Mullins |
| 2010/0131639 | A1 | 5/2010 | Narayana et al. |
| 2010/0184093 | A1 | 7/2010 | Donovan et al. |
| 2010/0229178 | A1 | 9/2010 | Ito |
| 2010/0290468 | A1 | 11/2010 | Lynam et al. |
| 2010/0299437 | A1 | 11/2010 | Moore |
| 2011/0020785 | A1 | 1/2011 | Lowery, Jr. et al. |
| 2011/0029999 | A1 | 2/2011 | Foti |
| 2011/0103364 | A1 | 5/2011 | Li |
| 2011/0314002 | A1 | 12/2011 | Oliver et al. |
| 2012/0030599 | A1 | 2/2012 | Butt et al. |
| 2013/0035956 | A1 | 2/2013 | Carmeli et al. |
| 2013/0044925 | A1 | 2/2013 | Kozuka et al. |
| 2013/0194928 | A1 | 8/2013 | Iqbal |
| 2013/0246460 | A1 | 9/2013 | Maltbie et al. |
| 2013/0318257 | A1 | 11/2013 | Lee et al. |
| 2013/0346988 | A1 | 12/2013 | Bruno et al. |
| 2014/0012843 | A1 | 1/2014 | Soon-Shiong |
| 2014/0025393 | A1 | 1/2014 | Wang et al. |
| 2014/0075161 | A1 * | 3/2014 | Zhang ...................... G06F 8/453 |
| | | | 712/220 |
| 2014/0173618 | A1 | 6/2014 | Neuman et al. |
| 2014/0280298 | A1 * | 9/2014 | Petride ............... G06F 17/30483 |
| | | | 707/769 |
| 2014/0280363 | A1 | 9/2014 | Heng et al. |
| 2014/0280604 | A1 | 9/2014 | Ahiska et al. |
| 2014/0280990 | A1 | 9/2014 | Dove et al. |
| 2014/0310718 | A1 | 10/2014 | Gerphagnon et al. |
| 2014/0325041 | A1 | 10/2014 | Xu et al. |
| 2014/0372611 | A1 * | 12/2014 | Matsuda ................. H04L 45/12 |
| | | | 709/225 |
| 2015/0006619 | A1 | 1/2015 | Banadaki et al. |
| 2015/0019710 | A1 | 1/2015 | Shaashua et al. |
| 2015/0066646 | A1 | 3/2015 | Sriharsha et al. |
| 2015/0088786 | A1 | 3/2015 | Anandhakrishnan |
| 2015/0178052 | A1 | 6/2015 | Gupta et al. |
| 2015/0254558 | A1 | 9/2015 | Arnold et al. |
| 2015/0269230 | A1 | 9/2015 | Kardes et al. |
| 2015/0295781 | A1 | 10/2015 | Maes |
| 2015/0339210 | A1 | 11/2015 | Kopp et al. |
| 2016/0004827 | A1 | 1/2016 | Silva et al. |
| 2016/0063191 | A1 | 3/2016 | Vesto et al. |
| 2016/0072726 | A1 | 3/2016 | Soni et al. |
| 2016/0098021 | A1 | 4/2016 | Zornio et al. |
| 2016/0098472 | A1 * | 4/2016 | Appleton .......... G06F 17/30424 |
| | | | 707/737 |
| 2016/0098662 | A1 | 4/2016 | Voss et al. |
| 2016/0112531 | A1 * | 4/2016 | Milton ................. G06F 9/5083 |
| | | | 709/205 |
| 2016/0132576 | A1 | 5/2016 | Qi et al. |
| 2016/0179642 | A1 * | 6/2016 | Cai ..................... G06F 11/2033 |
| | | | 714/4.12 |
| 2016/0179979 | A1 | 6/2016 | Aasman et al. |
| 2016/0205106 | A1 | 7/2016 | Yacoub et al. |
| 2016/0241893 | A1 | 8/2016 | Allhands et al. |
| 2016/0267132 | A1 | 9/2016 | Castellanos et al. |
| 2016/0269228 | A1 * | 9/2016 | Franke .................. H04L 41/083 |
| 2016/0337473 | A1 | 11/2016 | Rao |
| 2017/0032263 | A1 | 2/2017 | Yuan et al. |
| 2017/0083573 | A1 * | 3/2017 | Rogers ............. G06F 17/30867 |
| 2017/0187785 | A1 | 6/2017 | Johnson et al. |
| 2018/0054355 | A1 | 2/2018 | Balser et al. |
| 2018/0101583 | A1 * | 4/2018 | Li ........................ G06F 17/3048 |
| 2018/0189296 | A1 * | 7/2018 | Ashour ............. G06F 17/30058 |
| 2018/0308585 | A1 | 10/2018 | Holmes et al. |

OTHER PUBLICATIONS

V.K. Vavilapalli et al., "Apache Hadoop YARN: Yet Another Resource Negotiator," Proceedings of the 4th Annual Symposium on Cloud Computing (SOCC), Article No. 5, Oct. 2013, 16 pages.

A.C. Murthy et al., "Apache Hadoop Yarn: Moving beyond MapReduce and Batch Processing with Apache Hadoop 2," Addison-Wesley Professional, Mar. 29, 2014, 78 pages.

Global Alliance for Genomics and Health, "Beacons," https://genomicsandhealth.org/work-products-demonstration-projects/beacons, Jun. 27, 2014, 2 pages.

Data Working Group, "Global Alliance Genomics API," http://ga4gh.org/#/documentation, Dec. 28, 2015, 2 pages.

Aaron Krol, "Beacon Project Cracks the Door for Genomic Data Sharing," http://www.bio-itworld.com/2015/8/14/beacon-project-cracks-door-genomic-data-sharing.html, Aug. 14, 2015, 3 pages.

U.S. Appl. No. 14/982,341 filed in the name of Patricia Gomes Soares Florissi et al. on Dec. 29, 2015 and entitled "Multi-Cluster Distributed Data Processing Platform."

U.S. Appl. No. 14/982,351 filed in the name of Patricia Gomes Soares Florissi et al. on Dec. 29, 2015 and entitled "Distributed Catalog Service for Multi-Cluster Data Processing Platform."

U.S. Appl. No. 15/395,340 filed in the name of Bryan Duerk et al. on Dec. 30, 2016 and entitled "Data-Driven Automation Mechanism for Analytics Workload Distribution."

Wikipedia, "Apache Spark," https://en.wikipedia.org/wiki/Apache_Spark, Apr. 10, 2017, 6 pages.

U.S. Appl. No. 15/485,843 filed in the name of Patricia Gomes Soares Florissi et al. on Apr. 12, 2017 and entitled "Scalable Distributed-In-Memory Computation."

M.K. Gardner et al., "Parallel Genomic Sequence-Searching on an Ad-Hoc Grid: Experiences, Lessons Learned, and Implications," Proceedings of the 2006 ACM/IEEE SC/06 Conference, IEEE Computer Society, 2006, 14 pages.

(56) References Cited

OTHER PUBLICATIONS

A.G. Craig et al., "Ordering of Cosmid Clones Covering the Herpes Simplex Virus Type I (HSV-I) Genome: A Test Case for Fingerprinting by Hybridisation," Nucleic Acids Research, vol. 18, 1990, pp. 2653-2660.

T.R. Golub et al., "Molecular classification of Cancer: Class Discovery and Class Prediction by Gene Expression Monitoring," Science, vol. 286, Oct. 15, 1999, pp. 531-537.

D. Singh et al., "Gene Expression Correlates of Clinical Prostate Cancer Behavior," Cancer Cell, vol. 1, Mar. 2002, pp. 203-209.

U.S. Appl. No. 15/281,248 filed in the name of Patricia Gomes Soares Florissi et al., on Sep. 30, 2016 and entitled "Methods and Apparatus Implementing Data Model for Disease Monitoring, Characterization and Investigation."

P.P. Jayaraman et al., "Analytics-as-a-Service in a Multi-Cloud Environment Through Semantically-Enabled Hierarchical Data Processing," Software: Practice and Experience, Aug. 2017, pp. 1139-1156, vol. 47, No. 8.

J.Y.L. Lee et al., "Sufficiency Revisited: Rethinking Statistical Algorithms in the Big Data Era," The American Statistician, Dec. 15, 2016, 22 pages.

S. Wang et al., "Genome Privacy: Challenges, Technical Approaches to Mitigate Risk, and Ethical Considerations in the United States," Annals of the New York Academy of Sciences, Jan. 2017, pp. 73-83, vol. 1387, No. 1.

K. Xu et al., "Privacy-Preserving Machine Learning Algorithms for Big Data Systems," IEEE 35th International Conference on Distributed Computing Systems (ICDCS), Jun. 29-Jul. 2, 2015, pp. 318-327.

X. Wu et al., "Privacy Preserving Data Mining Research: Current Status and Key Issues," Proceedings of the 7th International Conference on Computational Science, Part III: ICCS 2007, May 2007, pp. 762-772.

A.P. Kulkarni et al., "Survey on Hadoop and Introduction to YARN," International Journal of Emerging Technology and Advanced Engineering, May 2014, pp. 82-87, vol. 4, No. 5.

\* cited by examiner

SCALABLE DISTRIBUTED IN-MEMORY COMPUTATION UTILIZING BATCH MODE EXTENSIONS

RELATED APPLICATIONS

The present application is a continuation-in-part of U.S. patent application Ser. No. 14/982,341, filed Dec. 29, 2015 and entitled "Multi-Cluster Distributed Data Processing Platform," now U.S. Pat. No. 10,015,106, which is incorporated by reference herein in its entirety, and which claims priority to U.S. Provisional Patent Application Ser. No. 62/143,404, entitled "World Wide Hadoop Platform," and U.S. Provisional Patent Application Ser. No. 62/143,685, entitled "Bioinformatics," both filed Apr. 6, 2015, and incorporated by reference herein in their entirety. The present application also claims priority to U.S. Provisional Application Ser. Nos. 62/378,101 and 62/378,129, both filed Aug. 22, 2016 and entitled "WWH Spark," which are incorporated by reference herein in their entirety.

FIELD

The field relates generally to information processing systems, and more particularly to information processing systems that implement distributed processing across a plurality of processing nodes.

BACKGROUND

The need to extract knowledge from data collected on a global scale continues to grow. In many cases the data may be dispersed across multiple geographic locations, owned by different entities, and in different formats. Although numerous distributed data processing frameworks exist today, these frameworks have significant drawbacks. For example, data-intensive computing tasks often use data processing frameworks such as MapReduce or Spark. However, these frameworks typically require deployment of a distributed file system shared by all of the processing nodes, and are therefore limited to data that is accessible via the shared distributed file system. Such a shared distributed file system can be difficult to configure and maintain over multiple local sites that are geographically dispersed and possibly also subject to the above-noted differences in ownership and data format. In the absence of a shared distributed file system, conventional arrangements may require that data collected from sources in different geographic locations be copied from their respective local sites to a single centralized site configured to perform data analytics. Such an arrangement is not only slow and inefficient, but it can also raise serious privacy concerns regarding the copied data.

SUMMARY

Illustrative embodiments of the present invention provide information processing systems that are configured to distribute in-memory computations over multiple distributed data processing clusters using batch mode extensions.

In one embodiment, an apparatus comprises at least one processing device having a processor coupled to a memory. The processing device is configured to distribute in-memory computations across a plurality of data processing clusters associated with respective data zones, and to combine local processing results of the distributed in-memory computations from respective ones of the data processing clusters. The distributed in-memory computations utilize local data structures of respective ones of the data processing clusters. A given one of the local data structures in one of the data processing clusters receives local data of the corresponding data zone and is utilized to generate the local processing results of that data processing cluster that are combined with local processing results of other ones of the data processing clusters. The local data structures are configured to support one or more batch mode extensions for performance of the distributed in-memory computations.

The in-memory computations in some embodiments illustratively comprise Spark Core batch computations. The one or more batch mode extensions in such embodiments may illustratively comprise at least one of a Spark SQL extension, a Spark MLlib extension and a Spark GraphX extension.

The local data structures illustratively comprise respective portions of a global data structure characterizing the distributed in-memory computations.

The plurality of data processing clusters in a given embodiment may comprise respective YARN clusters, although other types of data processing clusters may be used in other embodiments.

The distribution of in-memory computations across the data processing clusters may be implemented at least in part in a recursive manner. For example, in some embodiments at least one of the local data structures itself comprises a global data structure having a plurality of additional local data structures of respective additional data processing clusters associated therewith.

These and other illustrative embodiments include, without limitation, methods, apparatus, systems, and processor-readable storage media.

DETAILED DESCRIPTION

Illustrative embodiments of the present invention will be described herein with reference to exemplary information processing systems and associated computers, servers, storage devices and other processing devices. It is to be appreciated, however, that embodiments of the invention are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, a plurality of data centers each comprising one or more clouds hosting multiple tenants that share cloud resources.

Figure 1:
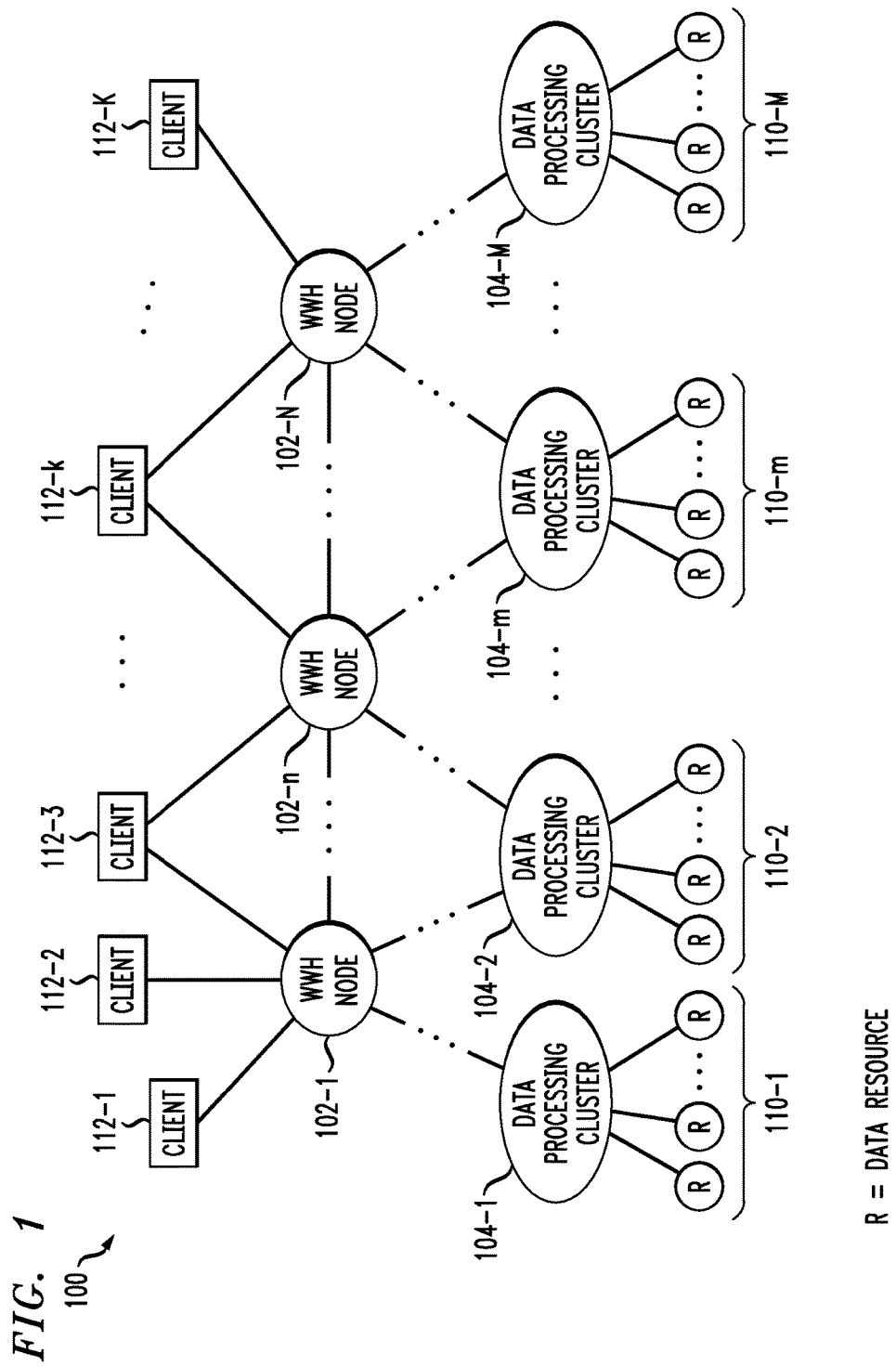
FIG. 1 is a block diagram of an information processing system comprising a multi-cluster distributed data processing platform in an illustrative embodiment of the invention.

FIG. 1 shows an information processing system 100 comprising a multi-cluster distributed data processing platform in an illustrative embodiment. The system 100 comprises a plurality of processing nodes 102, individually denoted as 102-1, . . . 102-n, . . . 102-N, each of which communicates with one or more distributed data processing clusters 104, individually denoted as 104-1, 104-2, . . . 104-m, . . . 104-M.

In some implementations of the FIG. 1 embodiment, one or more of the distributed data processing clusters 104 comprise respective Apache Hadoop YARN ("Yet Another Resource Negotiator") clusters. Apache Hadoop YARN is also referred to as Hadoop 2.0, and is described in, for example, V. K. Vavilapalli et al., "Apache Hadoop YARN: Yet Another Resource Negotiator," Proceedings of the 4th Annual Symposium on Cloud Computing, SOCC '13, pp. 5:1-5:16, ACM, New York, N.Y., USA, 2013, which is incorporated by reference herein. Numerous alternative types of distributed data processing clusters may be used in place of or in addition to Apache Hadoop YARN clusters.

The processing nodes 102 are configured to communicate with one another and with their associated distributed data processing clusters 104 over one or more networks that are not explicitly shown in the figure.

The processing nodes 102 are illustratively implemented as respective worldwide data nodes, and more particularly as respective worldwide Hadoop (WWH) nodes, although numerous alternative processing node types can be used in other embodiments. The WWH nodes are assumed to be configured to perform operations in accordance with any framework supported by Hadoop YARN clusters or other types of clusters comprising respective ones of the distributed data processing clusters 104. Examples of frameworks supported by Hadoop YARN clusters include MapReduce, Spark, Hive, MPI and numerous others.

The acronym WWH as used in conjunction with some embodiments herein is additionally or alternatively intended to refer to a "worldwide herd" arrangement where the term "herd" in this context illustratively connotes multiple geographically-distributed Hadoop platforms. More generally, WWH is used to denote a worldwide data processing platform potentially comprising multiple clusters.

In the FIG. 1 embodiment, the multi-cluster distributed data processing platform more particularly comprises a WWH platform having one or more layers of WWH nodes 102 and a plurality of potentially geographically-distributed data processing clusters 104. Each of the distributed data processing clusters 104 illustratively comprises a corresponding cluster of distributed data processing nodes. The WWH platform is illustratively configured for worldwide scale, geographically-dispersed computations and other types of cluster-based processing based on locally-accessible data resources, as will be described in more detail elsewhere herein.

It is to be appreciated that a wide variety of other types of processing nodes 102 can be used in other embodiments. Accordingly, the use of WWH nodes in the FIG. 1 embodiment and other embodiments disclosed herein is by way of illustrative example only, and should not be construed as limiting in any way.

It should also be noted that one or more of the WWH nodes 102 in some embodiments can be part of a corresponding one of the distributed data processing clusters 104. For example, in some embodiments of a WWH platform as disclosed herein, the distributed data processing clusters 104 themselves each comprise one or more layers of WWH nodes. Accordingly, these and other embodiments need not include a separate layer of WWH nodes 102 above the distributed data processing clusters 104. The WWH nodes 102 may be viewed as examples of what are more generally referred to herein as distributed data processing nodes. The distributed data processing clusters 104 are each also assumed to comprise a plurality of additional or alternative distributed data processing nodes.

Each distributed data processing cluster 104 illustratively includes a resource manager for that cluster. For example, in some embodiments YARN can be used to provide a cluster-wide operating system that allows applications to utilize the dynamic and parallel resource infrastructure a computer cluster offers. However, conventional YARN implementations are generally configured to operate in single-cluster environments, and do not provide any support for managing distributed applications which span across more than one cluster.

The WWH platform in the FIG. 1 embodiment is an example of what is more generally referred to herein as a "multi-cluster distributed data processing platform." This WWH platform and other WWH platforms disclosed herein advantageously extend YARN to multi-cluster environments. For example, the WWH platform in some embodiments is configured to orchestrate the execution of distributed WWH applications on a worldwide scale, across multiple, potentially geographically-distributed YARN clusters. The WWH platform therefore provides a platform for running distributed applications across multiple data zones each having a corresponding YARN cluster.

Other types of multi-cluster distributed data processing platforms may be implemented in other embodiments. Accordingly, references herein to a WWH platform, YARN clusters and associated features are intended as illustrative examples only, and should not be construed as limiting in any way. For example, other embodiments can be implemented without using WWH nodes or YARN clusters. Accordingly, it should be understood that the distributed data processing techniques disclosed herein are more generally applicable to a wide variety of other types of multi-cluster platforms.

Each of the distributed data processing clusters 104 in the system 100 is associated with a corresponding set of local data resources 110, individually denoted as local data resources sets 110-1, 110-2, . . . 110-$m$, . . . 110-M. The local data resource sets each provide one or more local data resources to the corresponding cluster for analytics processing. Results of the processing performed within a given cluster utilizing one or more locally available data resources accessible to that cluster are illustratively provided to one or more other ones of the clusters or to an associated one of the WWH nodes 102 for additional processing associated with provision of analytics functionality within the system 100.

The data resources of each of the sets 110 of data resources are individually identified using the letter R in FIG. 1. Although these data resources are illustratively shown as being external to the distributed data processing clusters 104, this is by way of example only and it is assumed in some embodiments that at least a subset of the data resources of a given set 110 are within the corresponding distributed data processing cluster 104. Accordingly, a given cluster can perform processing operations using a combination of internal and external local data resources.

The results of the analytics processing performed by a given one of the distributed data processing clusters 104 illustratively comprise results of local analytics processing using frameworks such as MapReduce, Spark and numerous others.

It should be understood that the above-noted analytics results are merely examples of what are more generally referred to herein as "processing results" of a given cluster. Such results can take different forms in different embodiments, as will be readily appreciated by those skilled in the art. For example, such processing results can comprise local analytics results that have been processed in a variety of different ways within a cluster before being provided to one of more of the WWH nodes 102 for additional processing. Numerous other types of processing results can be used in other embodiments.

The WWH nodes 102 are each coupled to one or more clients 112. By way of example, the set of clients 112 may include one or more desktop computers, laptop computers, tablet computers, mobile telephones or other types of communication devices or other processing devices in any combination. The clients are individually denoted in the figure as clients 112-1, 112-2, 112-3, . . . 112-$k$, . . . 112-K. The clients 112 may comprise, for example, respective end users or associated hardware entities, software entities or other equipment entities. For example, a "client" as the term is broadly used herein can comprise a software-implemented entity running on a user device or other processing device within the system 100.

The variables N, M and K denote arbitrary values, as embodiments of the invention can be configured using any desired number of WWH nodes 102, distributed data processing clusters 104 and clients 112. For example, some embodiments may include multiple distributed data processing clusters 104 and multiple clients 112 but only a single WWH node 102, or multiple WWH nodes 102 corresponding to respective ones of the distributed data processing clusters 104. Numerous alternative arrangements are possible, including embodiments in which a single system element combines functionality of at least a portion of a WWH node and functionality of at least a portion of a distributed data processing cluster. Thus, alternative embodiments in which the functions of a WWH node and a distributed data processing cluster are at least partially combined into a common processing entity are possible.

The WWH nodes 102 in some embodiments are implemented at least in part as respective analysis nodes. The analysis nodes may comprise respective computers in a cluster of computers associated with a supercomputer or other high performance computing (HPC) system. The term "processing node" as used herein is intended to be broadly construed, and such nodes in some embodiments may comprise respective compute nodes in addition to or in place of providing analysis node functionality.

The system 100 may include additional nodes that are not explicitly shown in the figure. For example, the system 100 may comprise one or more name nodes. Such name nodes may comprise respective name nodes of a Hadoop Distributed File System (HDFS), although other types of name nodes can be used in other embodiments. Particular objects or other stored data of a storage platform can be made accessible to one or more of the WWH nodes 102 via a corresponding name node. For example, such name nodes can be utilized to allow the WWH nodes 102 to address multiple HDFS namespaces within the system 100.

Each of the WWH nodes 102 and distributed data processing clusters 104 is assumed to comprise one or more databases for storing analytics processing results and possibly additional or alternative types of data.

Databases associated with the WWH nodes 102 or the distributed data processing clusters 104 and possibly other elements of the system 100 can be implemented using one or more storage platforms. For example, a given storage platform can comprise any of a variety of different types of storage including network-attached storage (NAS), storage area networks (SANs), direct-attached storage (DAS), distributed DAS and software-defined storage (SDS), as well as combinations of these and other storage types.

A given storage platform may comprise storage arrays such as VNX® and Symmetrix VMAX® storage arrays, both commercially available from Dell EMC of Hopkinton, Mass. Other types of storage products that can be used in implementing a given storage platform in an illustrative embodiment include software-defined storage products such as ScaleIO™ and ViPR®, server-based flash storage devices such as DSSD™, cloud storage products such as Elastic Cloud Storage (ECS), object-based storage products such as Atmos, scale-out all-flash storage arrays such as XtremIO™, and scale-out NAS clusters comprising Isilon® platform nodes and associated accelerators in the S-Series, X-Series and NL-Series product lines, all from Dell EMC. Combinations of multiple ones of these and other storage products can also be used in implementing a given storage platform in an illustrative embodiment.

Additionally or alternatively, a given storage platform can implement multiple storage tiers. For example, a storage platform can comprise a 2 TIERS™ storage system, also from Dell EMC.

These and other storage platforms can be part of what is more generally referred to herein as a processing platform comprising one or more processing devices each comprising a processor coupled to a memory.

A given processing device may be implemented at least in part utilizing one or more virtual machines or other types of virtualization infrastructure such as Docker containers or other types of Linux containers (LXCs). The WWH nodes 102 and distributed data processing clusters 104, as well as other system components, may be implemented at least in part using processing devices of such processing platforms.

Communications between the various elements of system 100 may take place over one or more networks. These networks can illustratively include, for example, a global computer network such as the Internet, a wide area network (WAN), a local area network (LAN), a satellite network, a telephone or cable network, a cellular network, a wireless network implemented using a wireless protocol such as WiFi or WiMAX, or various portions or combinations of these and other types of communication networks.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

It is to be appreciated that the particular arrangement of system elements shown in FIG. 1 is for purposes of illustration only, and that other arrangements of additional or alternative elements can be used in other embodiments. For example, numerous alternative system configurations can be used to implement multi-cluster distributed data processing functionality as disclosed herein. Accordingly, the particular arrangements of layers, nodes and clusters shown in the FIG. 1 embodiment and other embodiments herein are presented by way of example only, and should not be construed as limiting in any way.

Additional details regarding example processing functionality that may be incorporated in at least a subset of the WWH nodes in illustrative embodiments are described in U.S. Pat. No. 9,020,802, entitled "Worldwide Distributed Architecture Model and Management," and U.S. Pat. No. 9,158,843, entitled "Addressing Mechanism for Data at World Wide Scale," which are commonly assigned herewith and incorporated by reference herein.

The WWH platform in the FIG. 1 embodiment and one or more other embodiments disclosed herein illustratively adheres to local processing within each cluster using data locally accessible to that cluster. This is achieved without the need for implementing a distributed file system over the multiple clusters. Also, movement of data resources between clusters is avoided. Instead, data resources are processed locally within their respective clusters.

This orchestration of distributed applications over multiple clusters is facilitated in illustrative embodiments through the use of what is referred to herein as a WWH catalog. The WWH catalog is a catalog of data resources, and is an example of what is more generally referred to herein as a "distributed catalog service."

In some embodiments, each cluster that is part of the WWH platform has access to or otherwise comprises an instance of the WWH catalog implemented for that cluster. The WWH catalog instance implemented for a given cluster illustratively contains detailed information regarding local data resources of that cluster, such as, for example, file names and metadata about the files and their content, and references to one or more other clusters in the case of a non-local resource. This creates a hierarchical structure to execution of a WWH application within the WWH platform.

It should be noted that each cluster need not include its own instance of the WWH catalog. For example, in some embodiments, only a subset of the clusters of a multi-cluster distributed data processing platform implement respective instances of a distributed WWH catalog. In such an arrangement, clusters that do not include respective WWH catalog instances can nonetheless participate in performance of computations associated with a distributed WWH application.

A WWH application identifies data files and other input data items from among the various data resources characterized by the WWH catalog. A given such input data item can more particularly comprise, for example, a text file, an XML file, a result relation of a database query or a result of an API query.

Data resources characterized by the WWH catalog can be considered global in the sense that clients are oblivious to the particular location of the resource. For example, a given resource can be comprised of several other resources, each residing in a different data zone. A meta-resource is a piece of data that describes a corresponding data resource. It generally includes the location of the resource and information about how to access the resource.

The WWH catalog is distributed over the clusters of the WWH platform with each of the clusters having visibility of only its corresponding instance of the WWH catalog. In some embodiments, the distributed instances of the WWH catalog are implemented as respective YARN applications running on respective ones of the clusters of the WWH platform.

A given instance of the WWH catalog on a corresponding one of the clusters typically comprises a plurality of entries with each such entry comprising a meta-resource including information characterizing location and accessibility of a corresponding one of the data resources.

By way of example, the meta-resource for a given local data resource may comprise a file path to a storage location of that local data resource in the corresponding cluster. Also by way of example, the meta-resource for a given remote data resource may comprise information identifying another cluster for which that data resource is a local data resource.

A given meta-resource of the WWH catalog may additionally or alternatively comprise one or more other types of information, such as, for example, information regarding transformation of the data resource into one or more designated formats, access control information, policy rules, etc.

The WWH catalog therefore illustratively provides a catalog of entries, each comprising a meta-resource. Each meta-resource describes the respective resource and may contain the code or an API required to transform the resource to the format required by the application. End users or other types of clients may browse the WWH catalog via a browsing API or other type of browsing interface in order to obtain information about meta-resources, and WWH applications may query it for information about how to access the data. As noted above, the WWH catalog is assumed to be distributed across multiple data zones and their respective clusters. Such a distributed arrangement helps to provide security and privacy for the underlying data resources.

Although distributed implementations of the WWH catalog are advantageous in some embodiments, it is possible in other embodiments for the WWH catalog to be implemented in only a single cluster of a WWH platform. Other alternative implementations may include distributed implementations in which the WWH catalog is distributed over only a subset of the clusters of a WWH platform, rather than over all of the clusters of the WWH platform.

The WWH platform and its associated WWH catalog in illustrative embodiments implement a recursiveness property that allows a given distributed application initiated on one of the clusters to initiate additional applications on respective additional ones of the clusters. Those additional applications can similarly initiate more applications on other ones of the clusters different than the clusters on which the additional applications were initiated. In this manner, a distributed application can be executed utilizing local data resources of multiple clusters while preserving the privacy of each of the clusters in its local data resources.

In some embodiments, security measures are deployed that prevent the data zones from being accessible to the outside world. For example, firewalls, routers and gateways may prevent public access to a cluster of a given data zone, allowing access to the cluster only from within a certain access point. The WWH platform in illustrative embodiments is configured to allow such "hidden" data zones to take part in both sharing data and computation.

A WWH platform configured to run applications across multiple clusters associated with respective distinct data zones is advantageous in terms of both privacy and performance. Privacy is provided in that an application submitted to an initial cluster corresponding to a specific data zone accesses the data local to that data zone. The results of the application execution in the initial cluster may be transferred to other clusters corresponding to respective other data zones, but such processing results are typically aggregated and therefore need not include any private information. Furthermore, the recursiveness property mentioned above can in some embodiments be configured so as to hide even the knowledge of which of the clusters participate in the application execution. For similar reasons, performance is greatly improved. Usually raw data stays in its original location and only the results which are of much smaller size may be transferred between clusters. This contributes to improved performance both because of the inherent parallelism and the reduced data transfer between clusters.

As is apparent from the above, the overall privacy and efficiency of the WWH platform is maintained in some embodiments by adhering to local processing within clusters and their associated data zones. In order to keep the processing local, the WWH catalog includes meta-resources that direct the computation to the cluster where the data is stored, such that the computation moves and the data does not.

The WWH platform in illustrative embodiments provides significant advantages relative to conventional systems. For example, the WWH platform in some embodiments is oblivious to the particular local file systems utilized in the respective clusters. Moreover, the WWH platform keeps local raw data private within each of the clusters, does not need a centralized controller or scheduler, and is not limited to use with only the MapReduce framework but is more generally suitable for use with any of a wide variety of frameworks that are supported by YARN, as well as additional or alternative frameworks in non-YARN embodiments.

The WWH platform in some embodiments utilizes a distributed WWH catalog having instances accessible to respective ones of the clusters, and is thus agnostic to where exactly the data resides, and its exact format, and does not require a global file system.

The WWH platform in some embodiments is strongly privacy aware. It supports and encourages local processing of local data and provides simple ways for sending intermediate processing results which do not contain private information between clusters.

The WWH platform can provide similar advantages for other aspects of Governance, Risk and Compliance (GRC). For example, by pushing processing closer to where the data is located, the WWH platform facilitates enforcement of policies relating to governance, management of risk, and compliance with regulatory requirements, all at the local level.

The WWH platform supports multiple data zones. A data zone is illustratively a distinct data processing cluster with its own local data. Such a data zone may execute a YARN application such as a MapReduce application on its local data. The WWH platform provides a framework which spans across multiple data zones, and enables the combination of processing results based on local data resources of the respective data zones in a global manner. Thus, the WWH platform provides and encourages cooperation between different data zones. However, the WWH platform does not encourage moving raw data between data zones, for both performance and privacy reasons, as well as for other related reasons such as the above-noted facilitation of GRC at the local level.

The WWH platform in some embodiments has an open architecture in the sense that any data processing cluster can join the WWH platform, and therefore the WWH platform in such an embodiment does not require any single centralized controller. Every participating cluster is in control of the data it wishes to share with the outside world. An authorized external client can connect to any data zone supported by the WWH platform and there is no single entry point.

The WWH platform can be illustratively implemented utilizing YARN applications. For example, when a client wishes to run a WWH application it contacts a first one of the clusters, and runs a YARN application on that cluster. When other clusters need to be contacted, one or more containers of the first cluster act like respective clients for the other clusters, and run YARN applications on those other clusters. Thus in each individual cluster the distributed WWH application is seen as an individual YARN application and YARN itself is not aware of the multiple data zone aspects of the WWH application or the WWH platform.

Like YARN itself, the WWH platform in some embodiments is functionally separated into a platform layer and a framework layer. The WWH framework layer can be configured to support WWH frameworks for executing WWH applications that utilize any of a wide variety of underlying YARN frameworks. A developer can write WWH frameworks, and clients will be able to use those WWH frameworks, in a manner similar to how YARN frameworks such as MapReduce or Spark are utilized on single clusters. For example, some embodiments of WWH platforms described herein are provided with a WWH framework for running MapReduce applications in different data zones associated with respective multiple YARN clusters and using a global reducer in a particular YARN cluster to compute the final results. Alternatively, the global reducer can be implemented at least in part outside of the YARN clusters, such as within a given one of the WWH nodes.

As indicated above, however, WWH platforms are not limited to use with YARN clusters, and can more generally comprise other types of distributed data processing clusters in addition to or in place of YARN clusters.

Additional details regarding WWH platforms that can be used in the FIG. 1 embodiment and other embodiments of the present invention are disclosed in U.S. patent application Ser. No. 14/982,341, filed Dec. 29, 2015 and entitled "Multi-Cluster Distributed Data Processing Platform," now U.S. Pat. No. 10,015,106, and U.S. patent application Ser. No. 14/982,351, filed Dec. 29, 2015 and entitled "Distributed Catalog Service for Multi-Cluster Data Processing Platform," each incorporated by reference herein in its entirety. These U.S. patent applications each claim priority to U.S. Provisional Patent Application Ser. No. 62/143,404, entitled "World Wide Hadoop Platform," and U.S. Provisional Patent Application Ser. No. 62/143,685, entitled "Bioinformatics," both filed Apr. 6, 2015, and also incorporated by reference herein in their entirety.

Each data zone in a given embodiment illustratively comprises a Hadoop YARN cluster or other type of cluster configured to support one or more distributed data processing frameworks, such as MapReduce and Spark. These and other similar arrangements can be advantageously configured to provide analytics functionality in a decentralized and privacy-preserving manner, so as to overcome the above-noted drawbacks of conventional systems. This is achieved in some embodiments by orchestrating execution of distributed applications across the multiple YARN clusters. Computations associated with data available locally within a given YARN cluster are performed within that cluster. Accordingly, instead of moving data from local sites to a centralized site, computations are performed within the local sites where the needed data is available. This provides significant advantages in terms of both performance and privacy. Additional advantages are provided in terms of security, governance, risk and compliance.

For example, some embodiments provide WWH platforms that are faster and more efficient than conventional analytics systems. Moreover, multi-cluster distributed data processing platforms in some embodiments are implemented in a decentralized and privacy-preserving manner. These and other multi-cluster distributed data processing platforms advantageously overcome disadvantages of conventional practice, which as indicated previously often rely on copying of local data to a centralized site for analysis, leading to privacy and performance concerns.

In some embodiments, a multi-cluster distributed data processing platform is configured to leverage Big Data profiles and associated Big Data analytics in processing local and remote data resources across multiple geographic regions or other types of data zones.

Additional details regarding Big Data profiles and associated Big Data analytics that can be implemented in illustrative embodiments of the present invention are described in U.S. Pat. No. 9,031,992, entitled "Analyzing Big Data," which is commonly assigned herewith and incorporated by reference herein.

A multi-cluster distributed data processing platform in an illustrative embodiment can utilize the data scattered across multiple regional data centers located worldwide, while preserving data privacy and adjusting for differences in data formats and other factors between the various data centers.

A WWH platform in some embodiments leverages one or more frameworks supported by Hadoop YARN, such as MapReduce, Spark, Hive, MPI and numerous others, to support distributed computations while also minimizing data movement, adhering to bandwidth constraints in terms of speed, capacity and cost, and satisfying security policies as well as policies relating to governance, risk management and compliance.

As is apparent from the foregoing, illustrative embodiments include information processing systems that are configured to distribute analytics workloads and other types of workloads over multiple distributed data processing node clusters. Such embodiments may comprise WWH platforms of the type described above.

Additional illustrative embodiments implementing scalable distributed in-memory computation functionality will now be described with reference to FIGS. 2 through 9. In some embodiments, the distributed in-memory computations comprise Spark Core batch computations, but it is to be appreciated that the disclosed techniques are applicable to other types of computations associated with other types of distributed in-memory processing.

Figure 2:
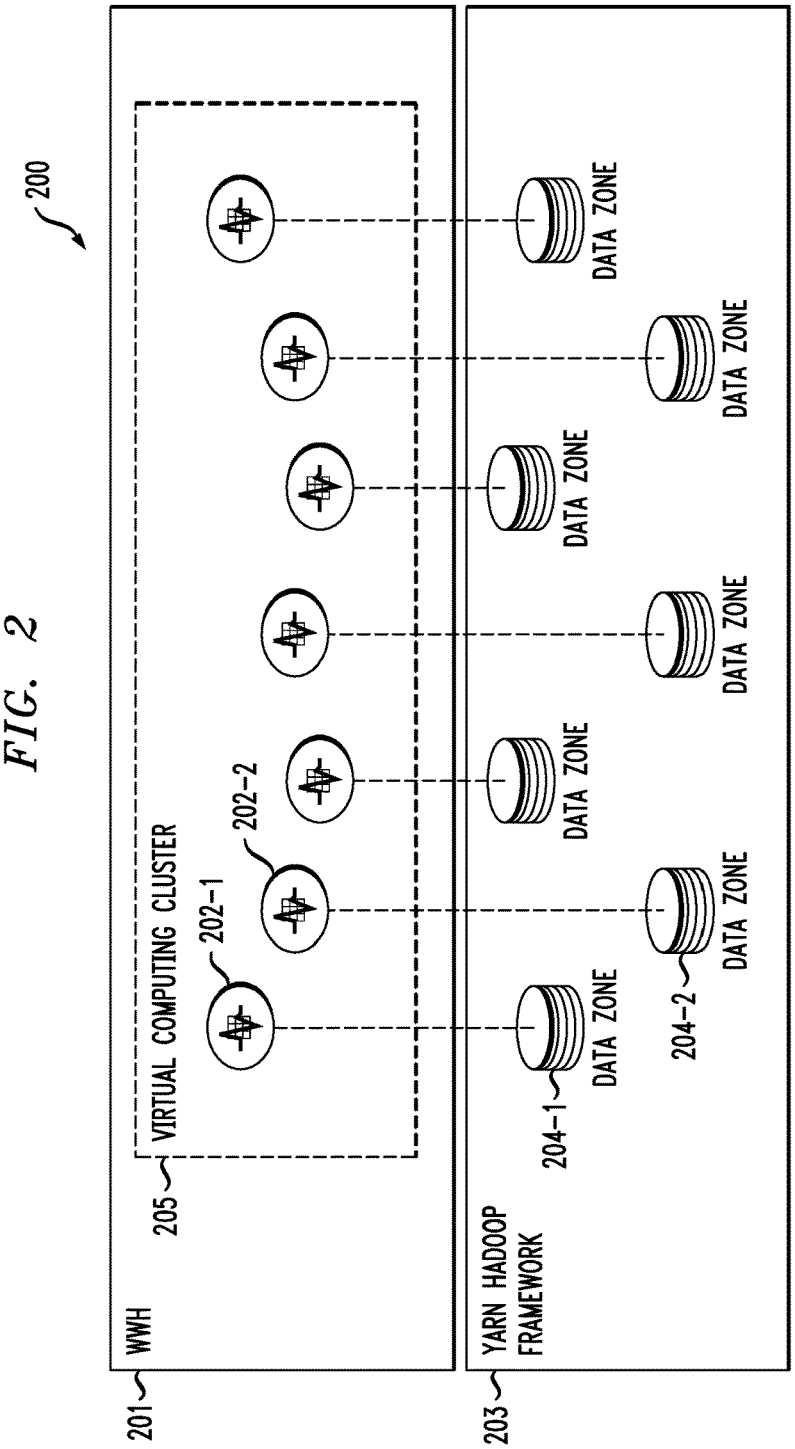
FIG. 2 shows an information processing system comprising a virtual computing cluster in another illustrative embodiment.

Referring now to FIG. 2, an information processing system 200 comprises a multi-cluster distributed data processing platform in an illustrative embodiment. The distributed data processing platform in this embodiment may be viewed as an example of what is also referred to herein as a WWH platform. The system 200 comprises a WWH node layer 201 that includes multiple WWH nodes 202 such as WWH nodes 202-1 and 202-2. The WWH platform further comprises a YARN cluster layer 203 that includes multiple YARN clusters 204 such as YARN cluster 204-1 and YARN cluster 204-2. The WWH nodes 202 are associated with respective ones of the YARN clusters 204.

The YARN clusters 204 in the FIG. 2 embodiment are examples of what are more generally referred to herein as "distributed processing node clusters." Thus, like the distributed data processing clusters 104 of the FIG. 1 embodiment, each of the YARN clusters 204 is assumed to include a cluster of multiple computers or other processing devices. Other types of distributed processing node clusters can be used in other embodiments. The use of Hadoop YARN in the FIG. 2 embodiment is by way of example only, and other embodiments need not utilize Hadoop YARN.

Also, although single layers 201 and 203 of respective sets of WWH nodes 202 and YARN clusters 204 are shown in this figure, other embodiments can include multiple layers of WWH nodes, multiple layers of YARN clusters, or both multiple layers of WWH nodes and multiple layers of YARN clusters.

In the information processing system 200, there is a one-to-one correspondence between the WWH nodes 202 and the respective YARN clusters 204, although this is also by way of illustrative example only. In other embodiments, a given WWH node may be associated with multiple YARN clusters. Additionally or alternatively, a given YARN cluster can be associated with multiple WWH nodes.

It is also possible that one or more of the WWH nodes 202 may each comprise a data processing node of the corresponding YARN cluster 204. Thus, in some embodiments, the separate layers 201 and 203 of the FIG. 2 embodiment are merged into a single layer of YARN clusters one or more of which each include one or more WWH nodes. Such an arrangement is considered yet another illustrative example of a WWH platform, or more generally a multi-cluster distributed data processing platform, as those terms are broadly utilized herein.

The YARN clusters 204 in the FIG. 2 embodiment are assumed to be associated with respective distinct data zones. Each of the YARN clusters 204 is configured to perform processing operations utilizing local data resources locally accessible within its corresponding data zone. The YARN clusters as illustrated in the figure illustratively comprise respective processing platforms including various arrangements of multi-node clouds, virtual infrastructure components such as virtual machines (VMs) and virtual networks, Isilon® platform nodes, and other example arrangements of distributed processing nodes.

By way of example, at least a subset of the YARN clusters 204 may comprise respective geographically-distributed regional data centers each configured to perform analytics processing utilizing the locally accessible data resources of its corresponding data zone. Additional or alternative types of boundaries may be used to separate the system 200 into multiple data zones. Accordingly, geographical distribution of the data zones and their respective clusters is not required.

In some embodiments, the data required for execution of analytics applications and other types of applications in system 200 is scattered across many sites or clouds, potentially scattered around the world, where each location only has visibility to its own datasets. These sites or clouds are examples of data zones.

It may be assumed in some implementations of system 200 that the datasets each site or cloud collects are locked into the corresponding data zone, meaning that a given dataset cannot move outside of the boundaries of the associated site or cloud. There may be a variety of factors preventing the data from moving, including a data size that imposes severe bandwidth delays or transmission costs, privacy issues that prohibit the data from being shared outside the data zone, or GRC regulatory requirements mandating that the data remain within the data zone.

The WWH platform in this embodiment provides a mechanism to orchestrate the distribution and parallel execution of computations across data zones, allowing for all the data residing across these data zones to be analyzed without requiring that all the data be moved to a single cluster.

More particularly, the WWH nodes 202 of the WWH node layer 201 collectively provide a virtual computing cluster 205 within the system 200. Each of the separate data zones of the YARN cluster layer 203 in this embodiment is by way of illustrative example associated with a single corresponding one of the WWH nodes 202. These WWH nodes 202 comprise respective virtual nodes of the virtual computing cluster 205. The WWH platform in this embodiment therefore provides an abstraction in which the data zones of the YARN cluster layer 203 correspond to respective virtual nodes within the virtual computing cluster 205.

The WWH platform in the FIG. 2 embodiment is illustratively configured to allow a given analytics application or other type of application to treat multiple, distributed YARN clusters as a single, virtual computing cluster. The WWH platform in these and other embodiments handles the details of distributing the required computations to subsidiary, potentially geographically or otherwise separated clusters as required.

The WWH nodes 202 illustratively utilize processing results from one or more of the YARN clusters 204 in orchestrating distributed applications over multiple YARN clusters in the system 200. This is achieved in a manner that preserves the privacy of those clusters in their respective local data resources. For example, processing results from a given one of the clusters may be permitted to be transmitted to another one of the clusters while the local data resources of the given cluster that are utilized to obtain the processing results are not permitted to be transmitted to another one of the clusters.

The WWH layer 201 in some implementations of the system 200 may be viewed as comprising an "analytics layer" of the system. The YARN clusters 204 can be interconnected in different ways at that analytics layer through use of different connections between the WWH nodes 202. For example, each of the WWH nodes 202 of the WWH layer 201 may be interconnected with one or more other ones of the WWH nodes 202.

It is to be appreciated that, in the FIG. 2 embodiment, any of the WWH nodes 202 can initiate a distributed application on its corresponding one of the YARN clusters 204 and that distributed application can subsequently initiate multiple additional applications involving respective additional ones of the clusters.

In one example of an operating mode of the system 200, a computation is initiated in one of the virtual nodes of the virtual computing cluster 205, and at least portions of this computation are propagated to one or more other virtual nodes within the virtual computing cluster 205 that should participate in the computation. Local computations are performed within corresponding ones of the data zones of the YARN cluster layer 203. Upon completion of their respective local computations, the data zones send their results back to the initiating node, where a global computation is performed. The results may be defined in the form of key-value pairs or in numerous other formats.

It should be noted that, in some embodiments, a given local computation in a particular one of the YARN clusters 204 may itself be distributed across multiple nodes in respective other ones of the YARN clusters 204, with the results being aggregated and returned to the particular YARN cluster.

Again, the particular arrangements of layers, nodes and clusters shown in FIG. 2 are presented by way of example only, and should not be construed as limiting in any way.

The WWH platform in the FIG. 2 embodiment and one or more other embodiments disclosed herein illustratively adheres to local processing within each cluster using data locally accessible to that cluster. This is achieved without the need for implementing a distributed file system over the multiple clusters. Also, movement of data resources between clusters is avoided. Instead, data resources are processed locally within their respective YARN clusters. This orchestration of distributed applications over multiple YARN clusters is facilitated in illustrative embodiments through the use of the above-noted WWH catalog or other types of distributed catalog services.

Figure 3:
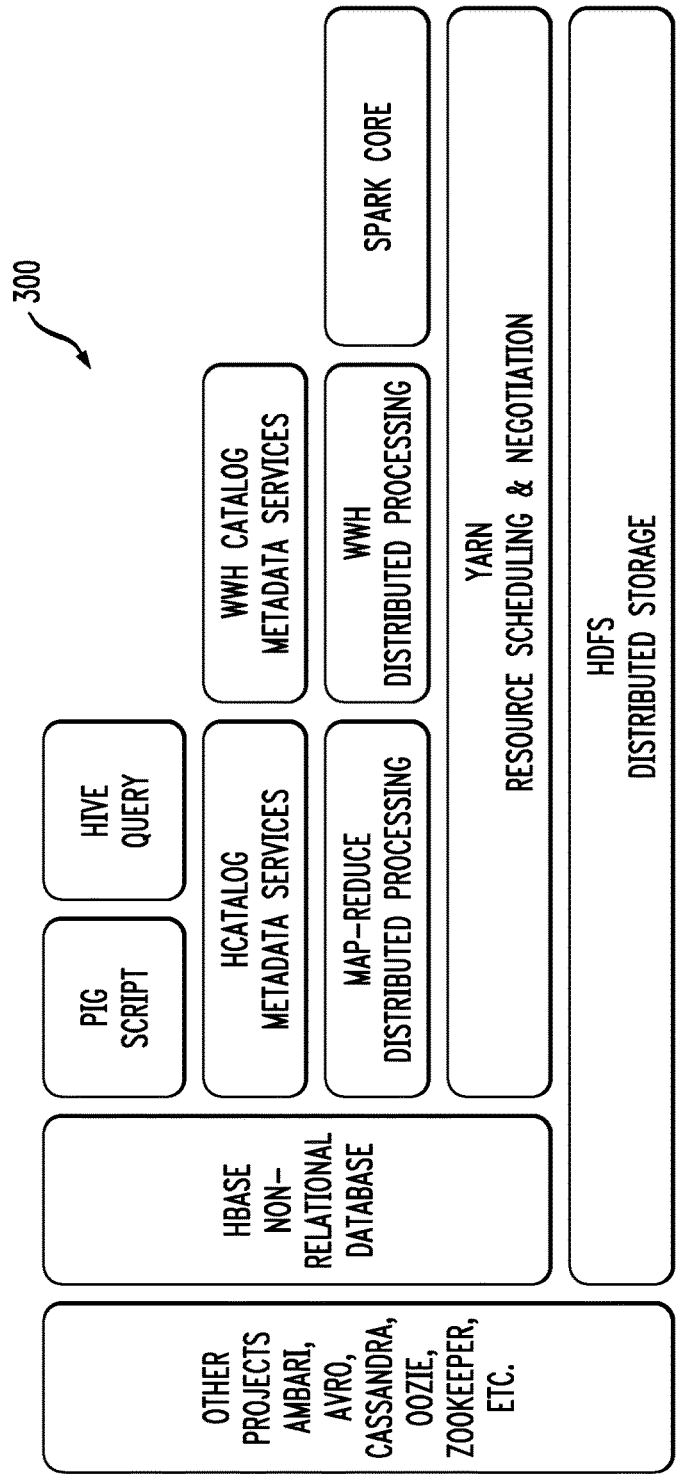
FIG. 3 is a stack diagram showing relationships between components of an information processing system with scalable distributed in-memory computation functionality in an illustrative embodiment.

FIG. 3 is a stack diagram showing relationships between components of an information processing system 300 with scalable distributed in-memory computation functionality in an illustrative embodiment. This diagram illustrates an example stack architecture in which a WWH distributed processing component interacts with a Spark Core component in distributing in-memory Spark Core batch computations across underlying YARN clusters of a YARN resource scheduling and negotiation component. Associated with the WWH distributed processing component is a WWH catalog metadata services component of the type described previously herein. The WWH distributed processing component also supports MapReduce distributed processing using the underlying YARN clusters of the YARN resource scheduling and negotiation component. Also included in the system 300 are components associated with HDFS distributed storage, HBase non-relational databases, HCatalog metadata services, Pig scripts, and Hive queries, as well as additional or alternative components associated other projects that can utilize the WWH framework of the system 300, including by way of example Ambari, Avro, Cassandra, Oozie and Zookeeper.

The layered architecture of the system 300 provides extension of the WWH framework to support Spark applications. Spark performs in-memory computations utilizing resilient distributed datasets (RDDs). Spark generally provides a distributed data processing engine that can operate in multiple modes, such as batch, interactive and streaming modes, and that implements additional functionality such as SQL query processing, graph processing and machine learning. Although some illustrative embodiments described herein focus on Spark processing in the batch mode of operation, it is to be appreciated that the WWH framework can also be extended to support other types of Spark applications running in other operating modes, such as interactive and streaming modes.

In the FIG. 3 embodiment, the WWH distributed processing component of system 300 is configured to interact with the Spark Core component. Such an arrangement illustratively involves distributing Spark computations across multiple clusters, allowing the computations to benefit from the principle of data locality. For example, a given computation may be performed as close as possible to the needed data, thereby minimizing data movement and preserving privacy, as only the results of the given computation are shared beyond the corresponding data zone, and not the original data itself.

Figure 4:
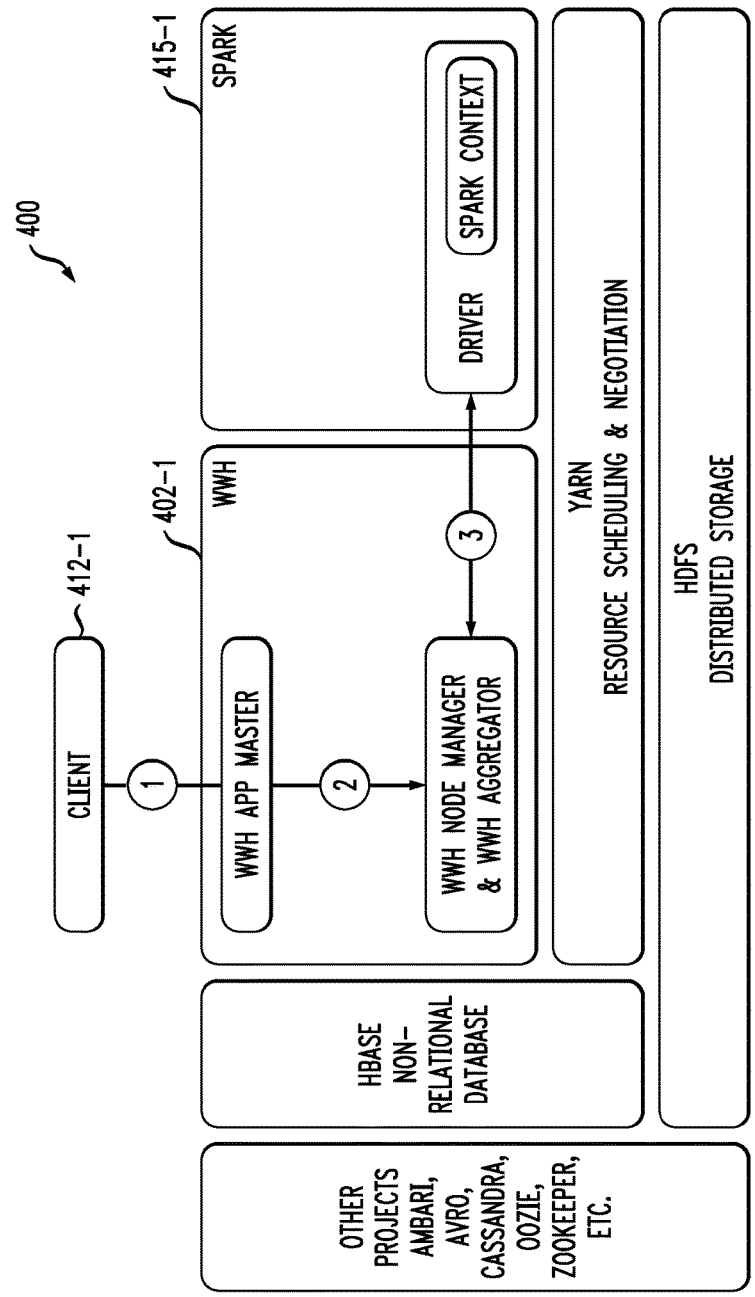
FIG. 4 shows example interactions between WWH and Spark components in an illustrative embodiment.

FIG. 4 illustrates another embodiment of an information processing system 400 with scalable distributed in-memory computation functionality. The system 400 includes a WWH component 402-1, a client 412-1 and a Spark component 415-1.

The WWH component 402-1 may comprise at least a portion of one or more WWH nodes of a WWH platform of the type previously described. Additionally or alternatively, it may comprise at least portions of one or more distributed data processing clusters. The WWH component 402-1 includes a WWH application master, as well as a WWH node manager and a WWH aggregator. The WWH application master is an example of what is more generally referred to herein as a "distributed processing application master."

The WWH component 402-1 communicates with the client 412-1 over one or more networks. For example, the client 412-1 can be implemented on a client device that is separate from the node or nodes that implement at least portions of the WWH component 402-1. It is also possible that the client 412-1 can be implemented at least in part on the same processing device or set of processing devices that implements at least a portion of the WWH component 402-1.

The WWH component 402-1 is configured to interact with the Spark component 415-1. The Spark component 415-1 comprises a Spark Core driver program providing Spark context support. The Spark Core driver program is an example of what is more generally referred to herein as an "in-memory processing driver."

The diagram of FIG. 4 also illustrates a number of processing operations performed within the system 400. The operations are labeled 1 through 3 in the figure, and more specifically include the following:

1. Client 412-1 initiates a Spark application involving distributed in-memory computations by communicating with WWH application master of WWH component 402-1.

2. Within the WWH component 402-1, the WWH application master communicates with the WWH node manager and WWH aggregator.

3. The WWH node manager and WWH aggregator of WWH component 402-1 interacts with the Spark Core driver of the Spark component 415-1.

These particular operations and others referred to herein are presented by way of illustrative example only and can be varied in other embodiments.

Figure 5:
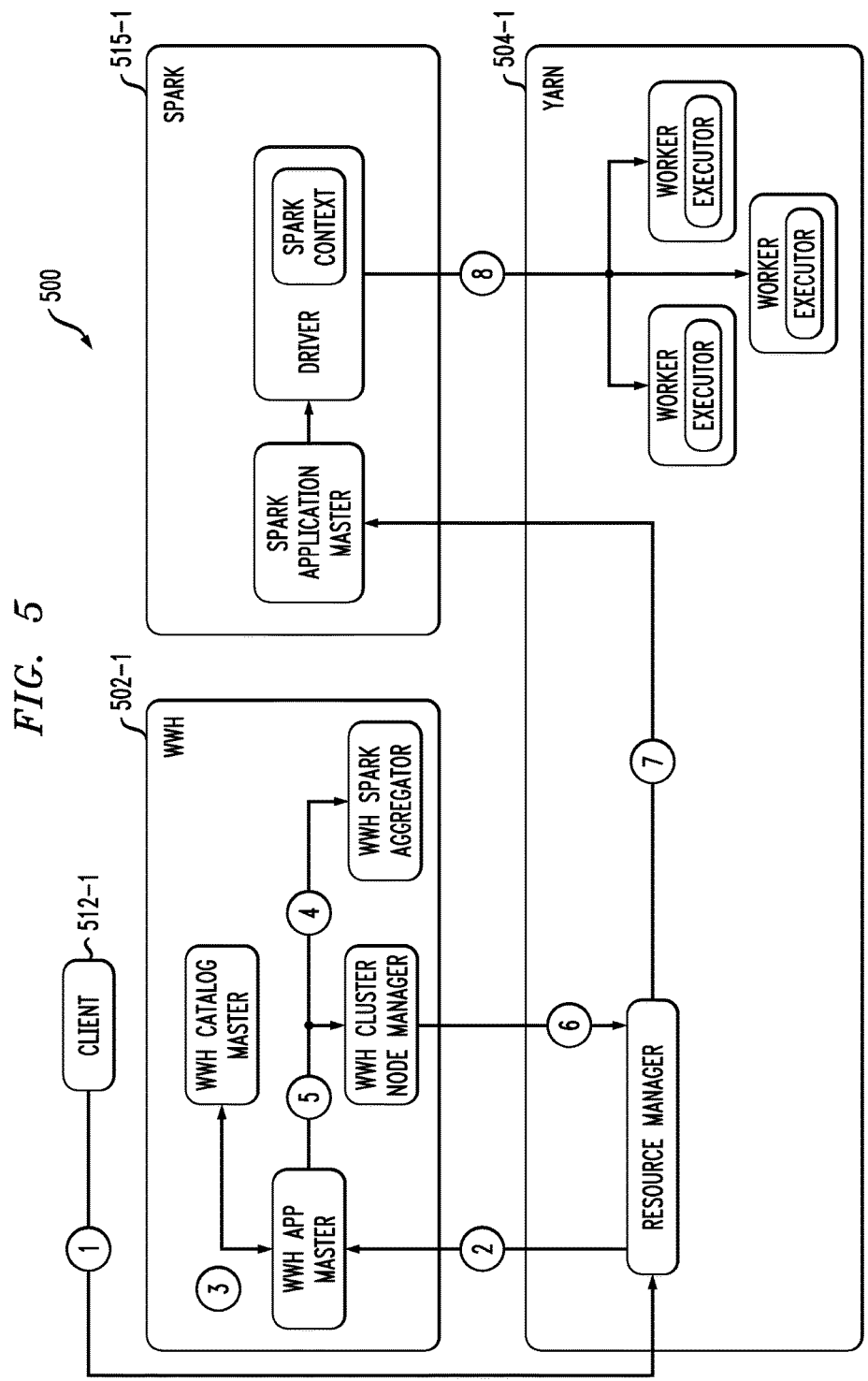
FIG. 5 shows a more detailed view of interactions between WWH, Spark and YARN components in a single cluster of a multi-cluster distributed data processing platform in an illustrative embodiment.

FIG. 5 shows a more detailed view of interactions between WWH, Spark and YARN components in a single cluster of a multi-cluster distributed data processing platform in an illustrative embodiment. In this embodiment, information processing system 500 comprises WWH component 502-1, YARN component 504-1, client 512-1 and Spark component 515-1. It is assumed that the WWH component 502-1, YARN component 504-1 and Spark component 515-1 are part of or otherwise associated with only a single cluster of a plurality of clusters of a WWH platform.

The WWH component 502-1 in this embodiment comprises a WWH application master, a WWH catalog master, a WWH cluster node manager and a WWH Spark aggregator.

The YARN component 504-1 comprises a resource manager and multiple worker components each having an associated executor.

The Spark component 515-1 comprises a Spark application master and a Spark Core driver supporting Spark context.

The resource manager of the YARN component 504-1 is coupled to the Spark Core driver via the Spark application master. The resource manager is also coupled to the WWH application master and the WWH cluster node manager of the WWH component 502-1.

The WWH application master of the WWH component 502-1 and the Spark Core driver of the Spark component 515-1 are therefore configured to communicate with one another via the resource manager of the YARN component 504-1.

The diagram of FIG. 5 also illustrates a number of processing operations performed within the system 500. The operations are labeled 1 through 8 in the figure, and more specifically include the following:

1. Client 512-1 initiates a Spark application involving distributed in-memory computations by communicating with the resource manager of the YARN component 504-1.

2. The resource manager of the YARN component 504-1 communicates with the WWH application master of the WWH component 502-1.

3. Within the WWH component 502-1, the WWH application master communicates with the WWH catalog master.

4. The WWH application master communicates with the WWH Spark aggregator.

5. The WWH application master communicates with the WWH cluster node manager.

6. The WWH cluster node manager communicates with the resource manager of the YARN component 504-1.

7. The resource manager communicates with the Spark Core driver of the Spark component 515-1 via the Spark application master.

8. The Spark Core driver interacts with multiple worker components of the YARN component 504-1 in order to execute in-memory computations within the single cluster of the system 500.

As in the previous embodiment, these particular operations are presented by way of illustrative example only and can be varied in other embodiments.

Figure 6:
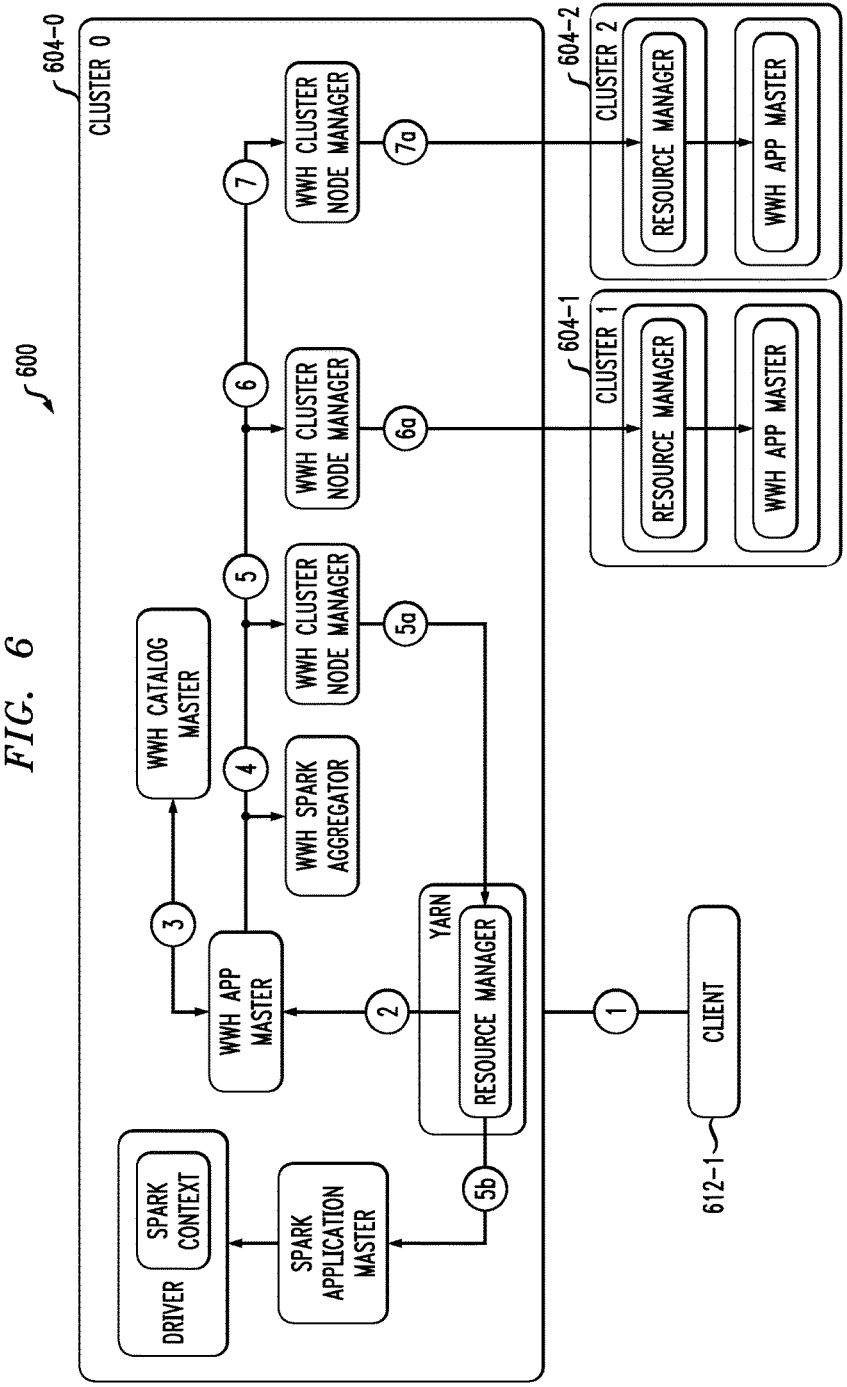
FIG. 6 shows a more detailed view of interactions between WWH, Spark and YARN components in multiple clusters of a multi-cluster distributed data processing platform in an illustrative embodiment.

FIG. 6 shows a more detailed view of interactions between WWH, Spark and YARN components in multiple clusters of a multi-cluster distributed data processing platform in an illustrative embodiment. In this embodiment, information processing system 600 comprises a plurality of distributed data processing clusters 604-0, 604-1 and 604-2, also denoted as Cluster 0, Cluster 1 and Cluster 2, respectively. The system 600 further comprises a client 612-1 that is in communication with the cluster 604-0. The client 612-1 may be implemented on a separate processing device that is coupled to the cluster 604-0 via one or more networks that are not explicitly shown. Alternatively, the client 612-1 can be implemented at least in part on one of the nodes of the cluster 604-0.

The cluster 604-0 is designated as a "local" cluster relative to the client 612-1 in this embodiment and the other clusters 604-1 and 604-2 are therefore referred to as respective "remote" clusters.

The cluster 604-0 includes WWH, YARN and Spark components similar to those previously described in conjunction with the embodiment of FIG. 5. More particularly, cluster 604-0 comprises a WWH component including a WWH application master, a WWH catalog master, local and remote WWH cluster node managers and a WWH Spark aggregator. The cluster 604-0 further comprises a YARN component that includes a resource manager, and a Spark component that includes a Spark application master and a Spark Core driver supporting Spark context.

The resource manager of the YARN component of cluster 604-0 is coupled to the Spark Core driver via the Spark application master. The resource manager is also coupled to the WWH application master and the local WWH cluster node manager. The WWH application master and the Spark Core driver within cluster 604-0 are therefore configured to communicate with one another via the resource manager of the YARN component of that cluster. The remote WWH cluster node managers of cluster 604-0 are coupled to respective resource managers in the remote clusters 604-1 and 604-2. Those resource managers communicate with WWH application masters of their respective clusters 604-1 and 604-2. Each of the remote clusters 604-1 and 604-2 in this embodiment is assumed to be configured in substantially the same manner as illustrated in the figure for local cluster 604-0.

The WWH application master of cluster 604-0 is configured to interact with the WWH application masters of respective clusters 604-1 and 604-2 in order to distribute Spark computations for execution. These interactions between the WWH application masters of the local and remote clusters 604-0, 604-1 and 604-2 occur via their respective YARN resource managers as illustrated in the figure.

The diagram of FIG. 6 also illustrates a number of processing operations performed within the system 600. The operations are labeled 1 through 7 in the figure, and more specifically include the following:

1. Client 612-1 initiates a Spark application involving distributed in-memory computations by communicating with the resource manager of the YARN component of cluster 604-0.

2. The resource manager of the YARN component communicates with the WWH application master of cluster 604-0.

3. The WWH application master communicates with the WWH catalog master.

4. The WWH application master communicates with the WWH Spark aggregator.

5. The WWH application master communicates with the WWH cluster node manager for local cluster 604-0.

5a. The WWH cluster node manager for local cluster 604-0 communicates with the resource manager of that cluster.

5b. The resource manager of cluster 604-0 communicates with the Spark application master of that cluster.

6. The WWH application master communicates with the WWH cluster node manager for remote cluster 604-1.

6a. The WWH cluster node manager of local cluster 604-0 communicates with the resource manager of remote cluster 604-1.

7. The WWH application master communicates with the WWH cluster node manager for remote cluster 604-2.

7a. The WWH cluster node manager of local cluster 604-0 communicates with the resource manager of remote cluster 604-2.

As in the previous embodiment, these particular operations are presented by way of illustrative example only and can be varied in other embodiments.

The FIG. 6 embodiment is an example of an arrangement in which the data resources required by an application submitted by a client include remote data resources in respective additional YARN clusters 604-1 and 604-2 other than the YARN cluster 604-0 that initiates the application.

Assume by way of further example that the client 612-1 submits an application in cluster 604-0 and the needed data resources reside in clusters 604-1 and 604-2. More particularly, the client submits an application to the resource manager residing in cluster 604-0, which creates an instance of the WWH application master, which then connects with the WWH catalog master through a data resource resolving API. The WWH catalog master returns a list of resources containing resources that reside in cluster 604-1 and resources that reside in cluster 604-2. The WWH application master then creates an instance of the WWH Spark aggregator and then instances of the WWH cluster node manager for communicating with the respective remote clusters 604-1 and 604-2.

It should be noted that only a single WWH cluster node manager will typically be needed for communications between the local cluster 604-0 and a given one of the remote clusters 604-1 or 604-2. Accordingly, in the event another application is started in cluster 604-0 that also needs data resources residing in cluster 604-1, the cluster 604-0 will not create another instance of the WWH cluster node manager but will instead utilize the existing instance of the WWH cluster node manager previously created to communicate with cluster 604-1 in the context of the other application.

The WWH cluster node managers of cluster 604-0 initiate applications in the respective remote clusters 604-1 and 604-2 via the resource managers of those clusters. This causes the resource managers of clusters 604-1 and 604-2 to start respective WWH application masters in their respective clusters in order to execute the applications using the data resources local to those clusters.

Additional levels of recursion can be implemented in a similar manner by the WWH application masters in the respective clusters 604-1 and 604-2.

The particular number of clusters involved in performing distributed in-memory computations can be dynamically varied over time within a given information processing system. Accordingly, such a system exhibits a high level of scalability to accommodate varying computational needs. For example, additional clusters can be added as needed via recursion or otherwise in order to allow the system to easily handle an increase in the volume of in-memory computations to be performed.

Figure 7:
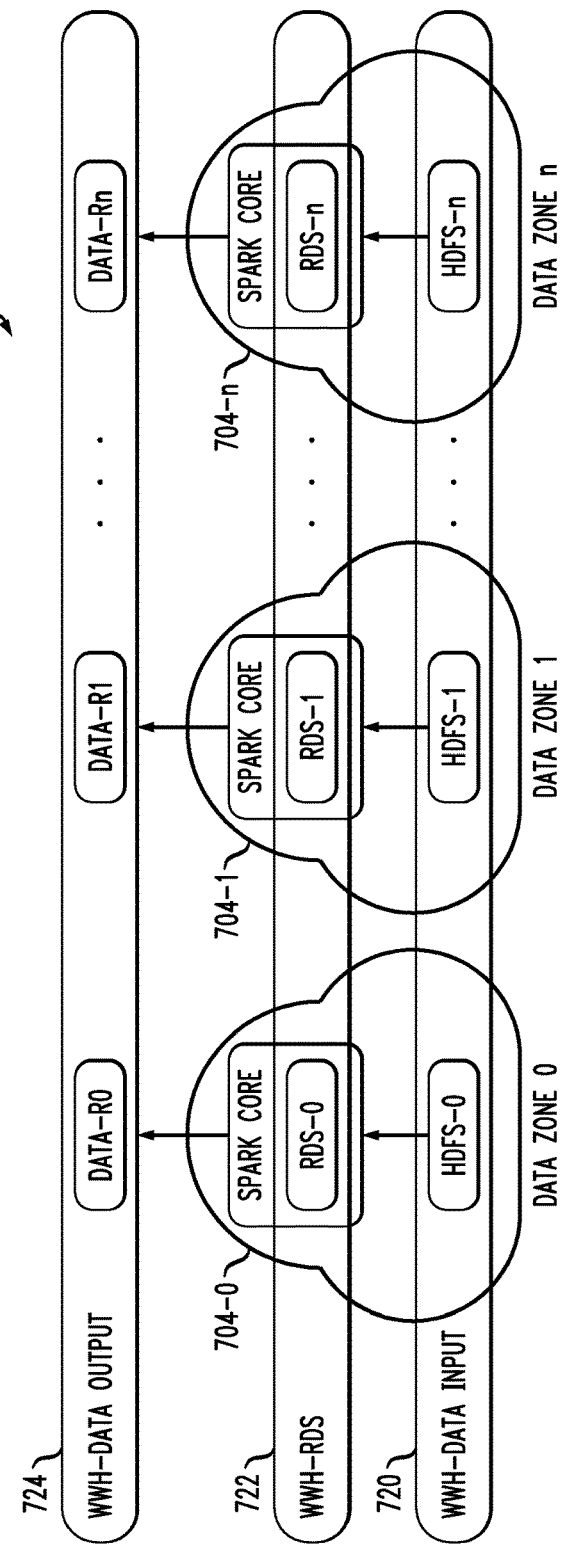
FIGS. 7-9 show additional illustrative embodiments of multi-cluster distributed data processing platforms configured to implement scalable distributed in-memory computation functionality.
Figure 8:
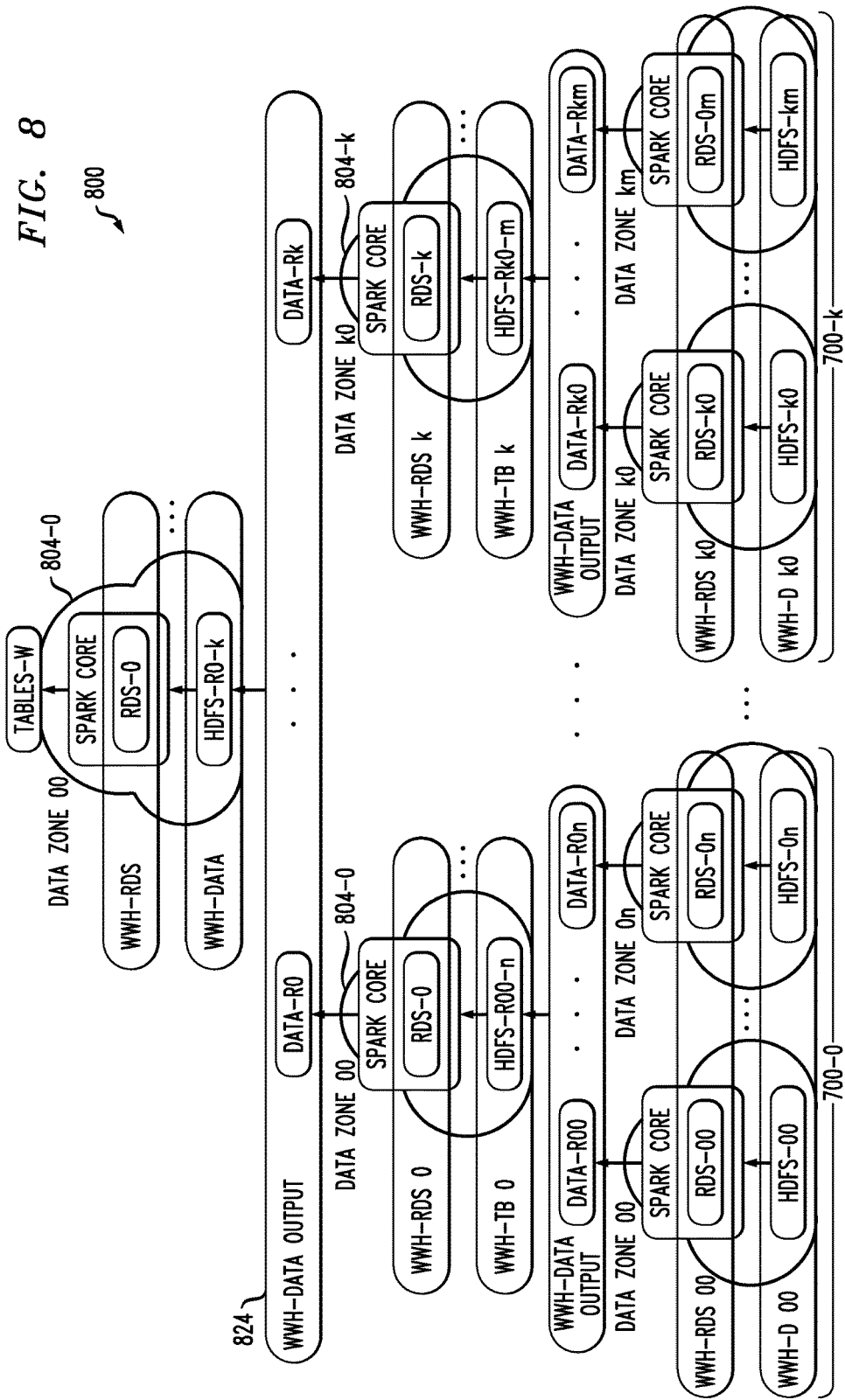
Figure 9:
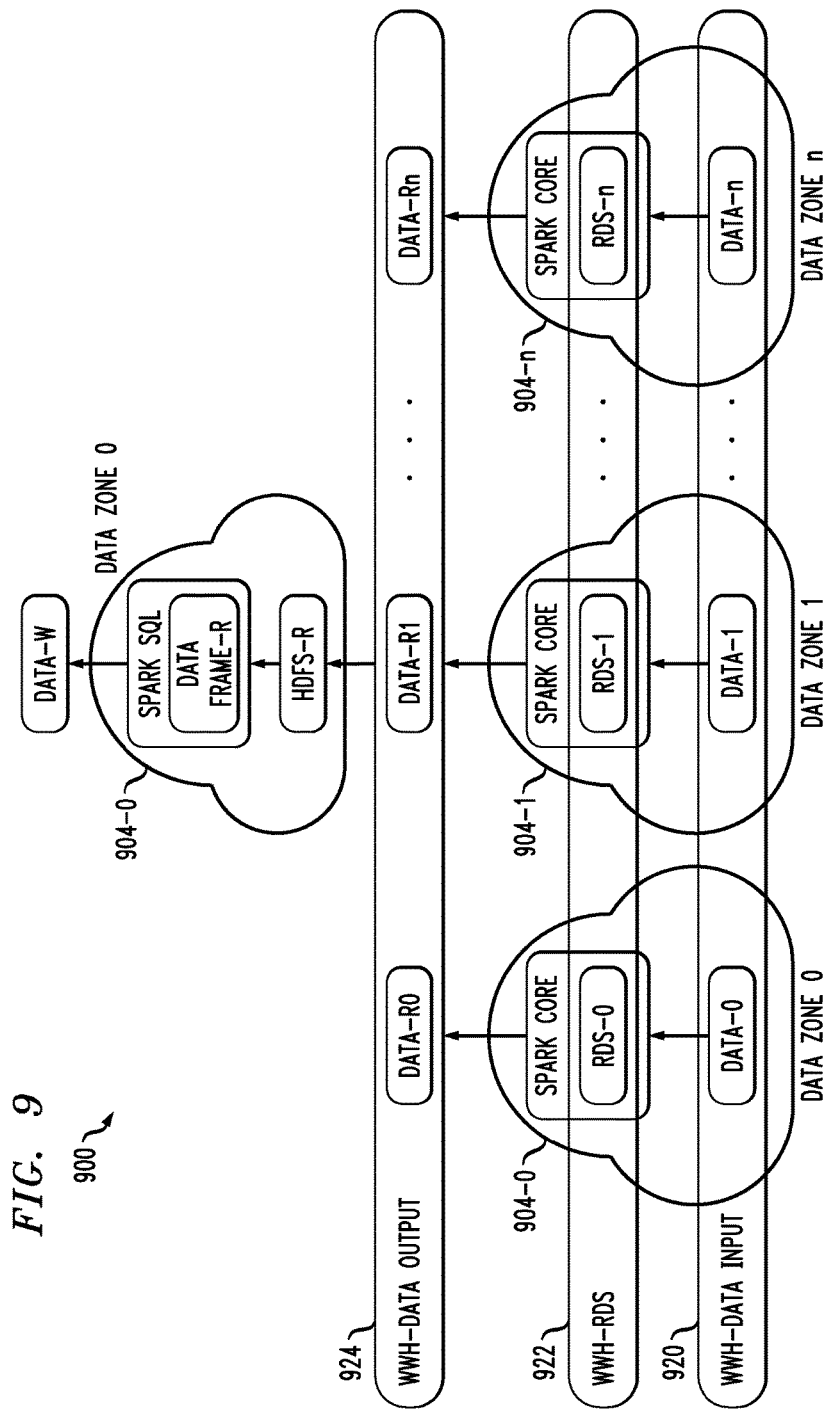

FIGS. 7-9 show other examples of illustrative embodiments of multi-cluster distributed data processing platforms configured to implement scalable distributed in-memory computation functionality. Each of these embodiments includes multiple clusters in the form of respective multiple distinct clouds of potentially different types. For example, the multiple clouds may include at least one hybrid cloud that comprises one or more private clouds together with one or more public clouds among which workloads can be migrated, with all clouds of the hybrid cloud sharing a common virtualization management layer. As another example, the multiple clouds may comprise a multi-cloud arrangement comprising a collection of private and/or public clouds associated with a given enterprise.

These and other cloud-based embodiments disclosed herein provide a high degree of flexibility and scalability for implementing Spark batch computations and other types of distributed in-memory computations.

FIG. 7 illustrates one example of a multi-cloud arrangement for distributed in-memory computation. In this particular embodiment, scalable distributed in-memory computation functionality is implemented in an information processing system 700 using multiple distinct clusters corresponding to respective clouds 704-0, 704-1, . . . 704-n of respective different data zones denoted Data Zone 0, Data Zone 1, . . . Data Zone n. The clouds 704 may be of the same type or of different types. For example, some embodiments may include a mixture of multiple distinct clouds 704 of different types, such as an Amazon Web Services cloud, a Microsoft Azure cloud and an on-premises cloud that illustratively comprises a virtual machine based cloud. One or more of the clouds 704 may be implementing using a corresponding Cloud Foundry platform and local Big Data cluster, although numerous other arrangements are possible.

Each of the clouds 704 in this embodiment is assumed to comprise a corresponding YARN cluster that includes a Spark Core component as illustrated. The Spark Core components manage respective resilient datasets denoted RDS-0, RDS-1, . . . RDS-n within their respective YARN clusters. These datasets utilize underlying HDFS storage distributed storage components denoted HDFS-0, HDFS-1, . . . HDFS-n. Results of computations performed in the respective clusters are provided as data results denoted Data-R0, Data-R1, . . . Data-Rn.

The datasets in a given embodiment may comprise any of a wide variety of different types of structured and unstructured data, including relational database tables, text documentation, pictures, video, device data, log files, genomic sequences, weather readings, social data feeds and many others.

The information processing system 700 provides an illustrative implementation of an exemplary distributed in-memory computation that is referred to herein as World Wide RDD ("WW-RDD"). Such an arrangement provides an extension to the Spark RDD framework in order to allow Spark computations to be performed in a distributed manner across multiple clusters associated with different data zones.

The WW-RDD framework as illustrated in FIG. 7 is arranged in multiple levels including a data input level 720, a Spark computation level 722, and a data output level 724. The distributed in-memory computations in this embodiment are performed as close as possible to their respective data sources in the corresponding HDFS components of the input data layer 720 of the respective clouds 704. Results of the computations from the Spark computation level 722 are surfaced to the data output level 724 while the corresponding data remains within the respective data zones of the clouds 704.

FIG. 8 illustrates an information processing system 800 in which multiple WW-RDD frameworks of the type shown in FIG. 7 are combined in order to support recursiveness in distributed in-memory computations. The system 800 comprises multiple instances of the system 700, denoted as systems 700-0 through 700-k. The data output level of each of the systems 700-0 through 700-k is associated with a different one of a plurality of additional clouds 804-0 through 804-k. Each of these additional clouds 804 is assumed to comprise an additional YARN cluster of the system 800. Distributed in-memory computation results from the additional clouds 804 are surfaced through a data output level 824.

In this embodiment, it is assumed that an initiating application is originated in the cloud 804-0 and utilizes local data resources of that local cloud and its underlying instance of the system 700 as well as remote data resources of other ones of the clouds 804 and their respective underlying instances of the system 700. The cloud 804-0 aggregates computation results from the data output level 824 into a set of tables ("Tables-W") that are made available to the requesting client. The data resources utilized in generating those results remain protected within the data zones of their respective clouds.

Numerous other implementations of recursion in distributed in-memory computations can be implemented utilizing WW-RDD frameworks of the type described in conjunction with the embodiments of FIGS. 7 and 8.

Each RDD utilized in a given WW-RDD framework instance can be created from different data sources, can be analyzed independently of other RDDs and can be analyzed in parallel with other RDDs.

Another example of an information processing system 900 configured with a WW-RDD framework is shown in FIG. 9. In this embodiment, system 900 comprises multiple clouds 904-0, 904-1, . . . 904-n, each assumed to correspond to a separate YARN cluster. Cloud 904-0 includes a Spark Core component as well as a Spark SQL component. An application initiated on cloud 904-0 utilizes the Spark SQL component of that cloud and associated distributed in-memory computations are performed using data resources locally accessible to respective clouds 904-0 through 904-n at a data input level 920. The system 900 includes a Spark computation level 922, and a data output level 924. Results of the distributed in-memory computations performed using the data resources of the data input level 920 are surfaced via the data output level 924 back to the Spark SQL component of the initiating cloud 904-0. These results are further processed in the Spark SQL component in order to provide an appropriate output ("Data-W") back to the requesting client.

The illustrative embodiments of FIGS. 7-9 are particularly configured for distribution of Spark computations in batch mode, but can be adapted to perform other types of distributed in-memory computation. The distribution of in-memory computations can be across any geographic territory, from clusters located in the same data center to clusters distributed across the world. The distribution can be done across physical domains, such as different physical hardware clusters, or across logical or virtual entities, such as two micro-segments defined by a virtual network framework.

These illustrative embodiments execute portions of Spark batch computations on each of the RDDs in a given WW-RDD framework instance, and aggregate the results from the individual RDDs into a global computation result. As noted above, the WW-RDD framework allows for the independent and parallel execution of Spark computations on each of the RDDs in the same or different clusters. Such arrangements ensure that the distributed in-memory computations are performed as close as possible to the corresponding data resources without violating data access or movement restrictions of any data zone.

The WW-RDD framework in the embodiments of FIGS. 7-9 is highly flexible and allows computation code to be written in any language that supports the Spark Core API, including JAVA, R, Python and Scala.

The WW-RDD framework in some embodiments is configured to leverage a WWH catalog service to determine the particular clusters to be involved in a given set of distributed in-memory computations. This also involves locating the needed data sources for each of the associated RDDs.

The WW-RDD framework in some embodiments is configured to manage the distribution of in-memory computations across disparate data processing clusters of a WWH platform, including choosing the appropriate data processing clusters and managing the various data processing requirements and data governance involved when aggregating computation results derived from separate, dispersed datasets.

The WW-RDD framework in some embodiments allows computations to be distributed in a recursive fashion that is transparent to an originating client or other user.

In these and other embodiments, the distributed in-memory computations may be performed utilizing multiple instances of local code running on respective nodes within respective ones of the data processing clusters and at least one instance of global code running on an initiating node within or otherwise associated with a particular one of the data processing clusters. The global code receives respective results from the multiple instances of the local code running on the respective nodes within the respective ones of the data processing clusters and aggregates those results. An application running on a client device or on a given cluster node may provide one or more of the local code, the global code and a list of data resources to a distributed processing application master of a WWH component. The list of data resources illustratively identifies particular data resources against which one or more of the local code and the global code are to be executed.

As an example of one possible implementation of the WW-RDD framework described above, consider a business or other enterprise that has employee data scattered across many geographically-distributed sites. Assume that the enterprise as part of an analytics job wants to calculate the average salary of all employees that are women, of a certain age and occupying a certain range in the organizational structure.

An application developer in this example writes code for performing Spark batch mode computations to obtain the desired result. The code includes local code to run in each cluster in which needed data resides, as well as global code to aggregate the computation results from the clusters.

A given instance of the local code processes all of the entries in a local dataset within a corresponding cluster to determine those entries that meet the original constraints of being about women, of a certain age and a certain ranking within the organization structure of the enterprise, and then adds the salaries of all such entries and counts the number of salaries that were added. This calculation illustratively returns a computation result in the form of a value pair <SumOfSalaries, NumberOfSalariesSummed>.

The global code runs on an initiating node, and receives all of the value pairs returned by the respective clusters participating in the distributed in-memory computations, and then calculates the global average. More particularly, the global code will first calculate TotalOfSalaries=sum of all SumOfSalaries, and then calculate TotalNumberOfEntries=sum of NumberOfSalariesSummed, and finally calculate the global average by simply dividing TotalOfSalaries by TotalNumberOfEntries.

As noted above, an application user can pass local code, global code and lists of data resources to be analyzed to an initiating node. The WW-RDD framework as described previously in conjunction with FIGS. 7-9 will then distribute the local code to clusters in respective data zones in which computations should be performed, collect the corresponding results and execute the global code on those results to provide a global computation result. Recursion can be used as needed in order to allow a given cluster in one data zone to enlist the involvement one or more other clusters in other data zones.

It was mentioned previously that some embodiments are implemented in a hybrid cloud or a multi-cloud configuration, where enterprises have datasets scattered across these clouds. For example, an enterprise may have their customer data residing in a Sales Force public cloud, its Enterprise Resource Planning (ERP) data in a Virtustream cloud, and the rest of its data in its own private cloud, which may contain several clusters, each storing a percentage of the data. Each of these clouds or clusters may correspond to a different data zone.

Accordingly, some embodiments are configured for cloud, hybrid cloud and multi-cloud applications in which enterprises have data scattered across several locations and are unable to actually bring this data to single location for analysis. For example, illustrative embodiments can accommodate arrangements in which data is distributed across different data centers or in different clouds, such as an Amazon Web Services cloud, a Microsoft Azure cloud and an on-premises private cloud, while avoiding concerns associated with data transfer.

A given information processing system with scalable distributed in-memory computation functionality as disclosed herein can be configured to include different cloud architectures, handling the distribution of data tasks without requiring the corresponding data to be combined in a single location or cluster. Accordingly, data can be processed in place even if parts of the data are stored across a multi-cloud environment.

It is to be understood, however, that the WW-RDD framework is not limited to such cloud-based arrangements. For example, some embodiments may involve IoT applications in which data is collected at the edge of a given IoT system in large volumes and needs to be analyzed and aggregated as close as possible to the point of collection. For example, such situations can arise if an IoT gateway has difficulties connecting to a central location or cloud.

Additional illustrative embodiments extend the above-described WW-RDD framework to support example Spark batch mode extensions including Spark SQL, Spark Machine Learning library (MLlib) and Spark GraphX. These illustrative embodiments will now be described with reference to FIGS. 10 through 27.

Figure 10:
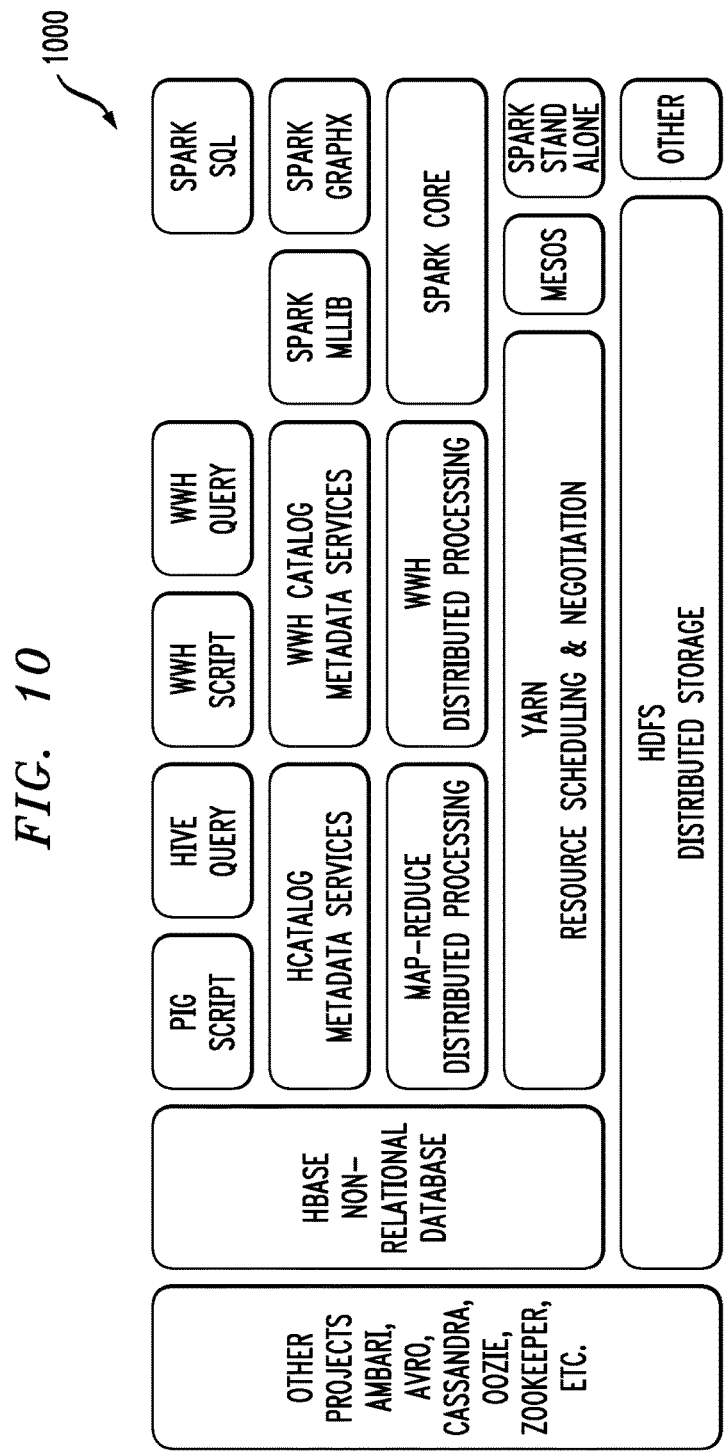
FIG. 10 is a stack diagram showing relationships between components of an information processing system with scalable distributed in-memory computation functionality using batch mode extensions in an illustrative embodiment.

FIG. 10 is a stack diagram showing relationships between components of an information processing system 1000 with scalable distributed in-memory computation functionality using batch mode extensions in an illustrative embodiment. This diagram is similar to the stack architecture of FIG. 3, but the Spark Core component now includes support for batch mode extensions Spark SQL, Spark MLlib and Spark GraphX. Other distinctions relative to the FIG. 3 embodiment include support for WWH scripts and WWH queries utilizing the underlying WWH catalog metadata services component. Also, the Spark Core component can run on additional platforms such as Mesos as well as in stand-alone Spark instantiations. Other types of Spark instantiations can also be included, possibly utilizing additional or alternative storage arrangements other than HDFS distributed storage.

The layered architecture of the system 1000 provides extension of the WWH framework to support the Spark batch mode extensions Spark SQL, Spark MLlib and Spark GraphX. These are examples of Spark batch modes. As described previously, Spark performs in-memory computations utilizing RDDs. Spark generally provides a distributed data processing engine that can operate in multiple modes, such as batch, interactive and streaming modes. The Spark batch mode extensions Spark SQL, Spark MLlib and Spark GraphX implement additional functionality including SQL query processing, graph processing and machine learning, respectively. Although some illustrative embodiments described herein focus on Spark processing in the batch mode of operation, it is to be appreciated that the WWH framework can also be extended to support other types of Spark applications running in other operating modes, such as interactive and streaming modes.

In the FIG. 10 embodiment, the WWH distributed processing component of system 1000 is configured to interact with the Spark Core component. Such an arrangement illustratively involves distributing Spark computations across multiple clusters, allowing the computations to benefit from the principle of data locality. For example, a given computation may be performed as close as possible to the needed data, thereby minimizing data movement and preserving privacy, as only the results of the given computation are shared beyond the corresponding data zone, and not the original data itself.

Figure 11:
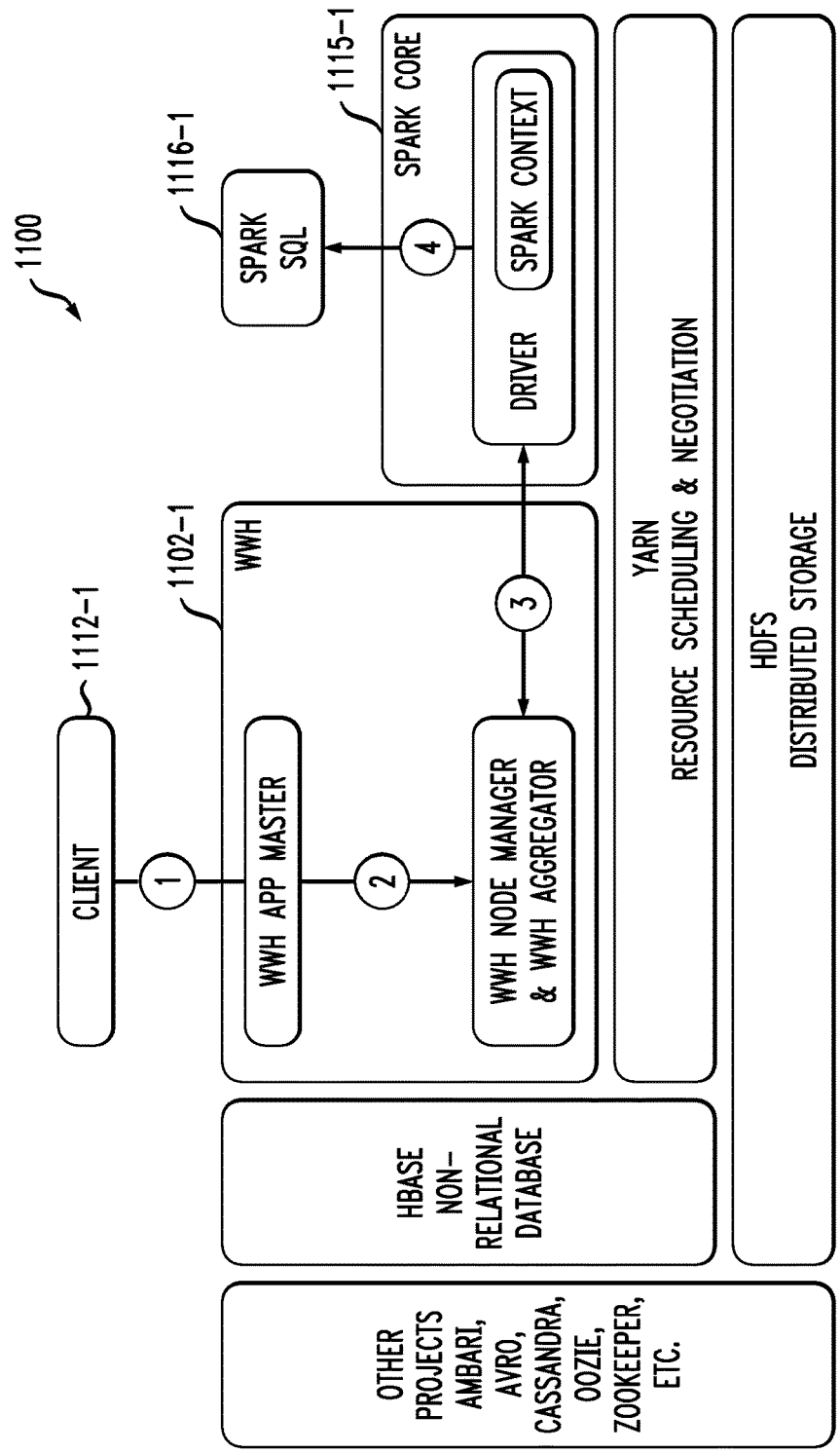
FIGS. 11, 12 and 13 show example interactions between WWH and respective Spark SQL, MLlib and GraphX components in an illustrative embodiment.

FIG. 11 illustrates another embodiment of an information processing system 1100 with scalable distributed in-memory computation functionality. The system 1100 includes a WWH component 1102-1, a client 1112-1 and a Spark component 1115-1. The Spark component 1115-1 interacts with a Spark SQL component 1116-1 as shown.

The WWH component 1102-1 may comprise at least a portion of one or more WWH nodes of a WWH platform of the type previously described. Additionally or alternatively, it may comprise at least portions of one or more distributed data processing clusters. The WWH component 1102-1 includes a WWH application master, as well as a WWH node manager and a WWH aggregator. The WWH application master is an example of what is more generally referred to herein as a "distributed processing application master."

The WWH component 1102-1 communicates with the client 1112-1 over one or more networks. For example, the client 1112-1 can be implemented on a client device that is separate from the node or nodes that implement at least portions of the WWH component 1102-1. It is also possible that the client 1112-1 can be implemented at least in part on the same processing device or set of processing devices that implements at least a portion of the WWH component 1102-1.

The WWH component 1102-1 is configured to interact with the Spark component 1115-1. The Spark component 1115-1 comprises a Spark Core driver program providing Spark context support. The Spark Core driver program is an example of what is more generally referred to herein as an "in-memory processing driver."

The diagram of FIG. 11 also illustrates a number of processing operations performed within the system 1100. The operations are labeled 1 through 4 in the figure, and more specifically include the following:

1. Client 1112-1 initiates a Spark application involving distributed in-memory computations by communicating with WWH application master of WWH component 1102-1.
2. Within the WWH component 1102-1, the WWH application master communicates with the WWH node manager and WWH aggregator.
3. The WWH node manager and WWH aggregator of WWH component 1102-1 interacts with the Spark Core driver of the Spark component 1115-1.
4. The Spark component 1115-1 interacts with the Spark SQL component 1116-1.

These particular operations and others referred to herein are presented by way of illustrative example only and can be varied in other embodiments.

Figure 12:
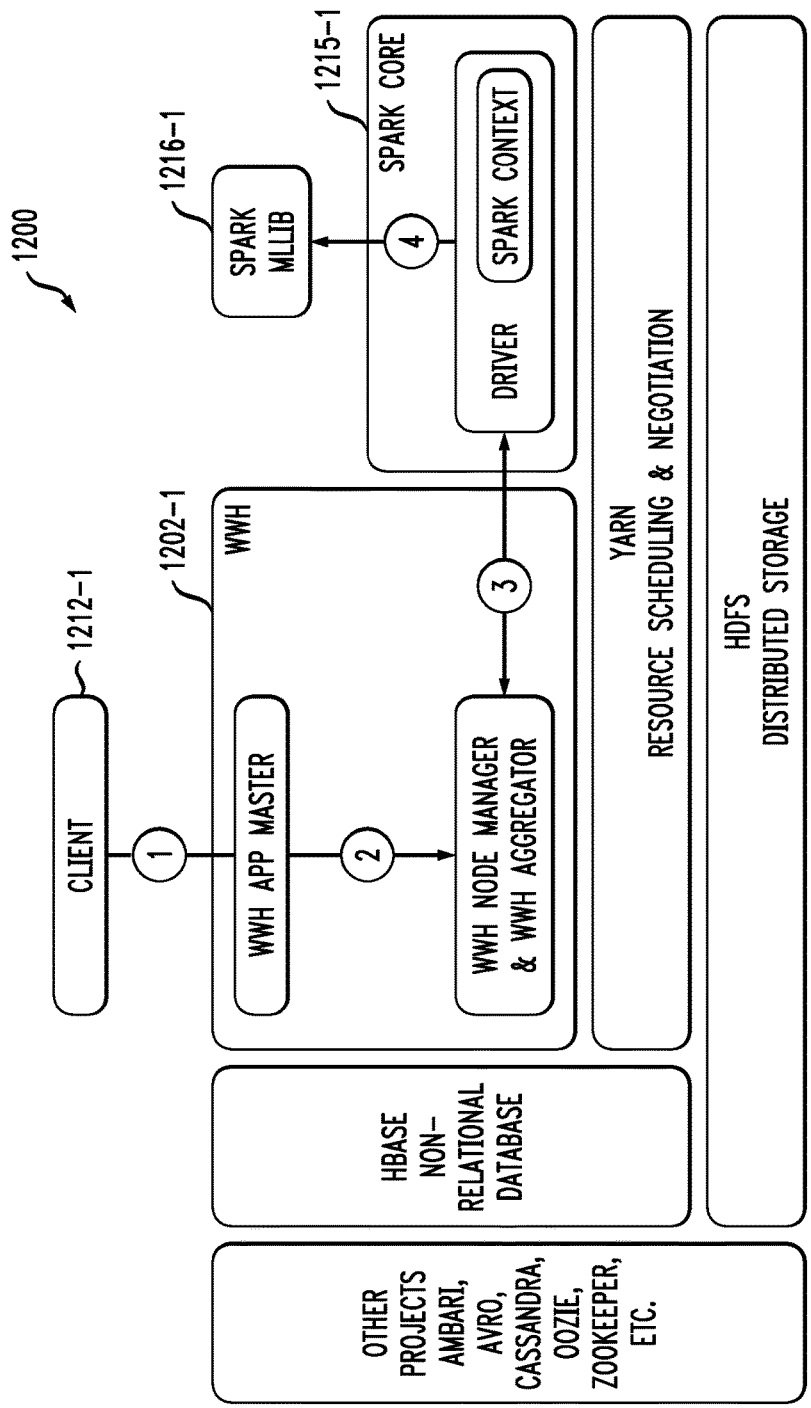
Figure 13:
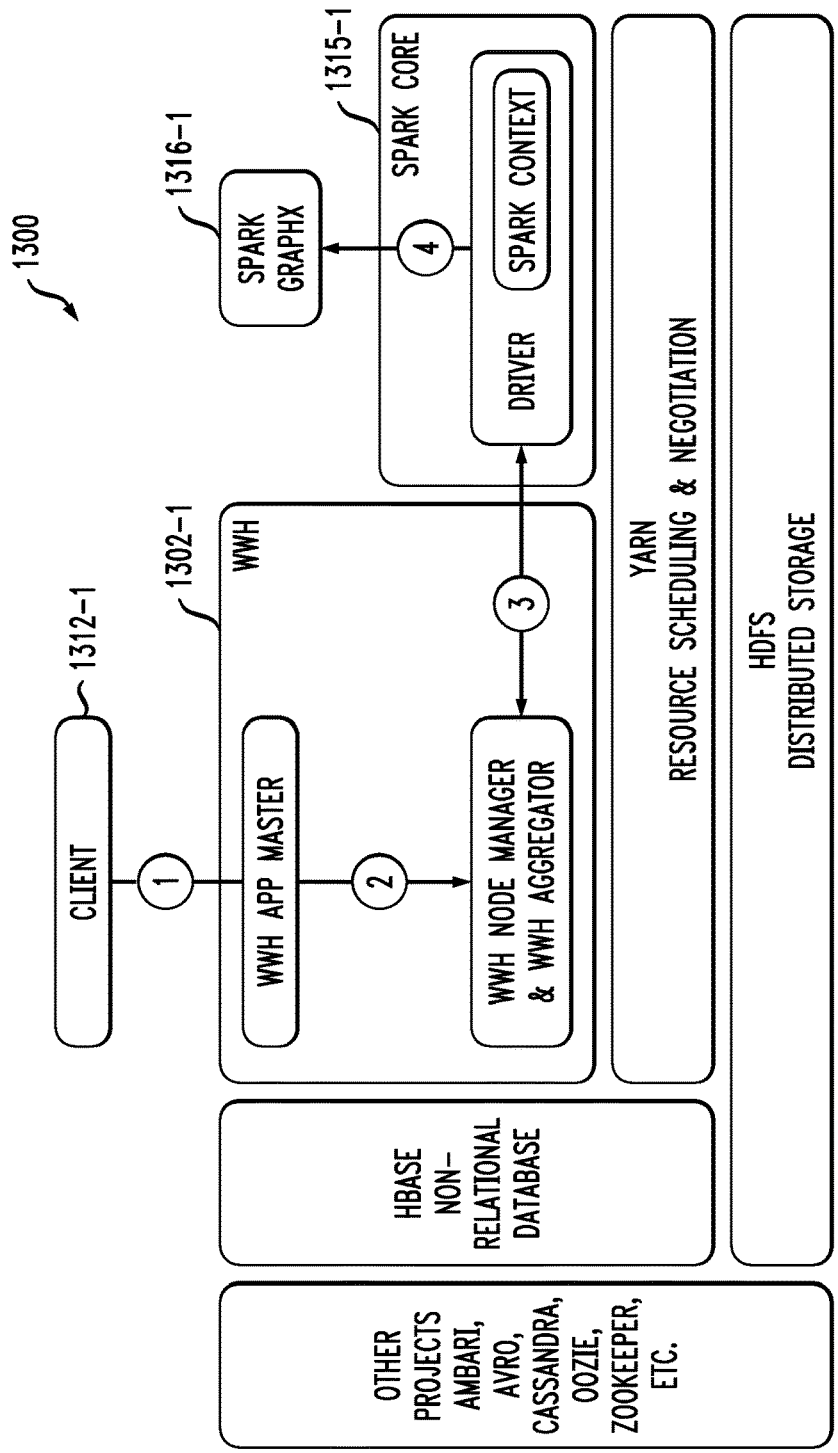

FIGS. 12 and 13 correspond generally to FIG. 11, but relate to respective Spark batch mode extensions Spark MLlib and Spark GraphX.

With regard to FIG. 12, an embodiment of an information processing system 1200 with scalable distributed in-memory computation functionality is shown. The system 1200 includes a WWH component 1202-1, a client 1212-1 and a Spark component 1215-1. The Spark component 1215-1 interacts with a Spark MLlib component 1216-1 as shown. Its operation is otherwise similar to that of the FIG. 11 embodiment.

With regard to FIG. 13, an embodiment of an information processing system 1300 with scalable distributed in-memory computation functionality is shown. The system 1300 includes a WWH component 1302-1, a client 1312-1 and a Spark component 1315-1. The Spark component 1315-1 interacts with a Spark GraphX component 1316-1 as shown. Its operation is otherwise similar to that of the FIG. 11 embodiment.

Figure 14:
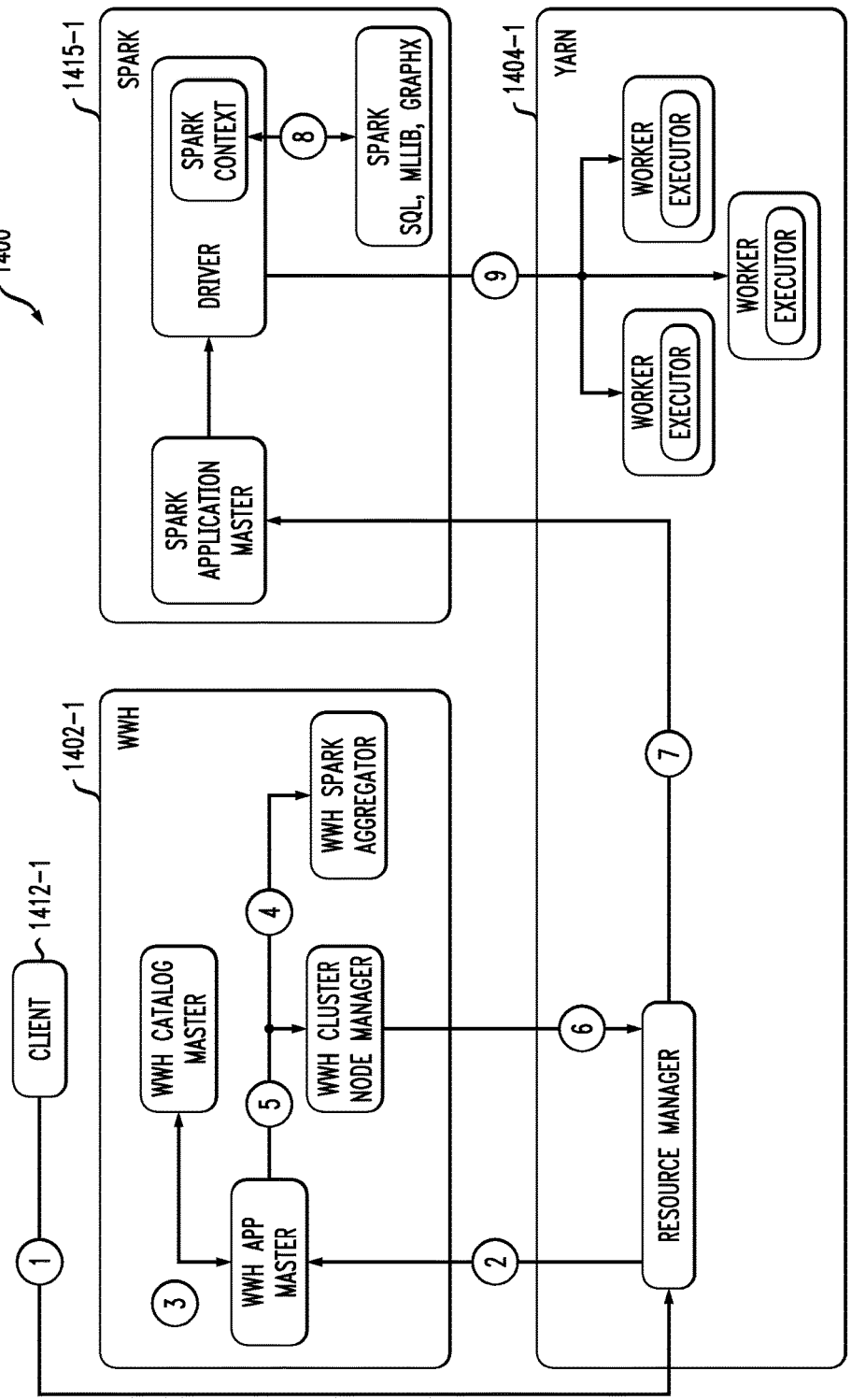
FIG. 14 shows a more detailed view of interactions between WWH, Spark and YARN components in a single cluster of a multi-cluster distributed data processing platform in an illustrative embodiment.

FIG. 14 shows a more detailed view of interactions between WWH, Spark and YARN components in a single cluster of a multi-cluster distributed data processing platform in an illustrative embodiment. In this embodiment, information processing system 1400 comprises WWH component 1402-1, YARN component 1404-1, client 1412-1 and Spark component 1415-1. It is assumed that the WWH component 1402-1, YARN component 1404-1 and Spark component 1415-1 are part of or otherwise associated with only a single cluster of a plurality of clusters of a WWH platform.

The WWH component 1402-1 in this embodiment comprises a WWH application master, a WWH catalog master, a WWH cluster node manager and a WWH Spark aggregator.

The YARN component 1404-1 comprises a resource manager and multiple worker components each having an associated executor.

The Spark component 1415-1 comprises a Spark application master and a Spark Core driver supporting Spark context. The Spark component 1415-1 further comprises a Spark batch extension component implementing Spark SQL, Spark MLlib and Spark GraphX batch mode extensions.

The resource manager of the YARN component 1404-1 is coupled to the Spark Core driver via the Spark application master. The resource manager is also coupled to the WWH application master and the WWH cluster node manager of the WWH component 1402-1.

The WWH application master of the WWH component 1402-1 and the Spark Core driver of the Spark component 1415-1 are therefore configured to communicate with one another via the resource manager of the YARN component 1404-1.

The diagram of FIG. 14 also illustrates a number of processing operations performed within the system 1400. The operations are labeled 1 through 9 in the figure, and more specifically include the following:

1. Client 1412-1 initiates a Spark application involving distributed in-memory computations by communicating with the resource manager of the YARN component 1404-1.

2. The resource manager of the YARN component 1404-1 communicates with the WWH application master of the WWH component 1402-1.

3. Within the WWH component 1402-1, the WWH application master communicates with the WWH catalog master.

4. The WWH application master communicates with the WWH Spark aggregator.

5. The WWH application master communicates with the WWH cluster node manager.

6. The WWH cluster node manager communicates with the resource manager of the YARN component 1404-1.

7. The resource manager communicates with the Spark Core driver of the Spark component 1415-1 via the Spark application master.

8. The Spark Core driver interacts with one or more of the Spark SQL, Spark MLlib and Spark GraphX batch mode extensions of the Spark batch extension component.

9. The Spark Core driver interacts with multiple worker components of the YARN component 1404-1 in order to execute in-memory computations within the single cluster of the system 1400.

As in the previous embodiment, these particular operations are presented by way of illustrative example only and can be varied in other embodiments.

Figure 15:
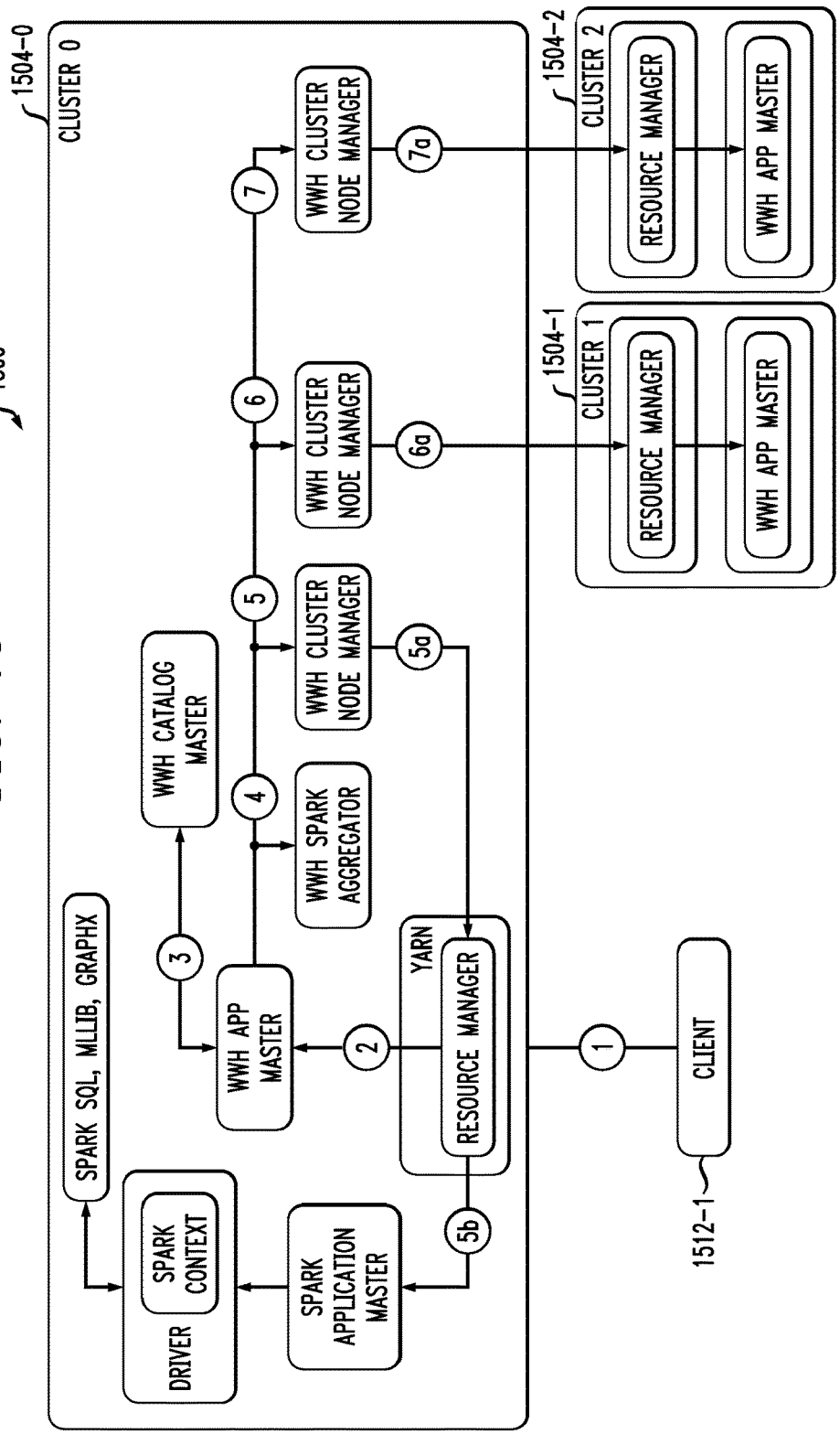
FIG. 15 shows a more detailed view of interactions between WWH, Spark and YARN components in multiple clusters of a multi-cluster distributed data processing platform in an illustrative embodiment.

FIG. 15 shows a more detailed view of interactions between WWH, Spark and YARN components in multiple clusters of a multi-cluster distributed data processing platform in an illustrative embodiment. In this embodiment, information processing system 1500 comprises a plurality of distributed data processing clusters 1504-0, 1504-1 and 1504-2, also denoted as Cluster 0, Cluster 1 and Cluster 2, respectively. The system 1500 further comprises a client 1512-1 that is in communication with the cluster 1504-0. The client 1512-1 may be implemented on a separate processing device that is coupled to the cluster 1504-0 via one or more networks that are not explicitly shown. Alternatively, the client 1512-1 can be implemented at least in part on one of the nodes of the cluster 1504-0.

The cluster 1504-0 is designated as a "local" cluster relative to the client 1512-1 in this embodiment and the other clusters 1504-1 and 1504-2 are therefore referred to as respective "remote" clusters.

The cluster 1504-0 includes WWH, YARN and Spark components similar to those previously described in conjunction with the embodiment of FIG. 14. More particularly, cluster 1504-0 comprises a WWH component including a WWH application master, a WWH catalog master, local and remote WWH cluster node managers and a WWH Spark aggregator. The cluster 1504-0 further comprises a YARN component that includes a resource manager, and a Spark component that includes a Spark application master and a Spark Core driver supporting Spark context. The Spark component in this embodiment further comprises a Spark batch extension component illustratively implementing Spark SQL, Spark MLlib and Spark GraphX batch mode extensions.

The resource manager of the YARN component of cluster 1504-0 is coupled to the Spark Core driver via the Spark application master. The resource manager is also coupled to the WWH application master and the local WWH cluster node manager. The WWH application master and the Spark Core driver within cluster 1504-0 are therefore configured to communicate with one another via the resource manager of the YARN component of that cluster. The remote WWH cluster node managers of cluster 1504-0 are coupled to respective resource managers in the remote clusters 1504-1 and 1504-2. Those resource managers communicate with WWH application masters of their respective clusters 1504-1 and 1504-2. Each of the remote clusters 1504-1 and 1504-2 in this embodiment is assumed to be configured in substantially the same manner as illustrated in the figure for local cluster 1504-0.

The WWH application master of cluster 1504-0 is configured to interact with the WWH application masters of respective clusters 1504-1 and 1504-2 in order to distribute Spark computations for execution. These interactions between the WWH application masters of the local and remote clusters 1504-0, 1504-1 and 1504-2 occur via their respective YARN resource managers as illustrated in the figure.

The diagram of FIG. 15 also illustrates a number of processing operations performed within the system 1500. The operations are labeled 1 through 7 in the figure, and are performed in a manner similar to that previously described in conjunction with the illustrative embodiment of FIG. 6. Again, these particular operations are presented by way of illustrative example only and can be varied in other embodiments.

The FIG. 15 embodiment is an example of an arrangement in which the data resources required by an application submitted by a client include remote data resources in respective additional YARN clusters 1504-1 and 1504-2 other than the YARN cluster 1504-0 that initiates the application.

Assume by way of further example that the client 1512-1 submits an application in cluster 1504-0 and the needed data resources reside in clusters 1504-1 and 1504-2. More particularly, the client submits an application to the resource manager residing in cluster 1504-0, which creates an instance of the WWH application master, which then connects with the WWH catalog master through a data resource resolving API. The WWH catalog master returns a list of resources containing resources that reside in cluster 1504-1 and resources that reside in cluster 1504-2. The WWH application master then creates an instance of the WWH Spark aggregator and then instances of the WWH cluster node manager for communicating with the respective remote clusters 1504-1 and 1504-2.

It should be noted that only a single WWH cluster node manager will typically be needed for communications between the local cluster 1504-0 and a given one of the remote clusters 1504-1 or 1504-2. Accordingly, in the event another application is started in cluster 1504-0 that also needs data resources residing in cluster 1504-1, the cluster 1504-0 will not create another instance of the WWH cluster node manager but will instead utilize the existing instance of the WWH cluster node manager previously created to communicate with cluster 1504-1 in the context of the other application.

The WWH cluster node managers of cluster 1504-0 initiate applications in the respective remote clusters 1504-1 and 1504-2 via the resource managers of those clusters. This causes the resource managers of clusters 1504-1 and 1504-2 to start respective WWH application masters in their respective clusters in order to execute the applications using the data resources local to those clusters.

Additional levels of recursion can be implemented in a similar manner by the WWH application masters in the respective clusters 1504-1 and 1504-2.

The particular number of clusters involved in performing distributed in-memory computations can be dynamically varied over time within a given information processing system. Accordingly, such a system exhibits a high level of scalability to accommodate varying computational needs. For example, additional clusters can be added as needed via recursion or otherwise in order to allow the system to easily handle an increase in the volume of in-memory computations to be performed.

FIGS. 16-19 show other examples of illustrative embodiments of multi-cluster distributed data processing platforms configured to implement scalable distributed in-memory computation functionality. These embodiments more particularly implement distributed in-memory computation functionality utilizing the Spark SQL batch mode extension.

Each of these embodiments includes multiple clusters in the form of respective multiple distinct clouds of potentially different types. For example, the multiple clouds may include at least one hybrid cloud that comprises one or more private clouds together with one or more public clouds among which workloads can be migrated, with all clouds of the hybrid cloud sharing a common virtualization management layer. As another example, the multiple clouds may comprise a multi-cloud arrangement comprising a collection of private and/or public clouds associated with a given enterprise.

These and other cloud-based embodiments disclosed herein provide a high degree of flexibility and scalability for implementing Spark batch computations using batch mode extensions and other types of distributed in-memory computations.

Figure 16:
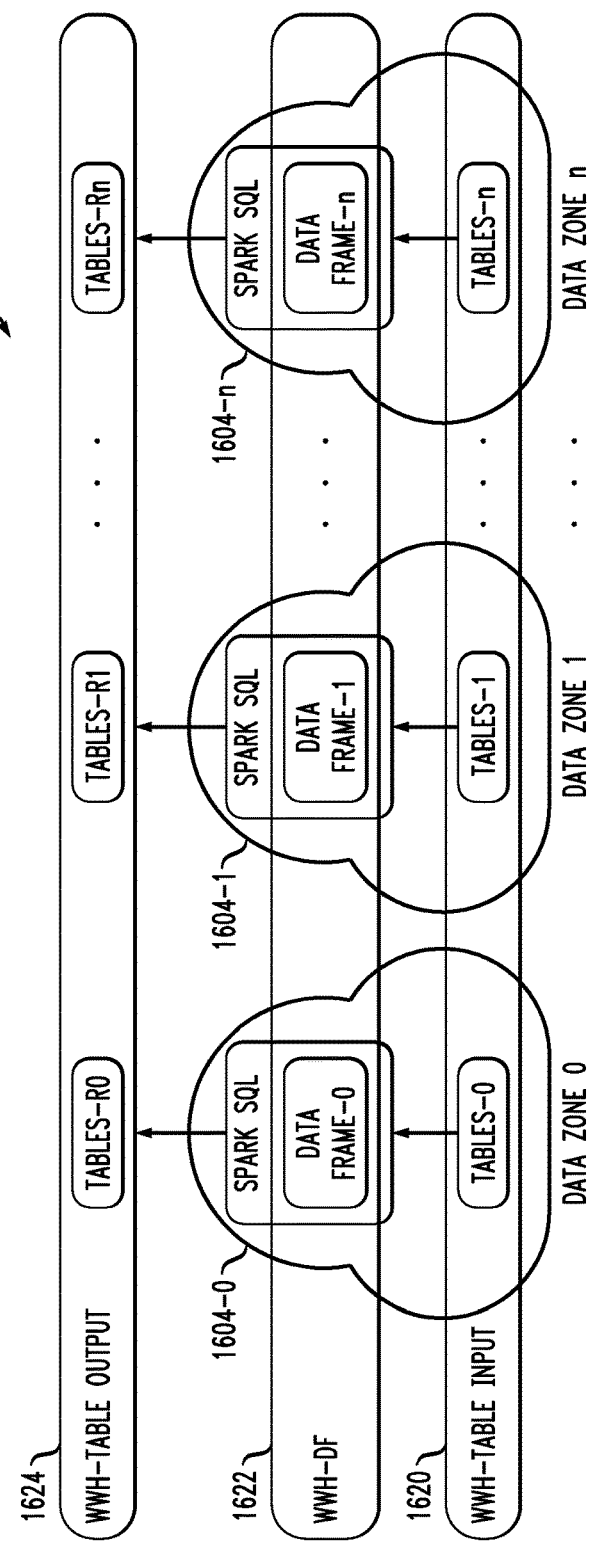
FIGS. 16-19 show additional illustrative embodiments of multi-cluster distributed data processing platforms configured to implement scalable distributed in-memory computation functionality for Spark SQL computations.

FIG. 16 illustrates one example of a multi-cloud arrangement for distributed in-memory computation using the Spark SQL batch mode extension. In this particular embodiment, scalable distributed in-memory computation functionality is implemented in an information processing system 1600 using multiple distinct clusters corresponding to respective clouds 1604-0, 1604-1, . . . 1604-*n* of respective different data zones denoted Data Zone 0, Data Zone 1, . . . Data Zone n, . . . The clouds 1604 may be of the same type or of different types. For example, some embodiments may include a mixture of multiple distinct clouds 1604 of different types, such as an Amazon Web Services cloud, a Microsoft Azure cloud and an on-premises cloud that illustratively comprises a virtual machine based cloud. One or more of the clouds 1604 may be implementing using a corresponding Cloud Foundry platform and local Big Data cluster, although numerous other arrangements are possible.

Each of the clouds 1604 in this embodiment is assumed to comprise a corresponding YARN cluster that includes a Spark SQL component as illustrated. The Spark SQL components manage respective data frames denoted Data Frame-0, Data Frame-1, . . . Data Frame-n within their respective YARN clusters. These datasets utilize underlying distributed storage components denoted Tables-0, Tables-1, . . . Tables-n. Results of computations performed in the respective clusters are provided as data results denoted Tables-R0, Tables-R1, . . . Tables-Rn.

The datasets in a given embodiment may comprise any of a wide variety of different types of structured and unstructured data, including relational database tables, text documentation, pictures, video, device data, log files, genomic sequences, weather readings, social data feeds and many others.

The information processing system 1600 provides an illustrative implementation of an exemplary distributed in-memory computation that is referred to herein as World Wide Data Frame ("WW-DF"). Such an arrangement provides an extension to the Spark RDD framework in order to allow Spark SQL computations to be performed in a distributed manner across multiple clusters associated with different data zones. The framework or portions thereof are also denoted in some of the figures using WWH-DataFrame or other similar notations.

The WW-DF framework as illustrated in FIG. 16 is arranged in multiple levels including a data input level 1620, a Spark SQL computation level 1622, and a data output level 1624. The distributed in-memory computations in this embodiment are performed as close as possible to their respective data sources in the corresponding distributed storage components of the input data layer 1620 of the respective clouds 1604. Results of the computations from the Spark SQL computation level 1622 are surfaced to the data output level 1624 while the corresponding data remains within the respective data zones of the clouds 1604.

Figure 17:
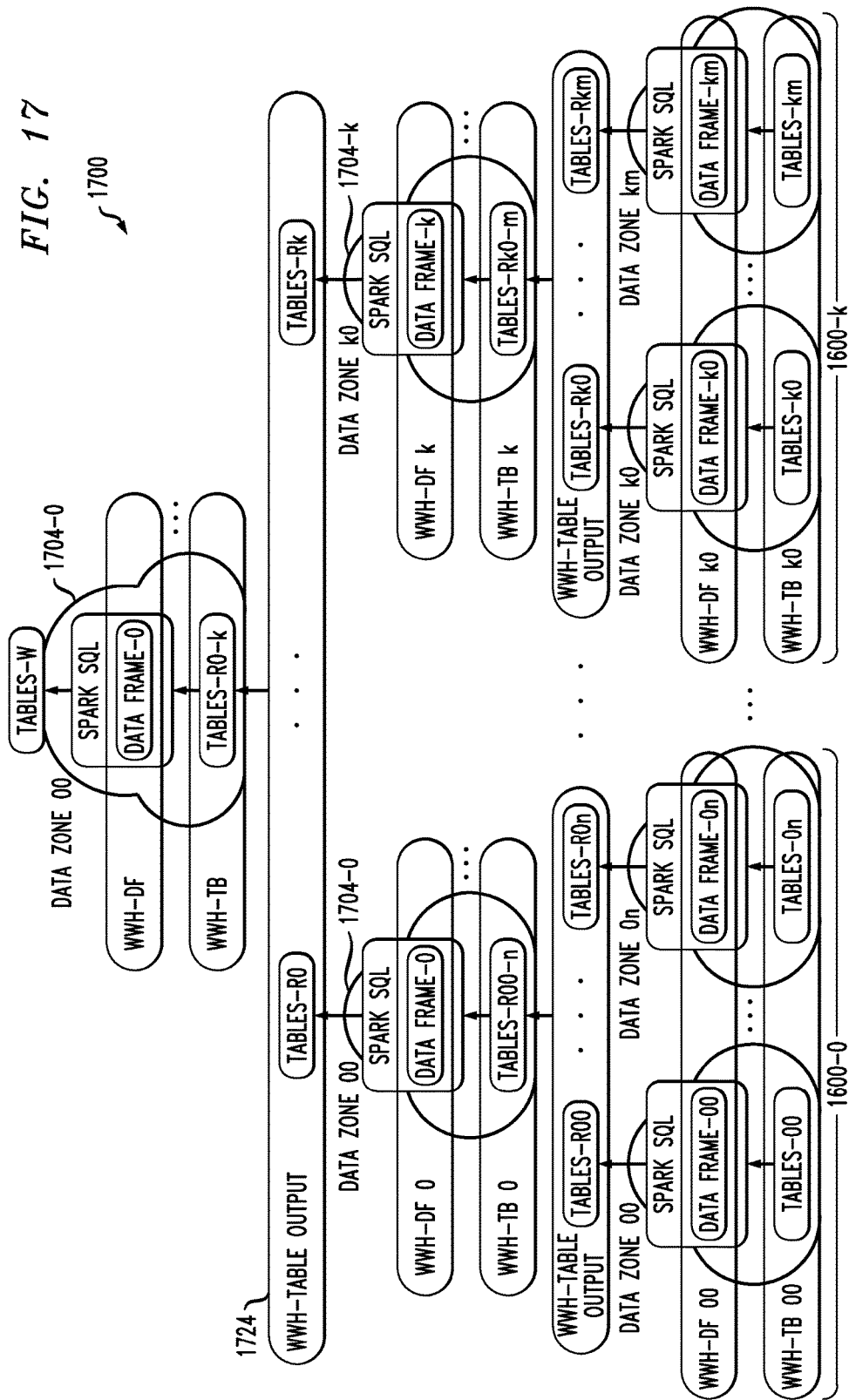

FIG. 17 illustrates an information processing system 1700 in which multiple WW-DF frameworks of the type shown in FIG. 16 are combined in order to support recursiveness in distributed in-memory computations. The system 1700 comprises multiple instances of the system 1600, denoted as systems 1600-0 through 1600-*k*. The data output level of each of the systems 1600-0 through 1600-*k* is associated with a different one of a plurality of additional clouds 1704-0 through 1704-*k*. Each of these additional clouds 1704 is assumed to comprise an additional YARN cluster of the system 1700. Distributed in-memory computation results from the additional clouds 1704 are surfaced through a data output level 1724.

In this embodiment, it is assumed that an initiating application is originated in the cloud 1704-0 and utilizes local data resources of that local cloud and its underlying instance of the system 1600 as well as remote data resources of other ones of the clouds 1704 and their respective underlying instances of the system 1600. The cloud 1704-0 aggregates computation results from the data output level 1724 into a set of tables ("Tables-W") that are made available to the requesting client. The data resources utilized in generating those results remain protected within the data zones of their respective clouds.

Numerous other implementations of recursion in distributed in-memory computations can be implemented utilizing WW-DF frameworks of the type described in conjunction with the embodiments of FIGS. 16 and 17.

An example implementation of the WW-DF framework for performance of distributed Spark SQL computations will now be described in greater detail. This example utilizes what are more generally referred to herein as local data structures and global data structures for performing respective local and global Spark SQL computations.

In this example, an extension of the Spark data frame abstraction is configured to transcend the boundaries of a given cluster and its associated data zone. More particularly, a given data scientist or other type of system user is exposed to an abstraction of a wwhDataFrame, also referred here as a wwhTable, comprising a set of rows $row_i$ and represented as wwhTable=$(row_1, row_2, \ldots, row_m)$. In some embodiments, the terms wwhDataFrame and wwhTable will be used interchangeably.

In the context of a wwhTable, the rows in the table do not need to exist in a single central location and can be scattered around several other tables. Consider a set of tables TableSet, represented as TableSet=$\{Table_0, Table_1, \ldots, Table_n\}$. A wwhTable is said to be derived from TableSet, represented as wwhTable=$\delta$(TableSet), when the following holds true:

1. Each row in the wwhTable is a subset of a row in one of the tables in TableSet. More formally, $\forall row_i \in$ wwhTable, where $1 \leq i \leq m$, $\exists Table_j \in$ TableSet and a $row_j' \in Table_j$, such that $row_i \subseteq row_j'$.

2. All rows in TableSet are actually represented in wwhTable. More formally, $\forall Table_j \in$ TableSet, and $\forall row_j' \in Table_j$, $\exists row_i \in$ wwhTable, where $row_i \subseteq row_j'$.

3. The number of entries in wwhTable is the same as the sum of the number of rows in all the tables in TableSet. More formally, $|$wwhTable$|=\Sigma_{i=0}^n |Table_i|$.

It should be noted that the table wwhTable is not a unique set in the sense that several rows in the table may have exactly the same content. Also, the rows in wwhTable need not have all of the fields in the rows in TableSet. In fact, the rows in wwhTable need only be a subset of the rows in TableSet.

The same abstraction of a wwhTable is given to the data frame that is going to be analyzed or computed, referred to as wwhTable$^{Input}$, as to the data frame that results from the computation, referred to as wwhTable$^{Output}$.

A wwhDataFrame or wwhTable is derived from a set of tables, where the following properties hold:

Recursiveness: where a wwhDataFrame can consist of other data frames as originally defined in Spark, representing a terminal case of the recursiveness, or other wwhDataFrames, in which case another layer of recursiveness needs to be traversed. In other words, a wwhTable is derived from TableSet where a TableSet may consist of other wwhTable. More formally, wwhTable=$\delta$(TableSet)=$\delta(\{Table_0, Table_1, \ldots, Table_n\})$, where $\forall_{0 \leq i \leq n}$, $Table_i=\delta(TableSet_i)$.

Geo-Distribution: where wwhTable=$\delta$(TableSet)=$\delta(\{Table_0, Table_1, \ldots, Table_n\})$ and each $Table_i$ can be located in a different physical location, also referred to as a data zone. In other words, the individual tables from which a wwhTable is derived can be geographically distributed, or can all be in a single location, or any variation in between.

Data Locality: where each table $Table_i$ from which wwhDataFrame is derived can benefit from the advantages of data locality, meaning that it is created as close as possible to its data source and analyzed as close as possible to where it was created and it is stored.

Data Heterogeneity: where each one of the tables $Table_i$ from which wwhDataFrame is derived from, do not need to have the same format. In other words, each table can consist of rows that differ from the rows on other tables, as long as all the rows actually are a super set of the rows represented in wwhTable. More formally, $\forall Table_j \in$ TableSet, and $\forall row_j' \in Table_j$, fields($row \in$ wwhTable)$\subseteq row_j'$. The data heterogeneity property illustratively allows a data scientist or other user to focus on the fields that are at the intersection of the distributed tables. This feature expands the range of data that can be included in the computation as it relaxes any constraints associated with requiring that all data zones agree on the format of the data or on the uniformity of the tables, before a computation is actually performed.

Data Diversity: where in a wwhDataFrame or wwhTable, each one of the tables $Table_i$ from which wwhDataFrame is derived, the following holds:

Each $Table_i$ in the set TableSet can be created from different data sources;

Each $Table_i$ in the set TableSet can be analyzed independently of the others; and Each $Table_i$ in the set TableSet can be analyzed in parallel with the others.

In this example, users can leverage the WW-DF framework as described above to orchestrate and automate the distributed execution of Spark SQL computations in batch mode. More formally, a user can define a given operation to be performed on a wwhTable=$\delta$(TableSet)=$\delta(\{Table_0, Table_1, \ldots, Table_n\})$ and the WW-DF framework specified above orchestrates the distribution and parallelization of the computation in each one of the tables $Table_i$, where $0 \leq i \leq n$.

The WW-DF framework provides a mechanism for the execution of Spark SQL batches on each of the data frames in a wwhDataFrame, and for the computation of a global Spark computation on the results of the computations of the individual data frames.

The WW-DF framework can leverage the WWH catalog service to reference, to address and to locate the individual data frames in a wwhTable. The location process involves finding and placing each one of data zones where each one of the tables, $Table_i$, is situated. Additionally, the WWH catalog service can be used to locate the specific data sources for each of the data frames represented by a $Table_i$. Leveraging the WWH catalog service not only allows a high level abstraction to be used to address a wwhTable, but has the additional benefit of hiding away from a user the specific locations of where the individual data frames reside, thereby adding an extra level of security.

Each data frame utilized in a given WW-DF framework instance can be created from different data sources, can be analyzed independently of other data frames and can be analyzed in parallel with other data frames.

Figure 18:
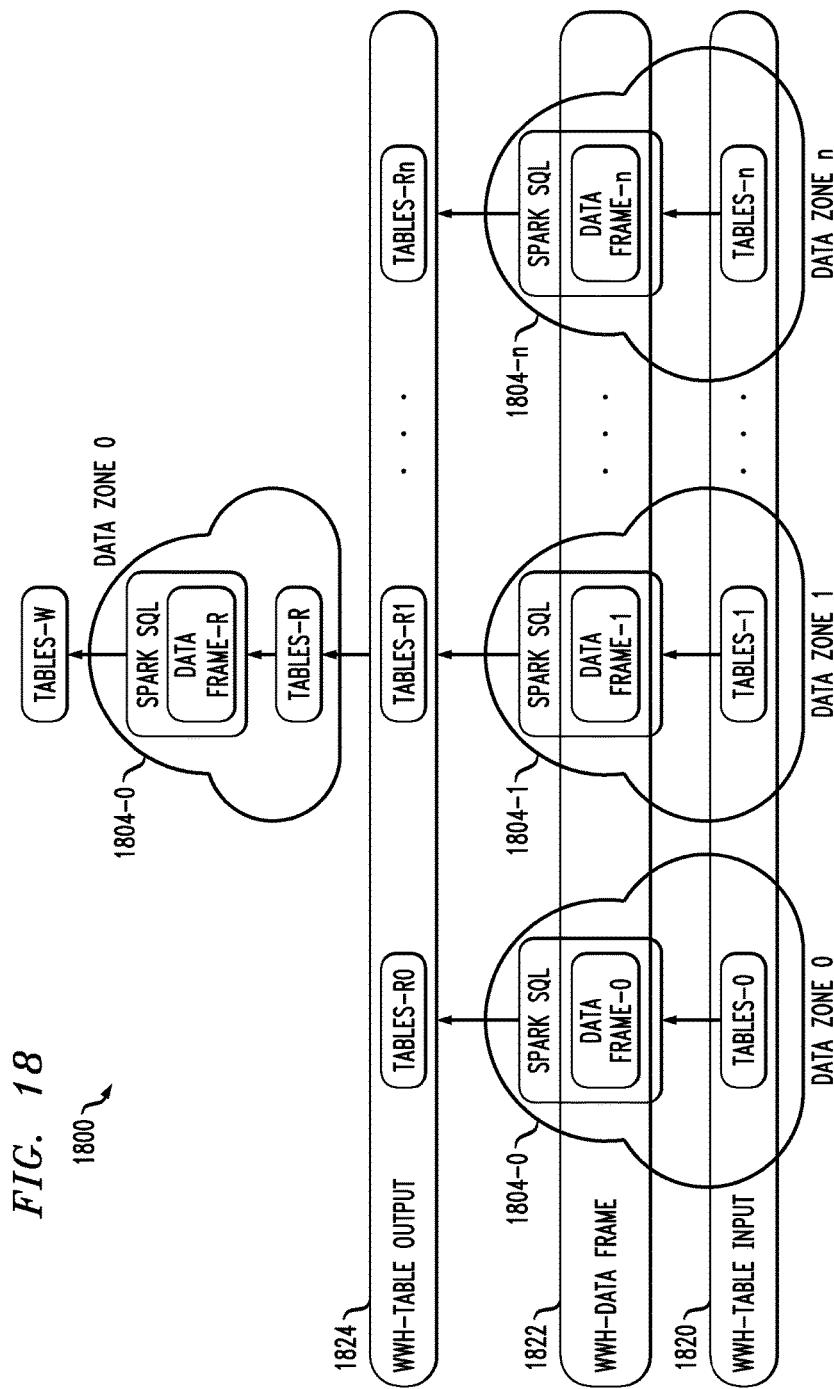

Another example of an information processing system 1800 configured with such a WW-DF framework is shown in FIG. 18. In this embodiment, system 1800 comprises multiple clouds 1804-0, 1804-1, . . . 1804-n, each assumed to correspond to a separate YARN cluster. Cloud 1804-0 includes a Spark SQL component. An application initiated on cloud 1804-0 utilizes the Spark SQL component of that cloud and associated distributed in-memory computations are performed using data resources locally accessible to respective clouds 1804-0 through 1804-n at a data input level 1820. The system 1800 includes a Spark SQL computation level 1822, and a data output level 1824. Results of the distributed in-memory computations performed using the data resources of the data input level 1820 are surfaced via the data output level 1824 back to the Spark SQL component of the initiating cloud 1804-0. These results are further processed in the Spark SQL component in order to provide an appropriate output ("Tables-W") back to the requesting client.

The illustrative embodiments of FIGS. 16-18 are particularly configured for distribution of Spark SQL computations in batch mode, but can be adapted to perform other types of distributed in-memory computation. The distribution of in-memory computations can be across any geographic territory, from clusters located in the same data center to clusters distributed across the world. The distribution can be done across physical domains, such as different physical hardware clusters, or across logical or virtual entities, such as two micro-segments defined by a virtual network framework.

These illustrative embodiments execute portions of Spark SQL computations on each of the data frames in a given WW-DF framework instance, and aggregate the results from the individual data frames into a global computation result. As noted above, the WW-DF framework allows for the independent and parallel execution of Spark SQL computations on each of the data frames in the same or different clusters. Such arrangements ensure that the distributed in-memory computations are performed as close as possible to the corresponding data resources without violating data access or movement restrictions of any data zone.

The WW-DF framework in the embodiments of FIGS. 16-18 is highly flexible and allows computation code to be written in any language that supports the Spark Core API, including JAVA, R, Python and Scala.

As indicated previously, the WW-DF framework in some embodiments is configured to leverage a WWH catalog service to determine the particular clusters to be involved in a given set of distributed in-memory computations. This also involves locating the needed data sources for each of the associated data frames.

The WW-DF framework in some embodiments is configured to manage the distribution of in-memory computations across disparate data processing clusters of a WWH platform, including choosing the appropriate data processing clusters and managing the various data processing requirements and data governance involved when aggregating computation results derived from separate, dispersed datasets.

The WW-DF framework in some embodiments allows computations to be distributed in a recursive fashion that is transparent to an originating client or other user.

In these and other embodiments, the distributed in-memory computations may be performed utilizing multiple instances of local code running on respective nodes within respective ones of the data processing clusters and at least one instance of global code running on an initiating node within or otherwise associated with a particular one of the data processing clusters. The global code receives respective results from the multiple instances of the local code running on the respective nodes within the respective ones of the data processing clusters and aggregates those results. An application running on a client device or on a given cluster node may provide one or more of the local code, the global code and a list of data resources to a distributed processing application master of a WWH component. The list of data resources illustratively identifies particular data resources against which one or more of the local code and the global code are to be executed.

Figure 19:
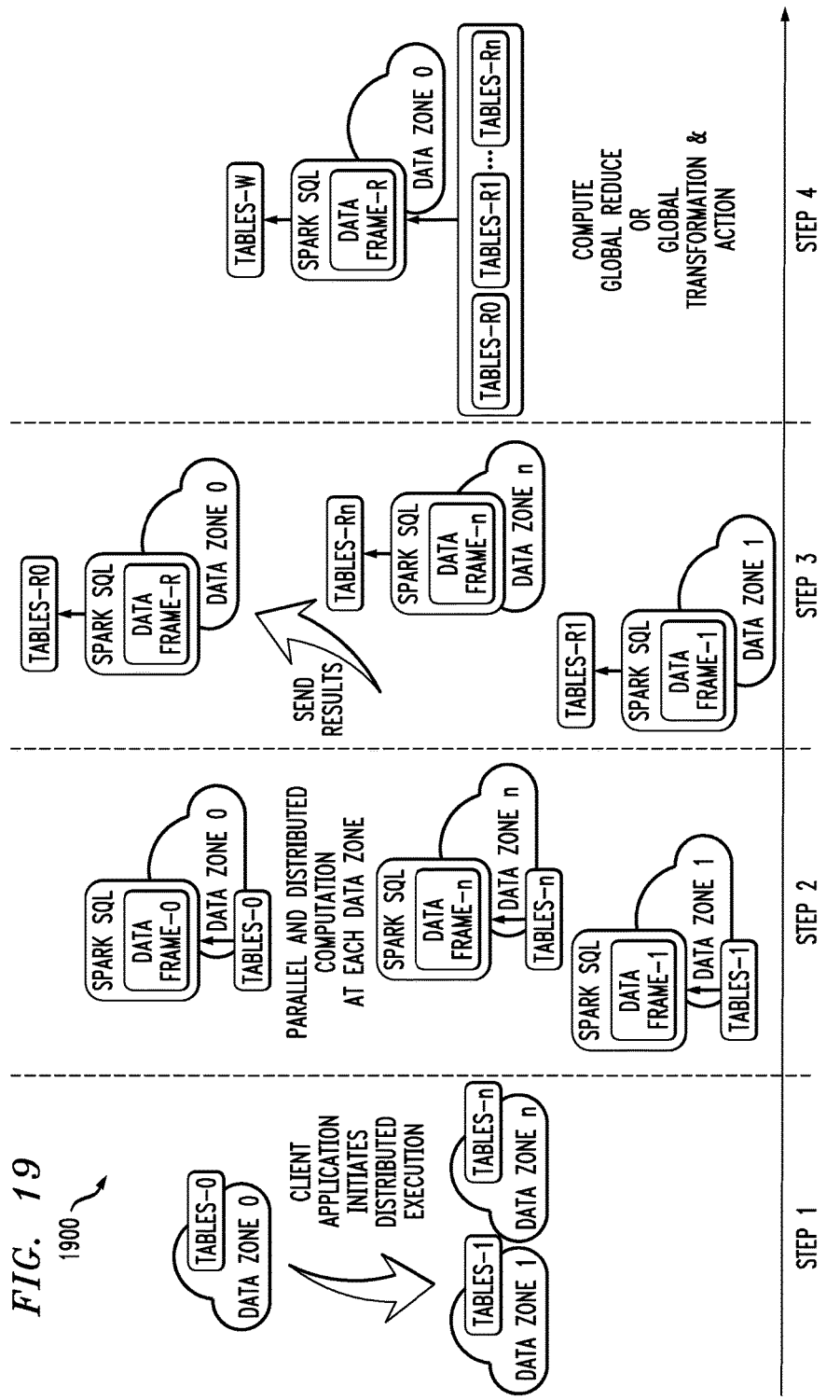

FIG. 19 shows another illustrative embodiment of an information processing system 1900 that performs distributed Spark SQL computations utilizing the WW-DF framework previously described in conjunction with FIGS. 16-18. In this embodiment, the process performed by the system 1900 is separated into four steps, denoted Step 1, Step 2, Step 3 and Step 4.

The process performed by the system 1900 utilizes the Spark SQL data frames and tables as previously described. It implements client application initiated distributed execution in Step 1, parallel and distributed computation by Spark SQL components at each data zone in Step 2, the sending of results generated by respective ones of the Spark SQL components in Step 3, and global reduction of results or global transformation of results with performance of associated action in Step 4.

FIGS. 20-23 show other examples of illustrative embodiments of multi-cluster distributed data processing platforms configured to implement scalable distributed in-memory computation functionality. These embodiments more particularly implement distributed in-memory computation functionality utilizing the Spark MLlib batch mode extension.

Each of these embodiments includes multiple clusters in the form of respective multiple distinct clouds of potentially different types. For example, the multiple clouds may include at least one hybrid cloud that comprises one or more private clouds together with one or more public clouds among which workloads can be migrated, with all clouds of the hybrid cloud sharing a common virtualization management layer. As another example, the multiple clouds may comprise a multi-cloud arrangement comprising a collection of private and/or public clouds associated with a given enterprise.

These and other cloud-based embodiments disclosed herein provide a high degree of flexibility and scalability for implementing Spark batch computations using batch mode extensions and other types of distributed in-memory computations.

Figure 20:
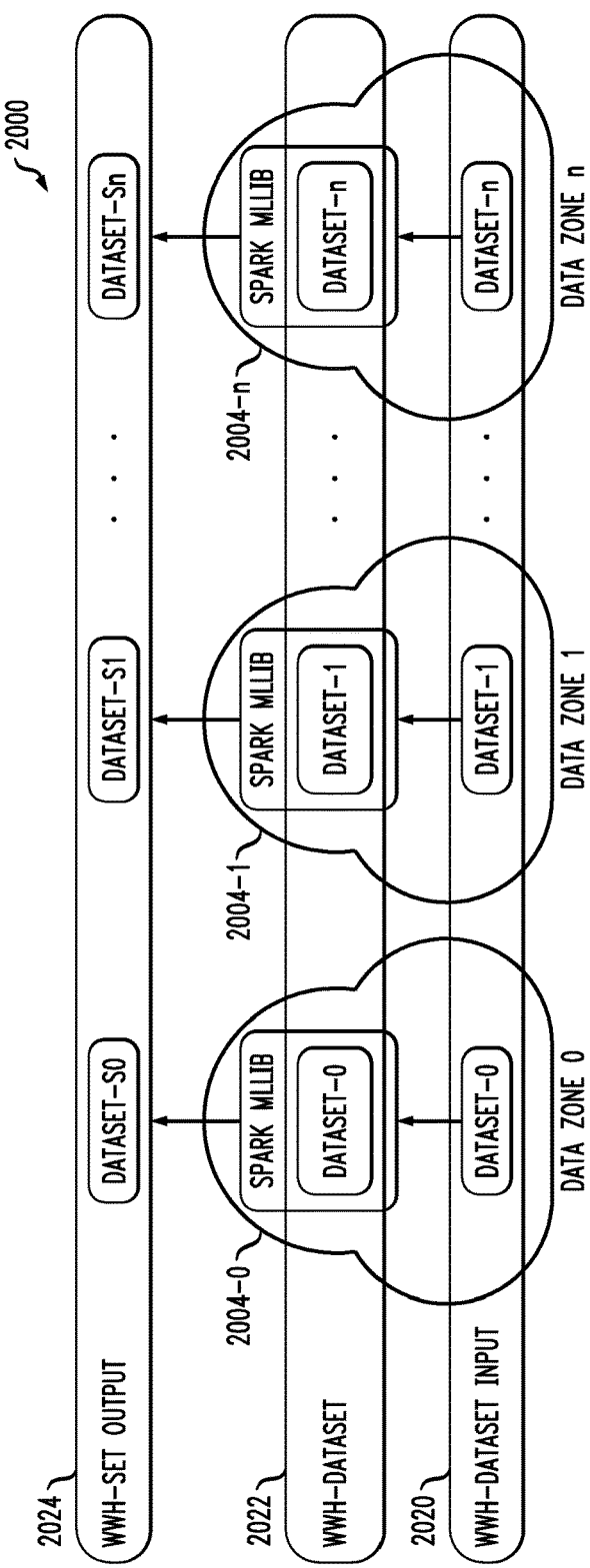
FIGS. 20-23 show additional illustrative embodiments of multi-cluster distributed data processing platforms configured to implement scalable distributed in-memory computation functionality for Spark MLlib computations.

FIG. 20 illustrates one example of a multi-cloud arrangement for distributed in-memory computation using the Spark MLlib batch mode extension. In this particular embodiment, scalable distributed in-memory computation functionality is implemented in an information processing system 2000 using multiple distinct clusters corresponding to respective clouds 2004-0, 2004-1, . . . 2004-$n$ of respective different data zones denoted Data Zone 0, Data Zone 1, . . . Data Zone n. The clouds 2004 may be of the same type or of different types. For example, some embodiments may include a mixture of multiple distinct clouds 2004 of different types, such as an Amazon Web Services cloud, a Microsoft Azure cloud and an on-premises cloud that illustratively comprises a virtual machine based cloud. One or more of the clouds 2004 may be implementing using a corresponding Cloud Foundry platform and local Big Data cluster, although numerous other arrangements are possible.

Each of the clouds 2004 in this embodiment is assumed to comprise a corresponding YARN cluster that includes a Spark MLlib component as illustrated. The Spark MLlib components manage respective datasets denoted DataSet-0, DataSet-1, . . . DataSet-n within their respective YARN clusters. These datasets utilize underlying distributed storage components also denoted DataSet-0, DataSet-1, . . . DataSet-n. Results of computations performed in the respective clusters are provided as data results denoted DataSet-S0, DataSet-S1, . . . DataSet-Sn.

The datasets in a given embodiment may comprise any of a wide variety of different types of structured and unstructured data, including relational database tables, text documentation, pictures, video, device data, log files, genomic sequences, weather readings, social data feeds and many others.

The information processing system 2000 provides an illustrative implementation of an exemplary distributed in-memory computation that is referred to herein as World Wide Data Set ("WW-DS"). Such an arrangement provides an extension to the Spark RDD framework in order to allow Spark MLlib computations to be performed in a distributed manner across multiple clusters associated with different data zones. The framework or portions thereof are also denoted in some of the figures using WWH-DataSet or other similar notations.

The WW-DS framework as illustrated in FIG. 20 is arranged in multiple levels including a data input level 2020, a Spark MLlib computation level 2022, and a data output level 2024. The distributed in-memory computations in this embodiment are performed as close as possible to their respective data sources in the corresponding distributed storage components of the input data layer 2020 of the respective clouds 2004. Results of the computations from the Spark MLlib computation level 2022 are surfaced to the data output level 2024 while the corresponding data remains within the respective data zones of the clouds 2004.

Figure 21:
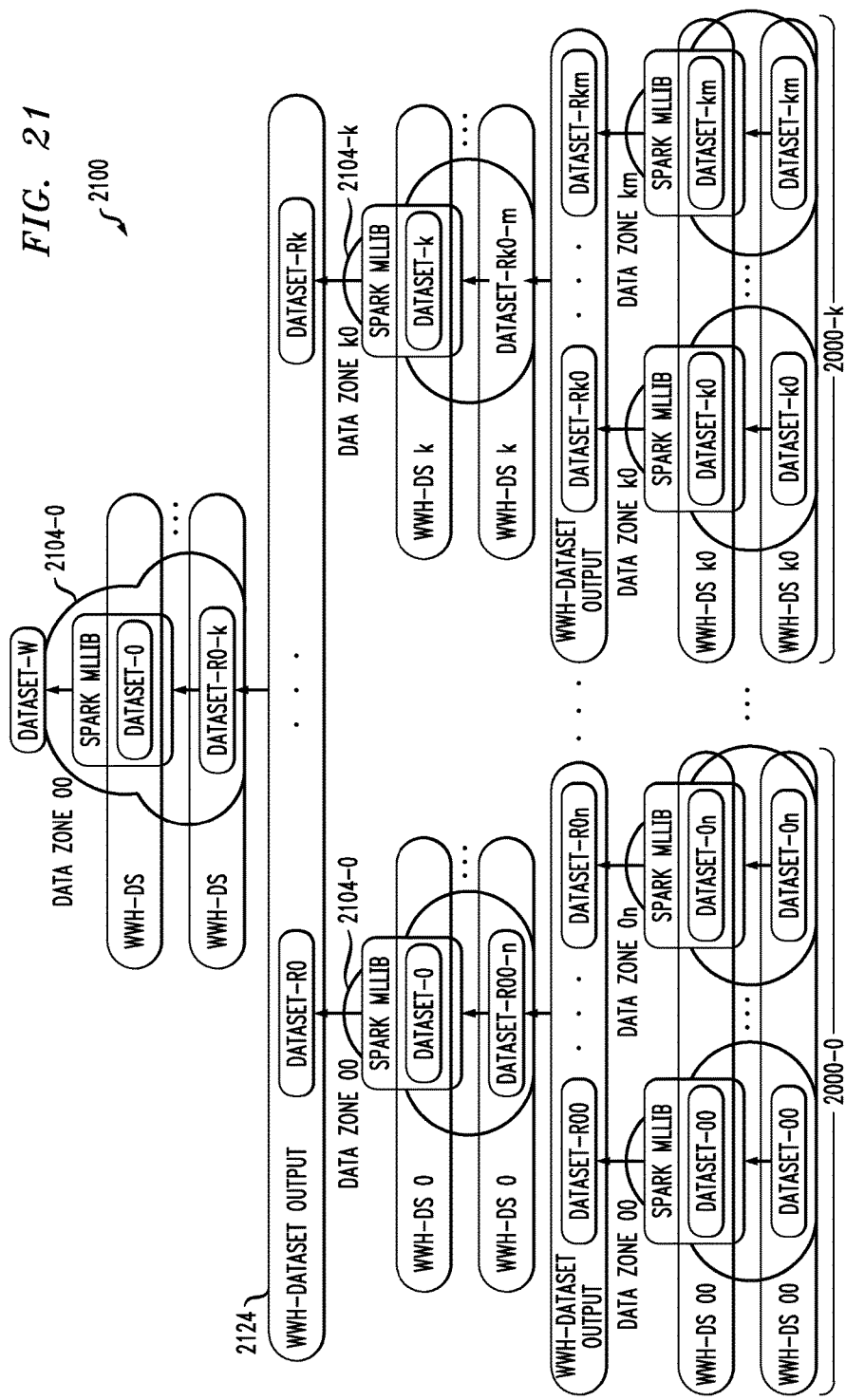

FIG. 21 illustrates an information processing system 2100 in which multiple WW-DS frameworks of the type shown in FIG. 20 are combined in order to support recursiveness in distributed in-memory computations. The system 2100 comprises multiple instances of the system 2000, denoted as systems 2000-0 through 2000-k. The data output level of each of the systems 2000-0 through 2000-k is associated with a different one of a plurality of additional clouds 2104-0 through 2104-k. Each of these additional clouds 2104 is assumed to comprise an additional YARN cluster of the system 2100. Distributed in-memory computation results from the additional clouds 2104 are surfaced through a data output level 2124.

In this embodiment, it is assumed that an initiating application is originated in the cloud 2104-0 and utilizes local data resources of that local cloud and its underlying instance of the system 2000 as well as remote data resources of other ones of the clouds 2104 and their respective underlying instances of the system 2000. The cloud 2104-0 aggregates computation results from the data output level 2124 into a set of datasets ("DataSet-W") that are made available to the requesting client. The data resources utilized in generating those results remain protected within the data zones of their respective clouds.

Numerous other implementations of recursion in distributed in-memory computations can be implemented utilizing WW-DS frameworks of the type described in conjunction with the embodiments of FIGS. 20 and 21.

An example implementation of the WW-DS framework for performance of distributed Spark MLlib computations will now be described in greater detail. This example utilizes what are more generally referred to herein as local data structures and global data structures for performing respective local and global Spark MLlib computations.

In this example, an extension of the Spark dataset abstraction is configured to transcend the boundaries of a given cluster and its associated data zone. More particularly, a given data scientist or other type of system user is exposed to an abstraction of a wwhDataSet comprising a collection of data objects $obj_i$ and represented as wwhDataSet=$\{obj_1, obj_2, \ldots, obj_m\}$.

In the context of a wwhDataSet, the objects in the collection do not need to exist in a single central location or be accessed through a single cluster, and can be scattered around several other tables. Consider a set of datasets DataSetSet, represented as DataSetSet=$\{DataSet_0, DataSet_1, \ldots, DataSet_n\}$. A wwhDataSet is said to be derived from DataSetSet, represented as wwhDataSet=$\delta$(DataSetSet), when the following holds true:

1. Each object in the wwhDataSet is a subset of an object in one of the datasets in DataSetSet. More formally, $\forall object_i \in$ wwhDataSet, where $1 \leq i \leq m$, $\exists DataSet_j \in$ DataSetSet and an $object_i^j \in DataSet_j$, such that $object_i \subseteq object_i^j$.

2. All objects in all the datasets in DataSetSet are actually represented in wwhDataSet. More formally, $\forall DataSet_j \in$ DataSetSet, and $\forall object_i^j \in DataSet_j$, $\exists object_i \in$ wwhDataSet, where $objects_i \subseteq object_i^j$.

3. The number of objects in wwhDataSet is the same as the sum of the number of objects in all the datasets in DataSetSet. More formally, $|wwhDataSet|=\Sigma_{i=0}^n |DataSet_i|$.

It should be noted that the dataset wwhDataSet is not a unique set in the sense that several objects in the dataset may have exactly the same content. Also, the objects in wwhDataSet need not have all of the fields in the objects in wwhDataSet. In fact, the objects in wwhDataSet need only be a subset of the objects in the datasets in DataSetSet.

The same abstraction of a wwhDataSet is given to the dataset that is going to be analyzed or computed, referred to as wwhDataSet$^{Input}$, as to the dataset that results from the computation, referred to as wwhDataSet$^{Output}$.

A wwhDataSet is derived from a set of datasets, where the following properties hold: Recursiveness: where a wwhDataSet can consist of other datasets as originally defined in Spark, representing a terminal case of the recursiveness, or other wwhDataSets, in which case another layer of recursiveness needs to be traversed. In other words, a wwhDataSet is derived from DataSetSet where a DataSet may consist of other wwhDataSet. More formally, wwhDataSet=$\delta$(DataSetSet)=$\delta(\{DataSet_0, DataSet_1, \ldots, DataSet_n\})$, where $\forall_{0 \leq i \leq n}$, $DataSet_i=\delta$(DataSetSet$_i$).

Geo-Distribution: where wwhDataSet=$\delta$(DataSetSet)=$\delta(\{DataSet_0, DataSet_1, \ldots, DataSet_n\})$ and each $DataSet_i$ can be located in a different physical location, also referred to as a data zone. In other words, the individual datasets from which a wwhDataSet is derived can be geographically distributed, or can all be in a single location, or any variation in between.

Data Locality: where each dataset $DataSet_i$ from which wwhDataSet is derived can benefit from the advantages of data locality, meaning that it is created as close as possible to its data source and analyzed as close as possible to where it was created and it is stored.

Data Heterogeneity: where each one of the datasets $DataSet_i$ from which wwhDataSet is derived from, do not need to have the same format. In other words, each dataset can consist of objects that differ from the objects on other datasets, as long as all the objects actually are a super set of the objects represented in wwhDataSet. More formally, $\forall DataSet_j \in DataSetSet$, and $\forall object_i^j \in DataSet_j$, fields (object$\in$wwhDataSet)$\subseteq object_i^j$. The data heterogeneity property illustratively allows a data scientist or other user to focus on the fields of the objects that are at the intersection of the distributed datasets. This feature expands the range of data that can be included in the computation as it relaxes any constraints associated with requiring that all data zones agree on the format of the data or on the uniformity of the datasets, before a computation is actually performed.

Data Diversity: where in a wwhDataSet, each one of the datasets $DataSet_i$ from which wwhDataSet is derived, the following holds:

Each $DataSet_i$ in the set DataSetSet can be created from different data sources;

Each $DataSet_i$ in the set DataSetSet can be analyzed independently of the others; and Each $DataSet_i$ in the set DataSetSet can be analyzed in parallel with the others.

In this example, users can leverage the WW-DS framework as described above to orchestrate and automate the distributed execution of Spark MLlib computations in batch mode.

More formally, a user can define an operation to be performed on a wwhDataSet=$\delta$(DataSetSet)=$\delta(\{DataSet_0, DataSet_1, \ldots, DataSet_n\})$ and the WW-DS framework specified above orchestrates the distribution and parallelization of the computation in each one of the datasets $DataSet_i$, where $0 \le i \le n$.

The WW-DS framework provides a mechanism for the execution of Spark MLlib batches on each of the datasets in a wwhDataSet, and for the computation of a global Spark computation on the results of the computations of the individual datasets.

The WW-DS framework can leverage the WWH catalog service to reference, to address and to locate the individual datasets in a wwhDataSet. The location process involves finding and placing each one of data zones where each one of the datasets, $DataSet_i$, is situated. Additionally, the WWH catalog service can be used to locate the specific data sources for each of the datasets represented by a $DataSet_i$. Leveraging the WWH catalog service not only allows a high level abstraction to be used to address a wwhDataSet, but has the additional benefit of hiding away from a user the specific locations of where the individual datasets reside, thereby adding an extra level of security.

Each dataset utilized in a given WW-DS framework instance can be created from different data sources, can be analyzed independently of other datasets and can be analyzed in parallel with other datasets.

Figure 22:
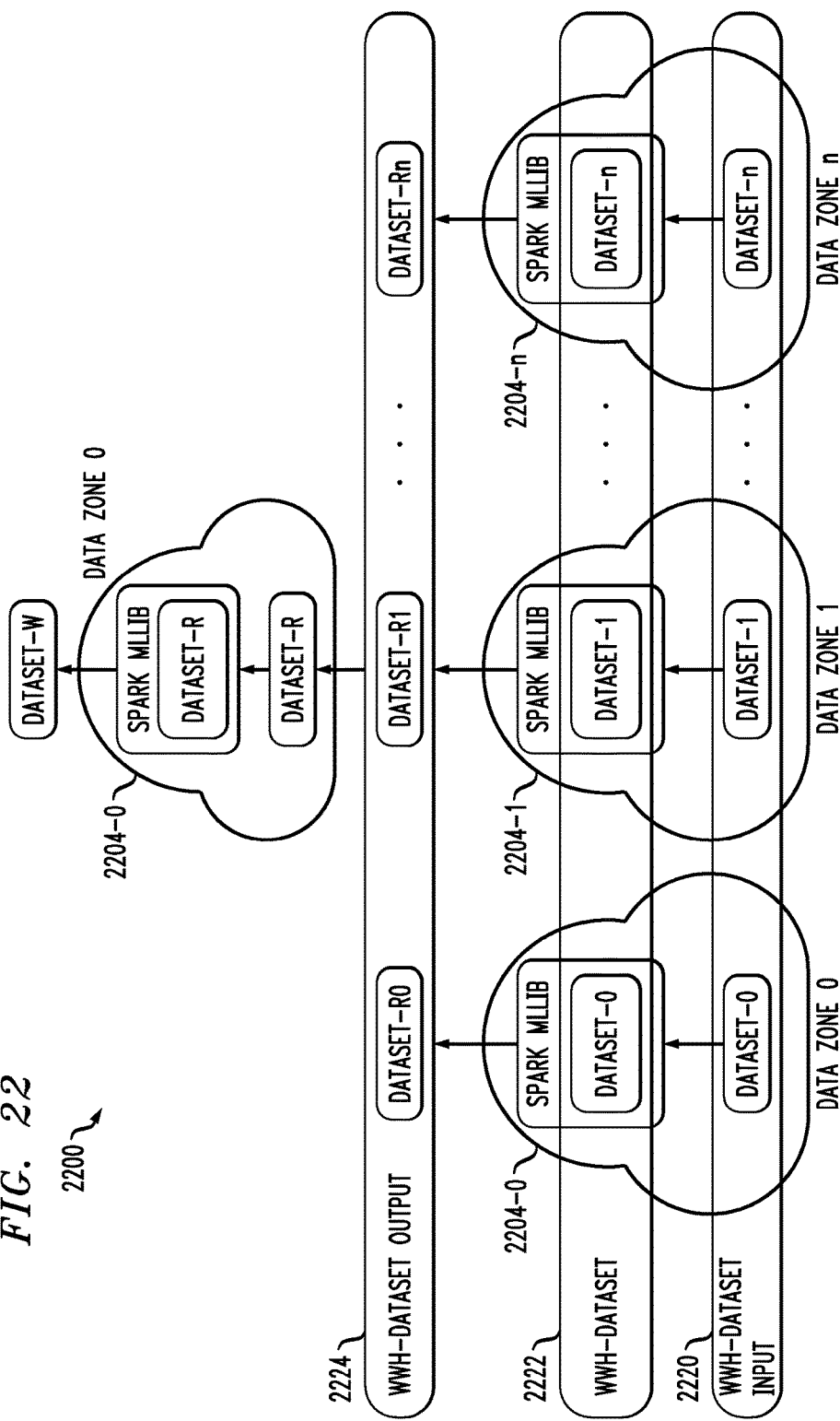

Another example of an information processing system 2200 configured with such a WW-DS framework is shown in FIG. 22. In this embodiment, system 2200 comprises multiple clouds 2204-0, 2204-1, . . . 2204-n, each assumed to correspond to a separate YARN cluster. Cloud 2204-0 includes a Spark MLlib component. An application initiated on cloud 2204-0 utilizes the Spark MLlib component of that cloud and associated distributed in-memory computations are performed using data resources locally accessible to respective clouds 2204-0 through 2204-n at a data input level 2220. The system 2200 includes a Spark MLlib computation level 2222, and a data output level 2224. Results of the distributed in-memory computations performed using the data resources of the data input level 2220 are surfaced via the data output level 2224 back to the Spark MLlib component of the initiating cloud 2204-0. These results are further processed in the Spark MLlib component in order to provide an appropriate output ("DataSet-W") back to the requesting client.

The illustrative embodiments of FIGS. 20-22 are particularly configured for distribution of Spark MLlib computations in batch mode, but can be adapted to perform other types of distributed in-memory computation. The distribution of in-memory computations can be across any geographic territory, from clusters located in the same data center to clusters distributed across the world. The distribution can be done across physical domains, such as different physical hardware clusters, or across logical or virtual entities, such as two micro-segments defined by a virtual network framework.

These illustrative embodiments execute portions of Spark MLlib computations on each of the datasets in a given WW-DS framework instance, and aggregate the results from the individual datasets into a global computation result. As noted above, the WW-DS framework allows for the independent and parallel execution of Spark MLlib computations on each of the datasets in the same or different clusters. Such arrangements ensure that the distributed in-memory computations are performed as close as possible to the corresponding data resources without violating data access or movement restrictions of any data zone.

The WW-DS framework in the embodiments of FIGS. 20-22 is highly flexible and allows computation code to be written in any language that supports the Spark Core API, including JAVA, R, Python and Scala.

As indicated previously, the WW-DS framework in some embodiments is configured to leverage a WWH catalog service to determine the particular clusters to be involved in a given set of distributed in-memory computations. This also involves locating the needed data sources for each of the associated datasets.

The WW-DS framework in some embodiments is configured to manage the distribution of in-memory computations across disparate data processing clusters of a WWH platform, including choosing the appropriate data processing clusters and managing the various data processing requirements and data governance involved when aggregating computation results derived from separate, dispersed datasets.

The WW-DS framework in some embodiments allows computations to be distributed in a recursive fashion that is transparent to an originating client or other user.

In these and other embodiments, the distributed in-memory computations may be performed utilizing multiple instances of local code running on respective nodes within respective ones of the data processing clusters and at least one instance of global code running on an initiating node within or otherwise associated with a particular one of the data processing clusters. The global code receives respective results from the multiple instances of the local code running on the respective nodes within the respective ones of the data processing clusters and aggregates those results. An application running on a client device or on a given cluster node may provide one or more of the local code, the global code and a list of data resources to a distributed processing application master of a WWH component. The list of data resources illustratively identifies particular data resources against which one or more of the local code and the global code are to be executed.

Figure 23:
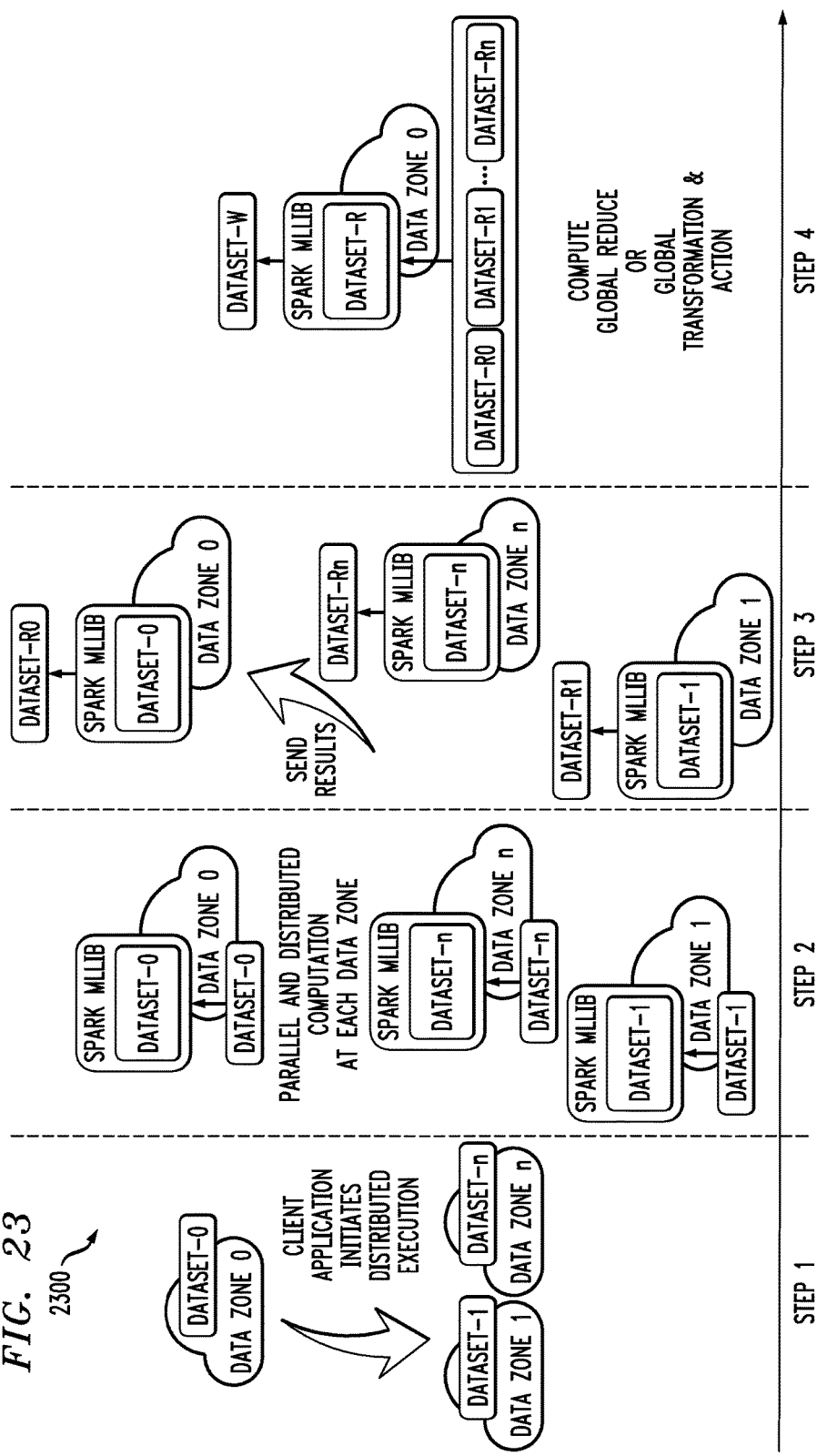

FIG. 23 shows another illustrative embodiment of an information processing system 2300 that performs distributed Spark MLlib computations utilizing the WW-DS framework previously described in conjunction with FIGS. 20-22. In this embodiment, the process performed by the system 2300 is separated into four steps, denoted Step 1, Step 2, Step 3 and Step 4.

The process performed by the system 2300 utilizes the Spark MLlib datasets as previously described. It implements client application initiated distributed execution in Step 1, parallel and distributed computation by Spark MLlib components at each data zone in Step 2, the sending of results generated by respective ones of the Spark MLlib components in Step 3, and global reduction of results or global transformation of results with performance of associated action in Step 4.

FIGS. 24-27 show other examples of illustrative embodiments of multi-cluster distributed data processing platforms configured to implement scalable distributed in-memory computation functionality. These embodiments more particularly implement distributed in-memory computation functionality utilizing the Spark GraphX batch mode extension.

Each of these embodiments includes multiple clusters in the form of respective multiple distinct clouds of potentially different types. For example, the multiple clouds may include at least one hybrid cloud that comprises one or more private clouds together with one or more public clouds among which workloads can be migrated, with all clouds of the hybrid cloud sharing a common virtualization management layer. As another example, the multiple clouds may comprise a multi-cloud arrangement comprising a collection of private and/or public clouds associated with a given enterprise.

These and other cloud-based embodiments disclosed herein provide a high degree of flexibility and scalability for implementing Spark batch computations using batch mode extensions and other types of distributed in-memory computations.

Figure 24:
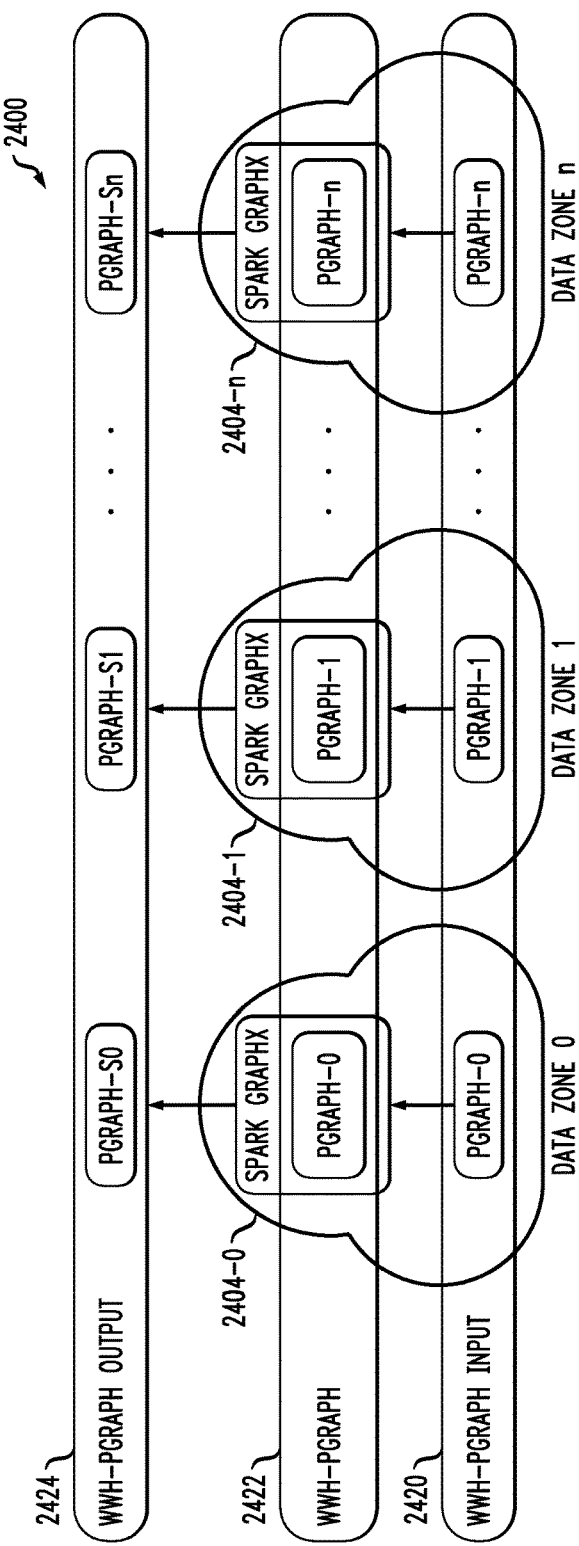
FIGS. 24-27 show additional illustrative embodiments of multi-cluster distributed data processing platforms configured to implement scalable distributed in-memory computation functionality for Spark GraphX computations.

FIG. 24 illustrates one example of a multi-cloud arrangement for distributed in-memory computation using the Spark GraphX batch mode extension. In this particular embodiment, scalable distributed in-memory computation functionality is implemented in an information processing system 2400 using multiple distinct clusters corresponding to respective clouds 2404-0, 2404-1, . . . 2404-n of respective different data zones denoted Data Zone 0, Data Zone 1, . . . Data Zone n. The clouds 2404 may be of the same type or of different types. For example, some embodiments may include a mixture of multiple distinct clouds 2404 of different types, such as an Amazon Web Services cloud, a Microsoft Azure cloud and an on-premises cloud that illustratively comprises a virtual machine based cloud. One or more of the clouds 2404 may be implemented using a corresponding Cloud Foundry platform and local Big Data cluster, although numerous other arrangements are possible.

Each of the clouds 2404 in this embodiment is assumed to comprise a corresponding YARN cluster that includes a Spark GraphX component as illustrated. The Spark GraphX components manage respective property graphs ("pgraphs") denoted PGraph-0, PGraph-1, . . . PGraph-n within their respective YARN clusters. These property graphs utilize underlying distributed storage components also denoted PGraph-0, PGraph-1, . . . PGraph-n. Results of computations performed in the respective clusters are provided as data results denoted PGraph-S0, PGraph-S1, . . . PGraph-Sn.

The property graphs in a given embodiment may comprise any of a wide variety of different types of structured and unstructured data, including relational database tables, text documentation, pictures, video, device data, log files, genomic sequences, weather readings, social data feeds and many others.

The information processing system 2400 provides an illustrative implementation of an exemplary distributed in-memory computation that is referred to herein as World Wide Property Graph ("WW-PG"). Such an arrangement provides an extension to the Spark RDD framework in order to allow Spark GraphX computations to be performed in a distributed manner across multiple clusters associated with different data zones. The framework or portions thereof are also denoted in some of the figures using WWH-PGraph or other similar notations.

The WW-PG framework as illustrated in FIG. 24 is arranged in multiple levels including a data input level 2420, a Spark GraphX computation level 2422, and a data output level 2424. The distributed in-memory computations in this embodiment are performed as close as possible to their respective data sources in the corresponding distributed storage components of the input data layer 2420 of the respective clouds 2404. Results of the computations from the Spark GraphX computation level 2422 are surfaced to the data output level 2424 while the corresponding data remains within the respective data zones of the clouds 2404.

Figure 25:
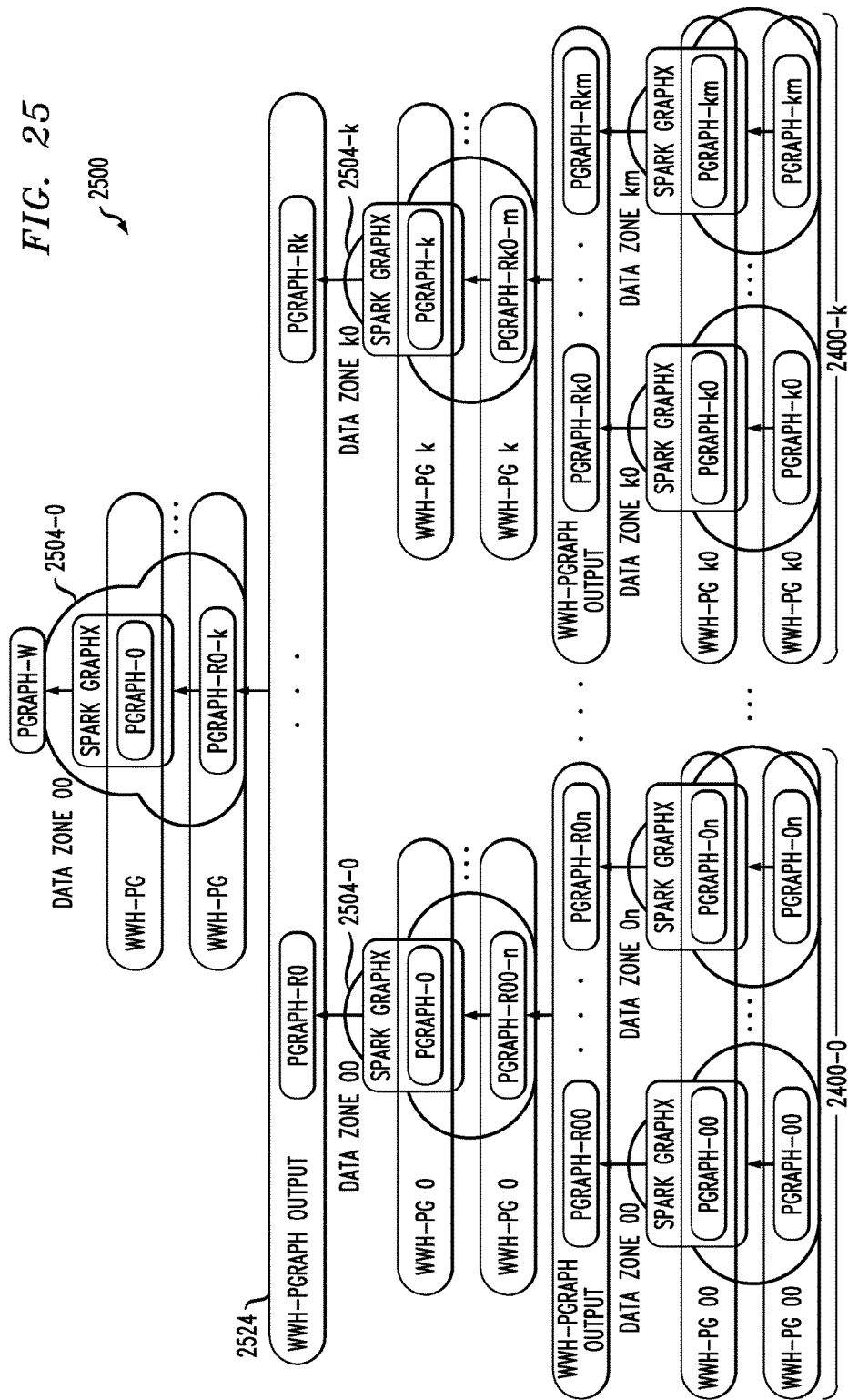

FIG. 25 illustrates an information processing system 2500 in which multiple WW-PG frameworks of the type shown in FIG. 24 are combined in order to support recursiveness in distributed in-memory computations. The system 2500 comprises multiple instances of the system 2400, denoted as systems 2400-0 through 2400-k. The data output level of each of the systems 2400-0 through 2400-k is associated with a different one of a plurality of additional clouds 2504-0 through 2504-k. Each of these additional clouds 2504 is assumed to comprise an additional YARN cluster of the system 2500. Distributed in-memory computation results from the additional clouds 2504 are surfaced through a data output level 2524.

In this embodiment, it is assumed that an initiating application is originated in the cloud 2504-0 and utilizes local data resources of that local cloud and its underlying instance of the system 2400 as well as remote data resources of other ones of the clouds 2504 and their respective underlying instances of the system 2400. The cloud 2504-0 aggregates computation results from the data output level 2524 into a set of property graphs ("PGraph-W") that are made available to the requesting client. The data resources utilized in generating those results remain protected within the data zones of their respective clouds.

Numerous other implementations of recursion in distributed in-memory computations can be implemented utilizing WW-PG frameworks of the type described in conjunction with the embodiments of FIGS. 24 and 25.

An example implementation of the WW-PG framework for performance of distributed Spark GraphX computations will now be described in greater detail. This example utilizes what are more generally referred to herein as local data structures and global data structures for performing respective local and global Spark GraphX computations.

In this example, an extension of the Spark property graph ("pgraph") abstraction is configured to transcend the boundaries of a given cluster and its associated data zone. More particularly, a given data scientist or other type of system user is exposed to an abstraction of a wwhPGraph, comprising of a set of annotated vertexes V and a set of annotated edges E, and represented as wwhPGraph=$\langle V, E \rangle$. The set of annotated vertexes V is represented as $V=\{v_1, v_2, \ldots, v_m\}$, and the set of annotated edges E is represented as $E=\{e_1, e_2, \ldots, e_k\}$. Each vertex is illustratively keyed by a unique 64-bit long identifier ("VertexId"). GraphX does not impose any ordering constraints on the vertex identifiers. Similarly, edges have corresponding source and destination vertex identifiers.

This example utilizes an innovative construct referred to herein as a "containment relationship of vertexes," whereby an annotated vertex $v_i$ in a property graph $pg_x$ is contained on another annotated vertex $v_j$ in a property graph $pg_y$, represented as $v_i \subseteq v_j$, when the following holds true:

1. All the annotated properties in $v_i$ are also annotated properties in $v_j$.

2. For each annotated edge $e_k$ in graph $pg_x$ that initiates in $v_i$ and terminates on another annotated vertex $v_l$ in the property graph $pg_x$, there is also an annotated edge $e_p$ in graph $pg_y$ that initiates on $v_j$ and terminates on $v_q$, such that all the annotated properties of $v_l$ are also annotated properties of $v_q$. It is important to note that it is not necessary that $v_l \subseteq v_q$.

In the context of a wwhPGraph, the annotated vertexes and the annotated edges do not need to exist in a single central location and can be scattered around several other locations. Consider a set of property graphs PGraphSet, represented as PGraphSet=$\{PGraph_0, PGraph_1, \ldots, PGraph_n\}$. A wwhPGraph is said to be derived from PGraphSet, represented as wwhPGraph=$\delta$(PGraphSet), when the following holds true:

1. Each annotated vertex and each annotated edge in the wwhPGraph exists in one of the property graphs in PGraph- Set. More formally, $\forall v_i \in \text{wwhPGraph}$, where $1 \le i \le m$, $\exists \text{PGraph}_j \in \text{PGraphSet}$ and a $v_j^j \in \text{PGraph}_j$, such that $v_i \perp v_j^j$. It is important to note that the containment relationship of an annotated vertex $v_i$ in the wwhPGraph relates to another annotated vertex $v_j^j$ in a single property graph $\text{PGraph}_j$. In other words, the annotated vertex $v_i$ cannot be contained in another annotated vertex $v_j$, where, in order for $v_j$ to contain $v_i$, $v_j$ has edges with other vertexes that are not in $\text{PGraph}_j$. In essence, all the edges that initiate in $v_j$ and that are required for $v_j$ to contain $v_i$, must terminate in an annotated vertex $v_q$ where $v_q$ is in the property graph $\text{PGraph}_j$.

2. All the annotated vertexes and all the annotated edges in PGraphSet are actually represented in wwhPGraph. More formally, $\forall \text{PGraph}_j \in \text{PGraphSet}$, and $\forall v_j^j \in \text{PGraph}_j$, $\exists v_i \in \text{wwhPGraph}$, where $v_i \perp v_j^j$. Again, it is important to note that the annotated vertex in wwhPGraph need not be an exact replica of an annotated vertex in $\text{PGraph}_j$. The requirement is for the containment relationship only.

Additional features of the property graph abstraction in this example may be similar to those previously described in conjunction with the data frame and dataset abstraction examples previously described.

Each property graph utilized in a given WW-PG framework instance can be created from different data sources, can be analyzed independently of other property graphs and can be analyzed in parallel with other property graphs.

Figure 26:
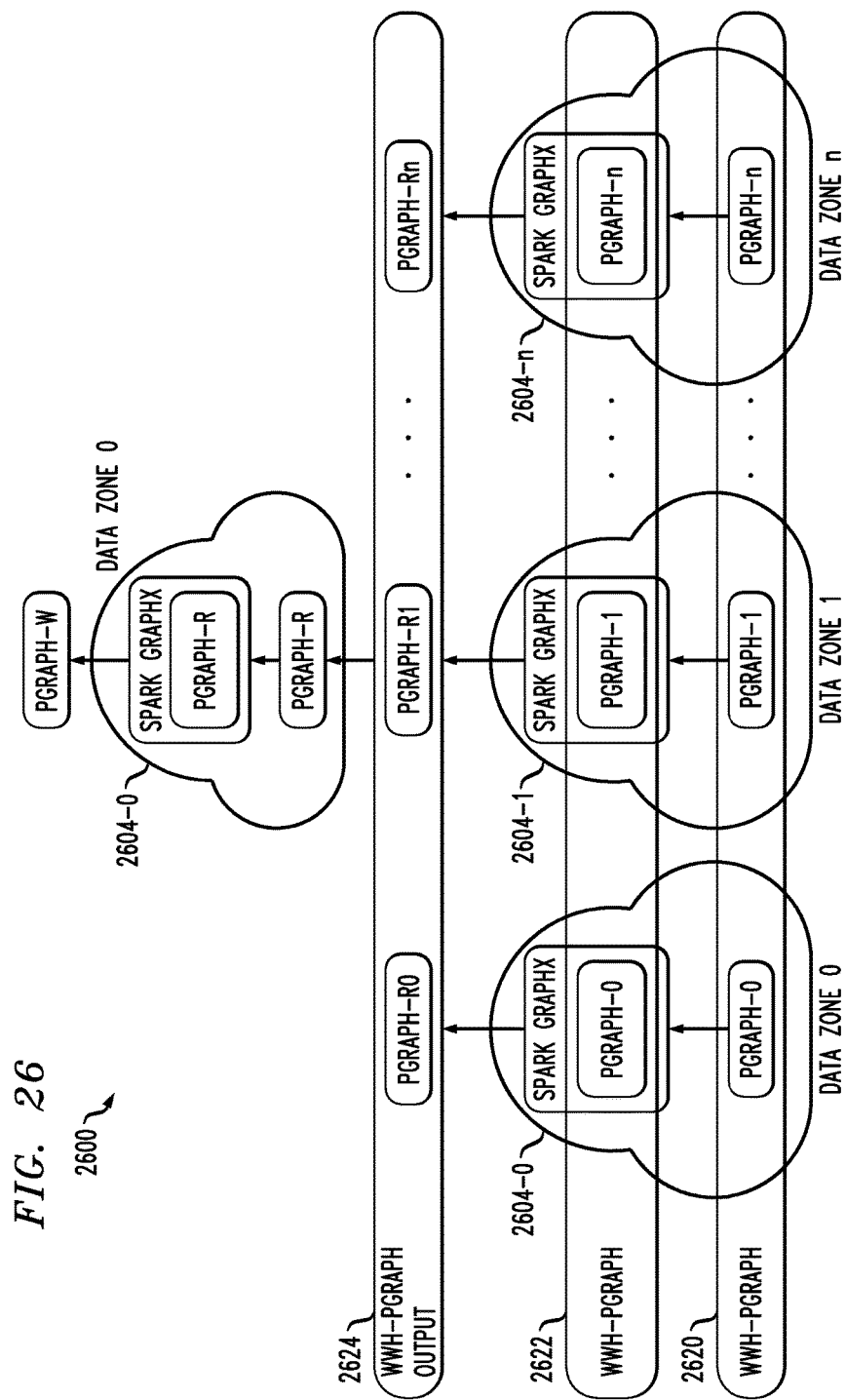

Another example of an information processing system 2600 configured with such a WW-PG framework is shown in FIG. 26. In this embodiment, system 2600 comprises multiple clouds 2604-0, 2604-1, . . . 2604-n, each assumed to correspond to a separate YARN cluster. Cloud 2604-0 includes a Spark GraphX component. An application initiated on cloud 2604-0 utilizes the Spark GraphX component of that cloud and associated distributed in-memory computations are performed using data resources locally accessible to respective clouds 2604-0 through 2604-n at a data input level 2620. The system 2600 includes a Spark GraphX computation level 2622, and a data output level 2624. Results of the distributed in-memory computations performed using the data resources of the data input level 2620 are surfaced via the data output level 2624 back to the Spark GraphX component of the initiating cloud 2604-0. These results are further processed in the Spark GraphX component in order to provide an appropriate output ("PGraph-W") back to the requesting client.

The illustrative embodiments of FIGS. 24-26 are particularly configured for distribution of Spark GraphX computations in batch mode, but can be adapted to perform other types of distributed in-memory computation. The distribution of in-memory computations can be across any geographic territory, from clusters located in the same data center to clusters distributed across the world. The distribution can be done across physical domains, such as different physical hardware clusters, or across logical or virtual entities, such as two micro-segments defined by a virtual network framework.

These illustrative embodiments execute portions of Spark GraphX computations on each of the property graphs in a given WW-PG framework instance, and aggregate the results from the individual property graphs into a global computation result. As noted above, the WW-PG framework allows for the independent and parallel execution of Spark GraphX computations on each of the property graphs in the same or different clusters. Such arrangements ensure that the distributed in-memory computations are performed as close as possible to the corresponding data resources without violating data access or movement restrictions of any data zone.

The WW-PG framework in the embodiments of FIGS. 24-26 is highly flexible and allows computation code to be written in any language that supports the Spark Core API, including JAVA, R, Python and Scala.

The WW-PG framework in some embodiments is configured to leverage a WWH catalog service to determine the particular clusters to be involved in a given set of distributed in-memory computations. This also involves locating the needed data sources for each of the associated property graphs.

The WW-PG framework in some embodiments is configured to manage the distribution of in-memory computations across disparate data processing clusters of a WWH platform, including choosing the appropriate data processing clusters and managing the various data processing requirements and data governance involved when aggregating computation results derived from separate, dispersed datasets.

The WW-PG framework in some embodiments allows computations to be distributed in a recursive fashion that is transparent to an originating client or other user.

In these and other embodiments, the distributed in-memory computations may be performed utilizing multiple instances of local code running on respective nodes within respective ones of the data processing clusters and at least one instance of global code running on an initiating node within or otherwise associated with a particular one of the data processing clusters. The global code receives respective results from the multiple instances of the local code running on the respective nodes within the respective ones of the data processing clusters and aggregates those results. An application running on a client device or on a given cluster node may provide one or more of the local code, the global code and a list of data resources to a distributed processing application master of a WWH component. The list of data resources illustratively identifies particular data resources against which one or more of the local code and the global code are to be executed.

Figure 27:
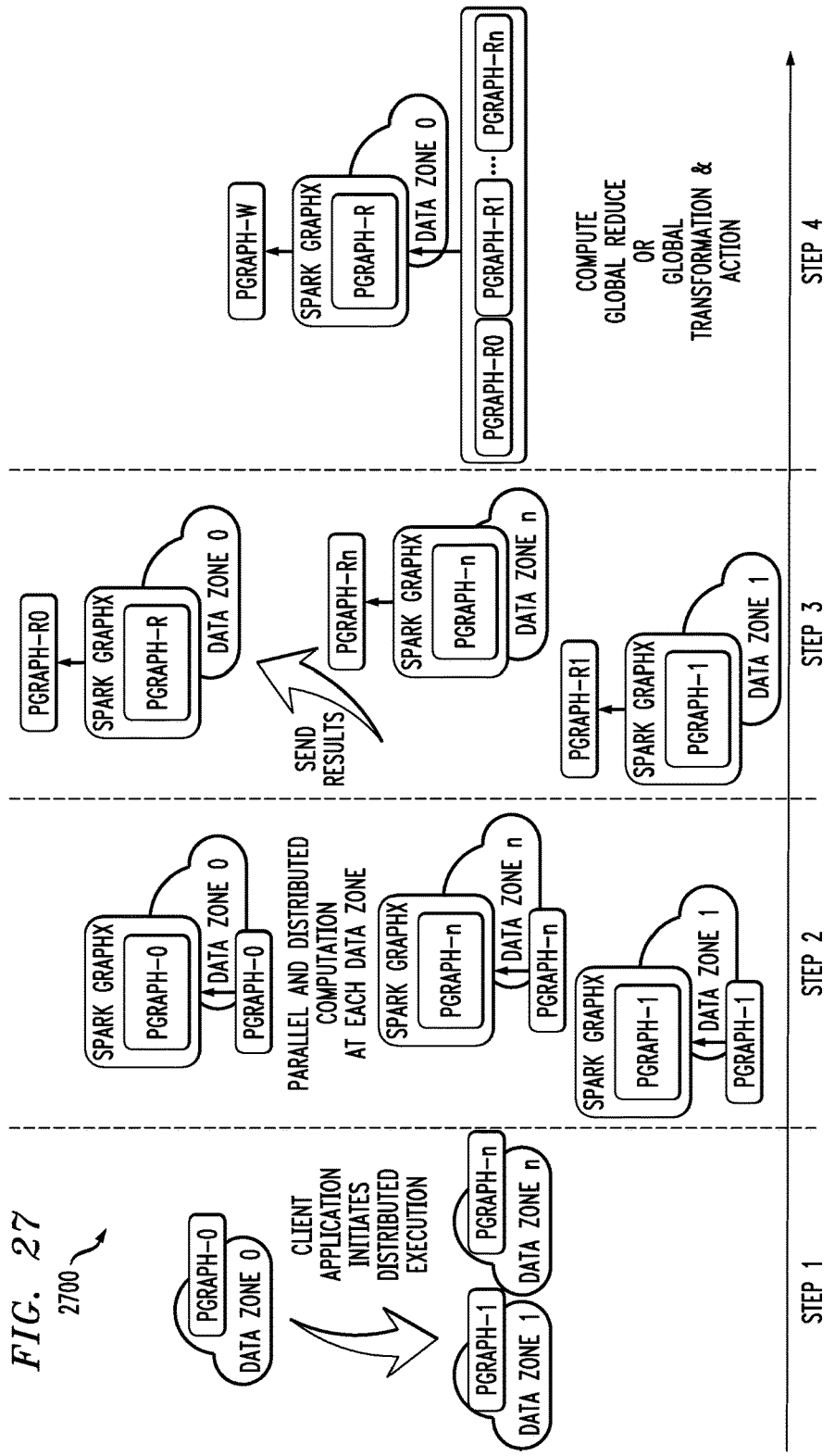

FIG. 27 shows another illustrative embodiment of an information processing system 2700 that performs distributed Spark GraphX computations utilizing the WW-PG framework previously described in conjunction with FIGS. 24-26. In this embodiment, the process performed by the system 2700 is separated into four steps, denoted Step 1, Step 2, Step 3 and Step 4.

The process performed by the system 2700 utilizes the Spark GraphX property graphs as previously described. It implements client application initiated distributed execution in Step 1, parallel and distributed computation by Spark GraphX components at each data zone in Step 2, the sending of results generated by respective ones of the Spark GraphX components in Step 3, and global reduction of results or global transformation of results with performance of associated action in Step 4.

The particular processing operations and other system functionality described in conjunction with the diagrams of FIGS. 2 through 27 are therefore presented by way of illustrative example only, and should not be construed as limiting the scope of the invention in any way. Alternative embodiments can use other types of processing operations for implementing distributed in-memory computations in multi-cluster distributed data processing platforms. For example, the ordering of the process steps may be varied in other embodiments, or certain steps may be performed concurrently with one another rather than serially. Also, one or more of the process steps may be repeated periodically for different types of in-memory computation functionality, or multiple instances of the described processes can be performed in parallel with one another on different sets of distributed data processing clusters within a given information processing system.

Scalable distributed in-memory computation functionality such as that described in conjunction with the diagrams of FIGS. 2 through 27 can be implemented at least in part in the form of one or more software programs stored in memory and executed by a processor of a processing device such as a computer or server within a distributed data processing platform. As will be described below, a memory or other storage device having executable program code of one or more software programs embodied therein is an example of what is more generally referred to herein as a "processor-readable storage medium."

It is apparent from the above that illustrative embodiments can be configured to perform Big Data analytics processing and other types of distributed in-memory computations using a multitude of disparate data sources, many of which cannot be consolidated for a variety of reasons, including concerns with regards to data residency, data sovereignty, data ownership, data anonymization, data governance, or the raw size of the data which puts severe constraints on the network bandwidth and speed requirements for data transmission.

For example, with regard to geographic limits on data movement, some data types such as genetic records cannot be shared across geographic boarders due to laws, regulations or even tax consequences. Illustrative embodiments can be configured to run the analysis locally but to share the results, thereby more readily complying with these regulations while also allowing for the processing of the data to be developed, coordinated, and handled centrally as a single clustered system.

As another example, with regard to data anonymization, data may include sensitive personal data for which potential disclosure should be limited wherever possible. Thus, it is highly undesirable to collect all the data in a single location that is open to misuse or security breach. Illustrative embodiments can be configured to allow a first level of analysis to occur locally within a given distributed data processing cluster, with only anonymized and filtered data centralized for follow-on analysis.

In addition, with regard to data ownership, in many cases companies, governments, and other public and private institutions may not wish to share raw data for a variety of reasons, including disclosure risk, competitive advantage, or necessary permissions for sharing the data. Illustrative embodiments allow such data to be processed "in place" within a distributed data processing cluster controlled by the data owner, thereby permitting limited and controlled access to the data for analytics purposes without undermining owner control over other possible uses of the data.

Accordingly, the illustrative embodiments provide significant advantages in these and other cases in which it is not feasible to centralize the data for analytics processing and other types of processing.

Again, the use of particular frameworks as part of a WWH platform is by way of illustrative example only. Numerous alternative frameworks can be utilized as part of a given WWH platform, including in some embodiments any framework supported by YARN, as well as other frameworks in non-YARN embodiments.

The multi-cluster distributed data processing platforms of illustrative embodiments disclosed herein provide significant advantages relative to conventional arrangements.

As mentioned previously, illustrative embodiments move the computation instead of moving the data and create an abstraction to distributed Big Data in order to overcome the drawbacks of conventional systems, providing significant advantages in terms of both performance and privacy, and related advantages such as the facilitation of GRC, as outlined in detail elsewhere herein.

It is to be appreciated that the particular types of system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments of the invention. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as WWH nodes 102 and distributed data processing clusters 104, or portions thereof, can be implemented as respective tenants of such a multi-tenant environment.

In some embodiments, the cloud infrastructure additionally or alternatively comprises a plurality of containers implemented using container host devices. For example, a given container of cloud infrastructure illustratively comprises a Docker container or other type of LXC. The containers may be associated with respective tenants of a multi-tenant environment of the system 100, although in other embodiments a given tenant can have multiple containers. The containers may be utilized to implement a variety of different types of functionality within the system 100. For example, containers can be used to implement respective cloud compute nodes or cloud storage nodes of a cloud computing and storage system. The compute nodes or storage nodes may be associated with respective cloud tenants of a multi-tenant environment of system 100. Containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

As mentioned previously, some networks utilized in a given embodiment may comprise high-speed local networks in which associated processing devices communicate with one another utilizing PCIe cards of those devices, and networking protocols such as InfiniBand, Gigabit Ethernet or Fibre Channel.

Each processing device of the processing platform comprises a processor coupled to a memory. The processor may comprise a microprocessor, a microcontroller, an application-specific integrated circuit (ASIC), a field-programmable gate array (FPGA) or other type of processing circuitry, as well as portions or combinations of such circuitry elements. The memory may comprise random access memory (RAM), read-only memory (ROM) or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered embodiments of the present invention. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

Portions of a given processing platform in some embodiments can comprise converged infrastructure such as VxRail™, VxRack™ or Vblock® converged infrastructure commercially available from VCE, the Virtual Computing Environment Company, now the Converged Platform and Solutions Division of Dell EMC.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of a given distributed data processing cluster or associated data processing node in a particular embodiment are illustratively implemented in the form of software running on one or more processing devices.

It should again be emphasized that the above-described embodiments of the invention are presented for purposes of illustration only. Many variations and other alternative embodiments may be used. For example, the disclosed techniques are applicable to a wide variety of other types of information processing systems, multi-cluster distributed data processing platforms, application frameworks, processing nodes, local and remote data resources and other components. Also, the particular configurations of system and device elements, associated processing operations and other functionality illustrated in the drawings can be varied in other embodiments. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A method comprising:
   distributing in-memory computations of a batch computation framework across a plurality of data processing clusters associated with respective data zones; and
   combining local processing results of the distributed in-memory computations from respective ones of the data processing clusters;
   wherein the distributed in-memory computations utilize local data structures of respective ones of the data processing clusters;
   wherein a given one of the local data structures in one of the data processing clusters receives local data of the corresponding data zone and is utilized to generate the local processing results of that data processing cluster that are combined with local processing results of other ones of the data processing clusters;
   wherein the local data structures are configured to support one or more batch mode extensions of the batch computation framework for performance of the distributed in-memory computations;
   wherein the local data structures comprise respective portions of a global data structure characterizing the distributed in-memory computations of the batch computation framework;
   wherein the global data structure comprises at least one of a global table, a global dataset and a global property graph associated with respective local data structures comprising local tables, local datasets and local property graphs; and
   wherein the method is performed by at least one processing device comprising a processor coupled to a memory.

2. The method of claim 1 wherein the in-memory computations comprise Spark Core batch computations and the one or more batch mode extensions comprise at least one of a Spark SQL extension, a Spark MLlib extension and a Spark GraphX extension.

3. The method of claim 1 wherein the distributed in-memory computations are initially defined by a user for performance on the global data structure and are automatically orchestrated for distributed performance utilizing the local data structures.

4. The method of claim 1 wherein at least one of the local data structures itself comprises a global data structure having a plurality of additional local data structures of respective additional data processing clusters associated therewith.

5. The method of claim 1 wherein at least a subset of the local data structures have respective different formats so as to support local data heterogeneity within respective ones of the data processing clusters.

6. The method of claim 1 wherein each of the local data structures is configured for processing independently from and in parallel with other ones of the local data structures using data from different data sources so as to support local data diversity within respective ones of the data processing clusters.

7. The method of claim 1 wherein the local data structures are determined at least in part by reference to a distributed catalog service.

8. The method of claim 1 wherein the local data structures comprise respective local tables of a plurality of tables from which a global table for the distributed in-memory computations is derived.

9. The method of claim 1 wherein the local data structures comprise respective local datasets of a plurality of datasets from which a global dataset for the distributed in-memory computations is derived.

10. The method of claim 1 wherein the local data structures comprise respective local property graphs of a plurality of property graphs from which a global property graph for the distributed in-memory computations is derived.

11. The method of claim 10 wherein the global property graph comprises a set of annotated vertexes and a set of annotated edges and wherein the set of annotated vertexes bears a containment relationship to one or more sets of annotated vertexes of respective ones of the local property graphs.

12. The method of claim 1 wherein the distributing and combining are performed at least in part in a worldwide data node coupled to one or more of the data processing clusters.

13. The method of claim 1 wherein the distributing and combining are performed at least in part in a worldwide data node that comprises a processing node of a given one of the data processing clusters.

14. A computer program product comprising a non-transitory processor-readable storage medium having stored therein program code of one or more software programs, wherein the program code when executed by at least one processing device causes said at least one processing device:
to distribute in-memory computations of a batch computation framework across a plurality of data processing clusters associated with respective data zones; and
to combine local processing results of the distributed in-memory computations from respective ones of the data processing clusters;
wherein the distributed in-memory computations utilize local data structures of respective ones of the data processing clusters;
wherein a given one of the local data structures in one of the data processing clusters receives local data of the corresponding data zone and is utilized to generate the local processing results of that data processing cluster that are combined with local processing results of other ones of the data processing clusters;
wherein the local data structures are configured to support one or more batch mode extensions of the batch computation framework for performance of the distributed in-memory computations;
wherein the local data structures comprise respective portions of a global data structure characterizing the distributed in-memory computations of the batch computation framework; and
wherein the global data structure comprises at least one of a global table, a global dataset and a global property graph associated with respective local data structures comprising local tables, local datasets and local property graphs.

15. The computer program product of claim 14 wherein the in-memory computations comprise Spark Core batch computations and the one or more batch mode extensions comprise at least one of a Spark SQL extension, a Spark MLlib extension and a Spark GraphX extension.

16. The computer program product of claim 14 wherein at least a subset of the local data structures have respective different formats so as to support local data heterogeneity within respective ones of the data processing clusters.

17. An apparatus comprising:
at least one processing device having a processor coupled to a memory;
wherein said at least one processing device is configured:
to distribute in-memory computations of a batch computation framework across a plurality of data processing clusters associated with respective data zones; and
to combine local processing results of the distributed in-memory computations from respective ones of the data processing clusters;
wherein the distributed in-memory computations utilize local data structures of respective ones of the data processing clusters;
wherein a given one of the local data structures in one of the data processing clusters receives local data of the corresponding data zone and is utilized to generate the local processing results of that data processing cluster that are combined with local processing results of other ones of the data processing clusters;
wherein the local data structures are configured to support one or more batch mode extensions of the batch computation framework for performance of the distributed in-memory computations;
wherein the local data structures comprise respective portions of a global data structure characterizing the distributed in-memory computations of the batch computation framework; and
wherein the global data structure comprises at least one of a global table, a global dataset and a global property graph associated with respective local data structures comprising local tables, local datasets and local property graphs.

18. The apparatus of claim 17 wherein the in-memory computations comprise Spark Core batch computations and the one or more batch mode extensions comprise at least one of a Spark SQL extension, a Spark MLlib extension and a Spark GraphX extension.

19. The apparatus of claim 17 wherein at least a subset of the local data structures have respective different formats so as to support local data heterogeneity within respective ones of the data processing clusters.

20. The apparatus of claim 17 wherein at least one of the local data structures itself comprises a global data structure having a plurality of additional local data structures of respective additional data processing clusters associated therewith.

* * * * *